United States Patent
Friedlander et al.

(10) Patent No.: US 7,647,288 B2
(45) Date of Patent: Jan. 12, 2010

(54) SYSTEM AND METHOD FOR OPTIMALLY CUSTOMIZABLE AND ADAPTIVE PERSONALIZED INFORMATION DISPLAY FOR INFORMATION ASSOCIATED WITH MANAGING A CHAOTIC EVENT

(75) Inventors: Robert R. Friedlander, Southbury, CT (US); James R. Kraemer, Sante Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 11/864,050

(22) Filed: Sep. 28, 2007

(65) Prior Publication Data

US 2008/0065576 A1 Mar. 13, 2008

Related U.S. Application Data

(63) Continuation-in-part of application No. 11/516,954, filed on Sep. 7, 2006, and a continuation-in-part of application No. 11/553,526, filed on Oct. 27, 2006.

(51) Int. Cl.
*G06F 7/00* (2006.01)
(52) U.S. Cl. ........................................ 706/47
(58) Field of Classification Search ........................ None
See application file for complete search history.

(56) References Cited

U.S. PATENT DOCUMENTS

| | | | |
|---|---|---|---|
| 4,890,227 A | 12/1989 | Watanabe et al. | |
| 5,070,453 A | 12/1991 | Duffany | |
| 5,128,871 A | 7/1992 | Schmitz | |
| 5,764,740 A | 6/1998 | Holender | |
| 5,838,918 A * | 11/1998 | Prager et al. | 709/221 |
| 5,880,598 A | 3/1999 | Duong | |
| 6,021,403 A | 2/2000 | Horvitz et al. | |
| 6,076,166 A | 6/2000 | Moshfeghi et al. | |
| 6,212,524 B1 | 4/2001 | Weissman et al. | |
| 6,321,207 B1 * | 11/2001 | Ye | 705/8 |
| 6,484,155 B1 | 11/2002 | Kiss et al. | |
| 6,675,159 B1 | 1/2004 | Lin et al. | |
| 6,905,816 B2 | 6/2005 | Jacobs et al. | |
| 6,937,147 B2 * | 8/2005 | Dilbeck et al. | 340/506 |
| 6,954,736 B2 | 10/2005 | Menninger et al. | |
| 7,181,428 B2 | 2/2007 | Lawrence | |
| 7,213,009 B2 | 5/2007 | Pestotnik | |
| 7,295,925 B2 | 11/2007 | Breed et al. | |

(Continued)

OTHER PUBLICATIONS

Analytical Effectiveness of Mathematical Models for R&D Project Selection Author(s): William E. Souder Source: Management Science, vol. 19, No. 8, Application Series (Apr. 1973), pp. 907-923.*

(Continued)

*Primary Examiner*—David R Vincent
*Assistant Examiner*—Ola Olude-Afolabi
(74) *Attorney, Agent, or Firm*—Yee & Associates, P.C.; John R. Pivnichny

(57) ABSTRACT

A method for displaying information related to a chaotic event. A mathematical optimization algorithm is used to select an optimal decision set for a user. The mathematical optimization algorithm takes as input a decision template, chaotic event information regarding a chaotic event, and a user profile. The optimal decision set is displayed for the user.

20 Claims, 29 Drawing Sheets

U.S. PATENT DOCUMENTS

| | | | |
|---|---|---|---|
| 7,403,922 | B1 | 7/2008 | Lewis et al. |
| 2002/0052756 | A1* | 5/2002 | Lomangino ................... 705/1 |
| 2002/0111922 | A1* | 8/2002 | Young et al. ................. 705/80 |
| 2003/0140063 | A1 | 7/2003 | Pizzorno et al. |
| 2003/0177038 | A1 | 9/2003 | Rao |
| 2004/0006694 | A1* | 1/2004 | Heelan et al. ............... 713/168 |
| 2004/0122787 | A1 | 6/2004 | Avinash et al. |
| 2005/0004823 | A1* | 1/2005 | Hnatio .......................... 705/7 |
| 2005/0038608 | A1 | 2/2005 | Chandra et al. |
| 2005/0144062 | A1* | 6/2005 | Mittal et al. ................. 705/10 |
| 2005/0149466 | A1 | 7/2005 | Hale et al. |
| 2005/0165594 | A1 | 7/2005 | Chandra et al. |
| 2006/0036560 | A1 | 2/2006 | Fogel |
| 2006/0069514 | A1 | 3/2006 | Chow et al. |
| 2006/0155627 | A1 | 7/2006 | Horowitz |
| 2006/0200435 | A1 | 9/2006 | Flinn et al. |
| 2007/0073654 | A1 | 3/2007 | Chow et al. |
| 2007/0073754 | A1 | 3/2007 | Friedlander et al. |
| 2007/0174090 | A1 | 7/2007 | Friedlander et al. |
| 2007/0174091 | A1 | 7/2007 | Friedlander et al. |
| 2007/0185737 | A1 | 8/2007 | Friedlander et al. |
| 2007/0203872 | A1 | 8/2007 | Flinn et al. |
| 2007/0244701 | A1 | 10/2007 | Erlanger et al. |
| 2007/0274337 | A1 | 11/2007 | Purpura |
| 2007/0276851 | A1 | 11/2007 | Friedlander et al. |
| 2008/0015871 | A1 | 1/2008 | Eder |
| 2008/0082356 | A1 | 4/2008 | Friedlander et al. |
| 2008/0082374 | A1 | 4/2008 | Kennis et al. |
| 2008/0208801 | A1 | 8/2008 | Friedlander et al. |
| 2008/0208813 | A1 | 8/2008 | Friedlander et al. |
| 2008/0208814 | A1 | 8/2008 | Friedlander et al. |
| 2008/0208832 | A1 | 8/2008 | Friedlander et al. |
| 2008/0208838 | A1 | 8/2008 | Friedlander et al. |
| 2008/0208875 | A1 | 8/2008 | Friedlander et al. |
| 2008/0208901 | A1 | 8/2008 | Friedlander et al. |
| 2008/0208902 | A1 | 8/2008 | Friedlander et al. |
| 2008/0208903 | A1 | 8/2008 | Friedlander et al. |
| 2008/0208904 | A1 | 8/2008 | Friedlander et al. |

OTHER PUBLICATIONS

Picking up the pieces: Utilizing Diasaster Recovery Project Management to improve readiness and response time, Phillip E. Hayes, Aubrey Hammons, IEEE Industry Applications Magazine, Nov./Dec. 2002 pp. 1-10.*

A Mathematical Approach to Disaster Recovery Planning*, Kun Wang, Zhonghai Yin, Feng Yuan, Lihua Zhou, Proceedings of the First International Conference on Semantics, Knowledge, and Grid (SKG 2005) pp. 1-3.*

An Overview of Heuristic Solution Methods Author(s): E. A. Silver Source: The Journal of the Operational Research Society, vol. 55, No. 9 (Sep. 2004), pp. 936-956.*

Cooperative software development: concepts, model and tools Altmann, J.; Pomberger, G.; Technology of Object-Oriented anguages and Systems, 1999. Tools 30. Proceedings Aug. 1-5, 1999 pp. 194-207 Digital Object Identifier 10.1109/Tools.1999.787549.*

U.S. Appl. No. 11/863,992, filed Sep. 28, 2007, Friedlander et al.
U.S. Appl. No. 11/864,039, filed Sep. 28, 2007, Friedlander et al.
U.S. Appl. No. 11/864,002, filed Sep. 28, 2007, Friedlander et al.
U.S. Appl. No. 11/516,954, filed Sep. 7, 2006, Friedlander et al.
U.S. Appl. No. 11/553,526, filed Oct. 27, 2006, Friedlander et al.
U.S. Appl. No. 11/516,953, filed Sep. 7, 2006, Friedlander et al.
U.S. Appl. No. 11/874,382, filed Oct. 18, 2007, Friedlander et al.
U.S. Appl. No. 12/130,779, filed May 30, 2008, Friedlander et al.
U.S. Appl. No. 12/121,947, filed May 16, 2008, Angell et al.
U.S. Appl. No. 12/135,972, filed Jun. 9, 2008, Angell et al.
U.S. Appl. No. 12/135,960, filed Jun. 9, 2008, Angell et al.
U.S. Appl. No. 12/243,825, filed Oct. 1, 2008, Angell et al.

Luckham et al., "Event Processing Glossary", May 2008, Retrieved Jun. 9, 2008, pp. 1-13, <http://complexevents.com/?p=361>.

"AHRQ Quality Indicators—Patients Safety Indicators—Technical Specifications", Department of Health and Human Services Agency for Healthcare Research and Quality, Version 3.1, Mar. 12, 2007, pp. 1-107, <http://www.qualityindicators.ahrq.gov>.

Hayes et al., "Picking Up the Pieces: Utilizing Disaster Recovery Project Management to Improve Readiness and Response Time", IEEE Industry Applications Magazine, Nov./Dec. 2002, pp. 1-10.

Wang et al., "A Mathematical Approach to Disaster Recovery Planning", Xidian University, National Info Security Engineering and Technology Research Center, Beijing, China, Proceedings of the First International Conference of Semantics, Knowledge, and Grid, SKG 2005, pp. 1-3.

Silver, E.A., "An Overview of Heuristic Solution Methods", The Journal of the Operational Research Society, vol. 55, No. 9, Sep. 2004, pp. 936-956.

Chen et al., "Research on Organization Method of Development Activities for Complicated Product", The 9th International Conference on Computer Supported Cooperative Work in Design Proceedings, vol. 1, May 24-26, 2005, pp. 234-239.

Cao et al., "Research on Resource Scheduling for Development Process of Complicated Product", The 9th International Conference on Computer Supported Cooperative Work in Design Proceedings, vol. 1, May 24-26, 2005, pp. 229-331.

Altmann et al., "Cooperative Software Development: Concepts, Model and Tools", C Doppler Laboratory for Software Engineering, Johannes Kepler University, Linz, 1999, pp. 194-207.

Souder, William E., "Analytical Effectiveness of Mathematical Models for R&D Project Selection", Management Science, Application Series, vol. 19, No. 8, Apr. 1973, pp. 907-923.

* cited by examiner

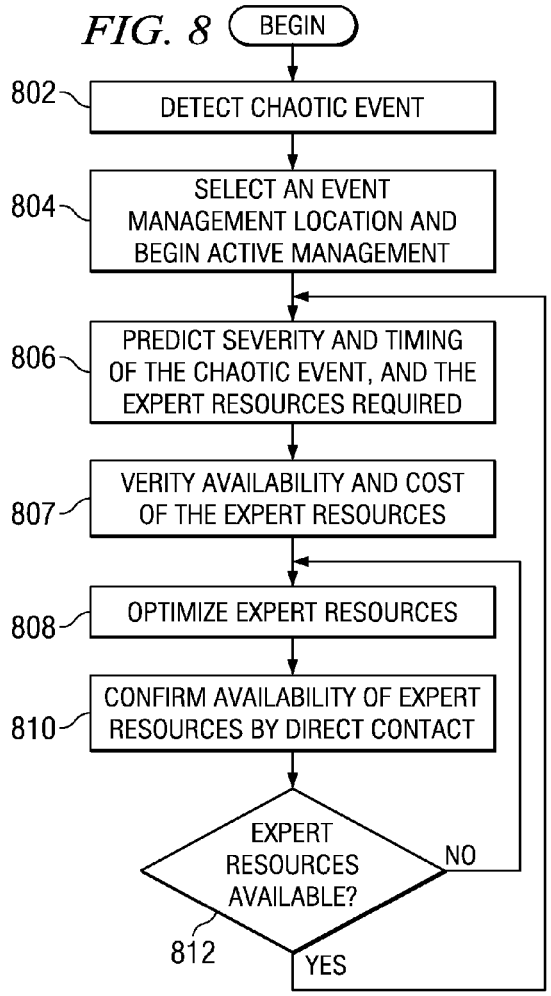
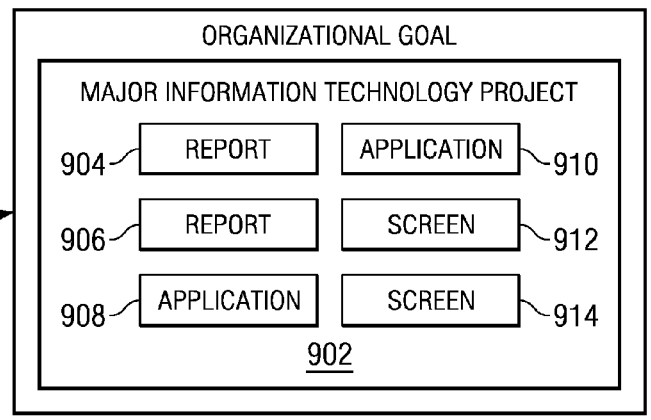

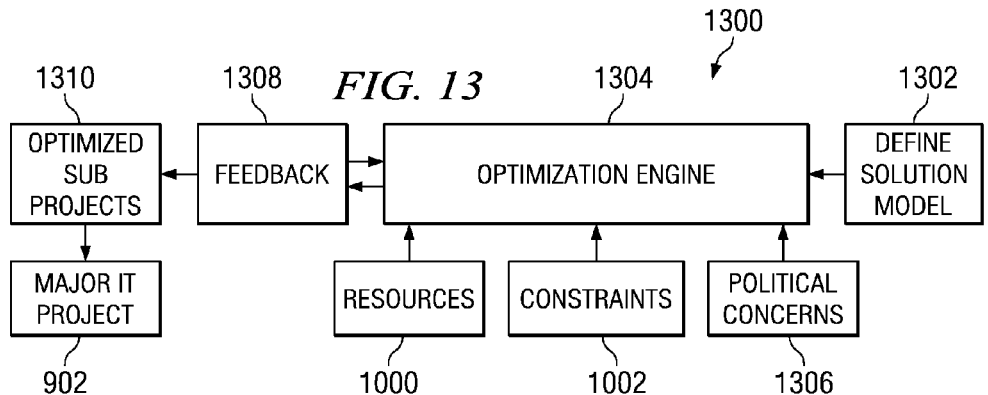
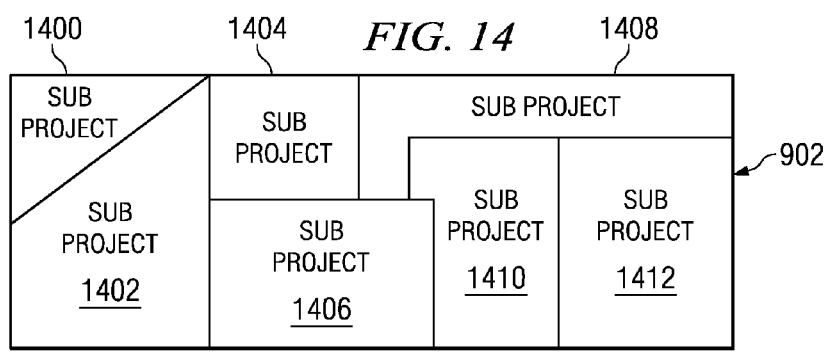
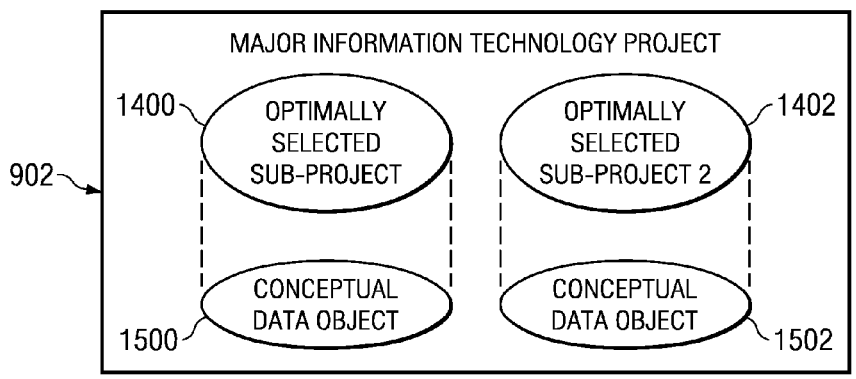

*FIG. 24*

| 2400 AFFINITY MATRIX | 2406 DATA SOURCE | 2408 DATA SOURCE | 2410 DATA SOURCE | 2412 DATA SOURCE | 2414 DATA SOURCE |
|---|---|---|---|---|---|
| 1802 REPORT DATA STRUCTURE | 0 | 0 | 0 | 0 | 1 |
| 1804 SCREEN DATA STRUCTURE | 0 | 0 | 0 | 1 | 0 |
| 1806 PRODUCTION SCHEDULE DATA STRUCTURE | 1 | 1 | 1 | 0 | 0 |
| 1808 DELIVERABLE DATA STRUCTURE | 0 | 1 | 0 | 1 | 1 |
| 1902 APPLICATION DATA STRUCTURE | 1 | 0 | 1 | 0 | 0 |
| 1904 APPLICATION DATA STRUCTURE | 0 | 0 | 0 | 1 | 1 |
| 1906 FLOW DATA STRUCTURE | 1 | 1 | 0 | 0 | 0 |
| 1908 FLOW DATA STRUCTURE | 0 | 1 | 0 | 0 | 0 |
| 2418 PERSONAL SKILLS PROGRAM DATA STRUCTURE | 0 | 1 | 0 | 0 | 0 |
| 2420 OPPORTUNITIES DATABASE FOR SALES DATA STRUCTURE | 0 | 1 | 0 | 0 | 1 |

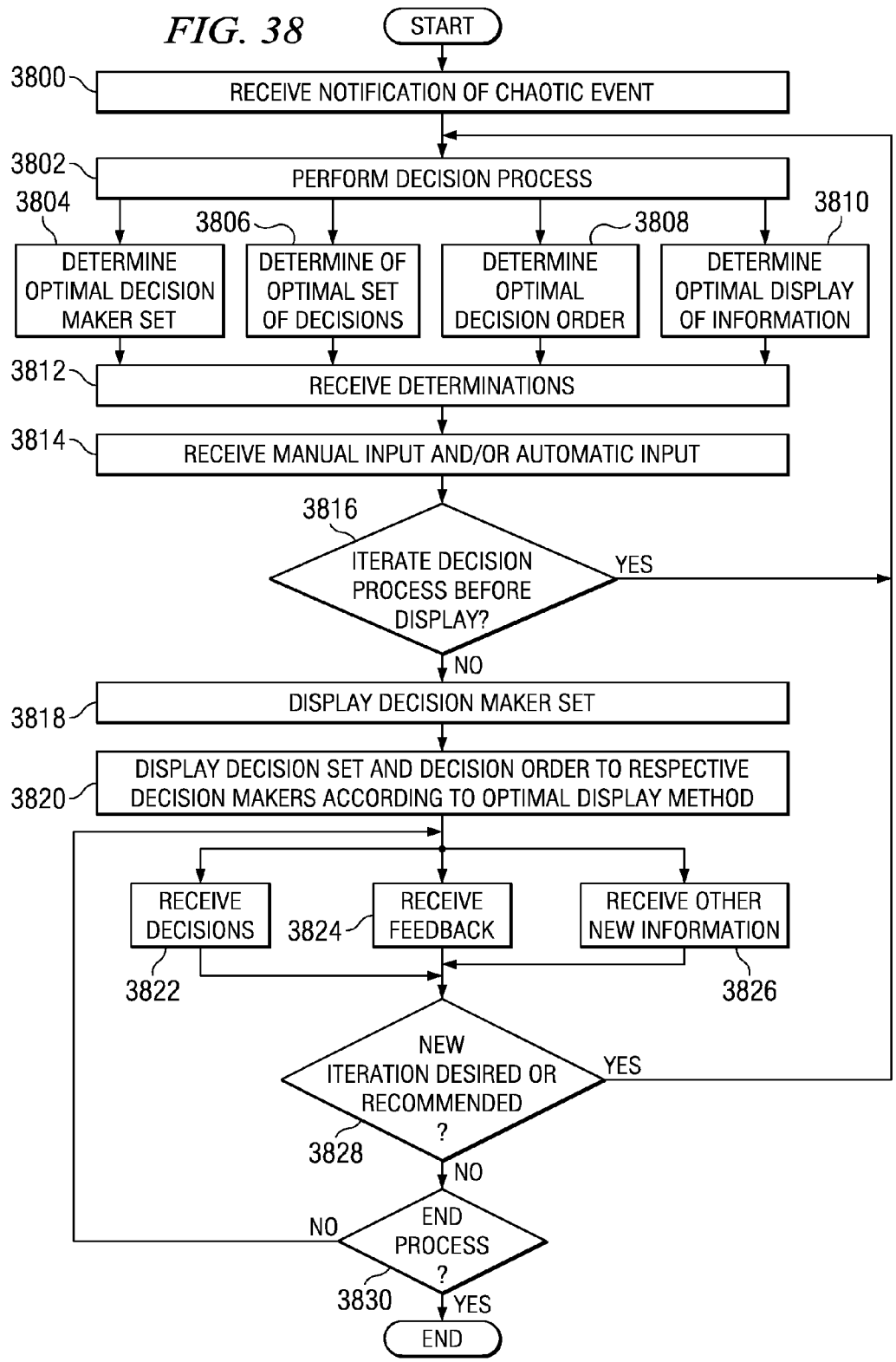

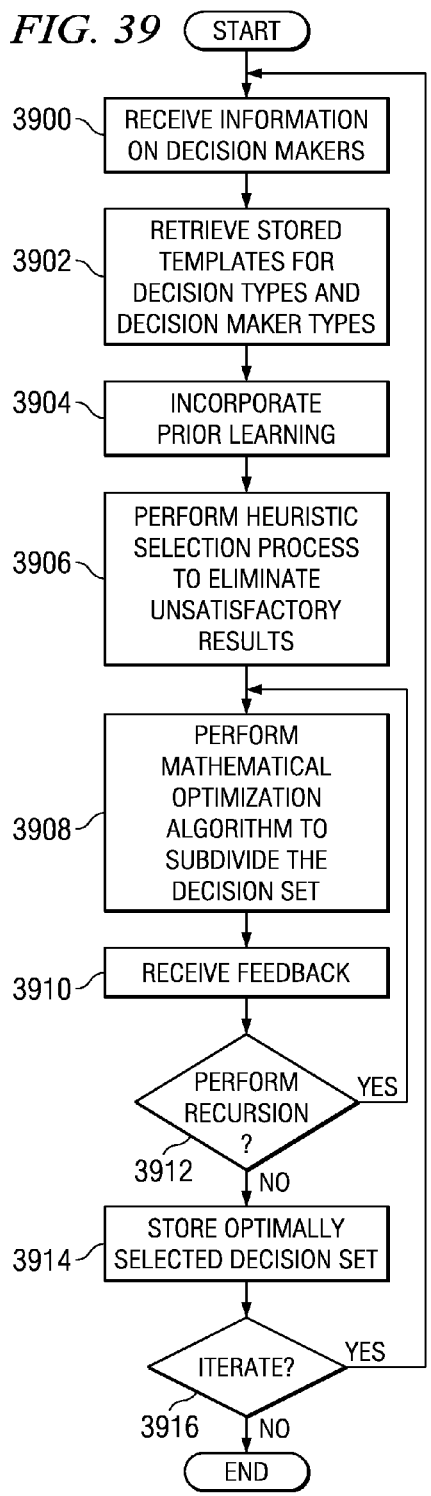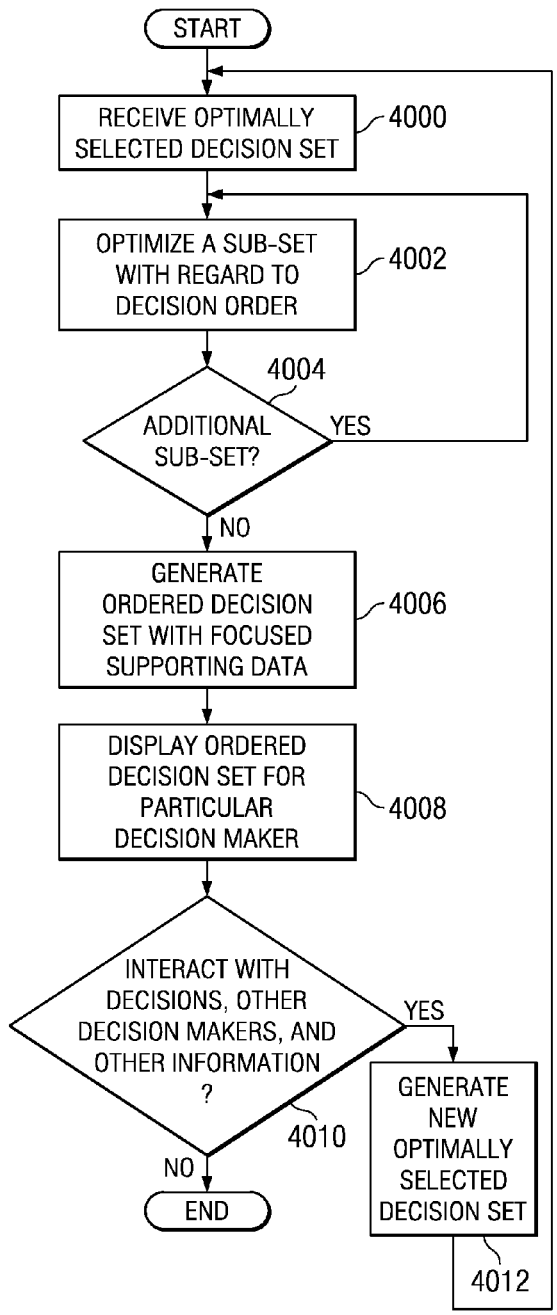

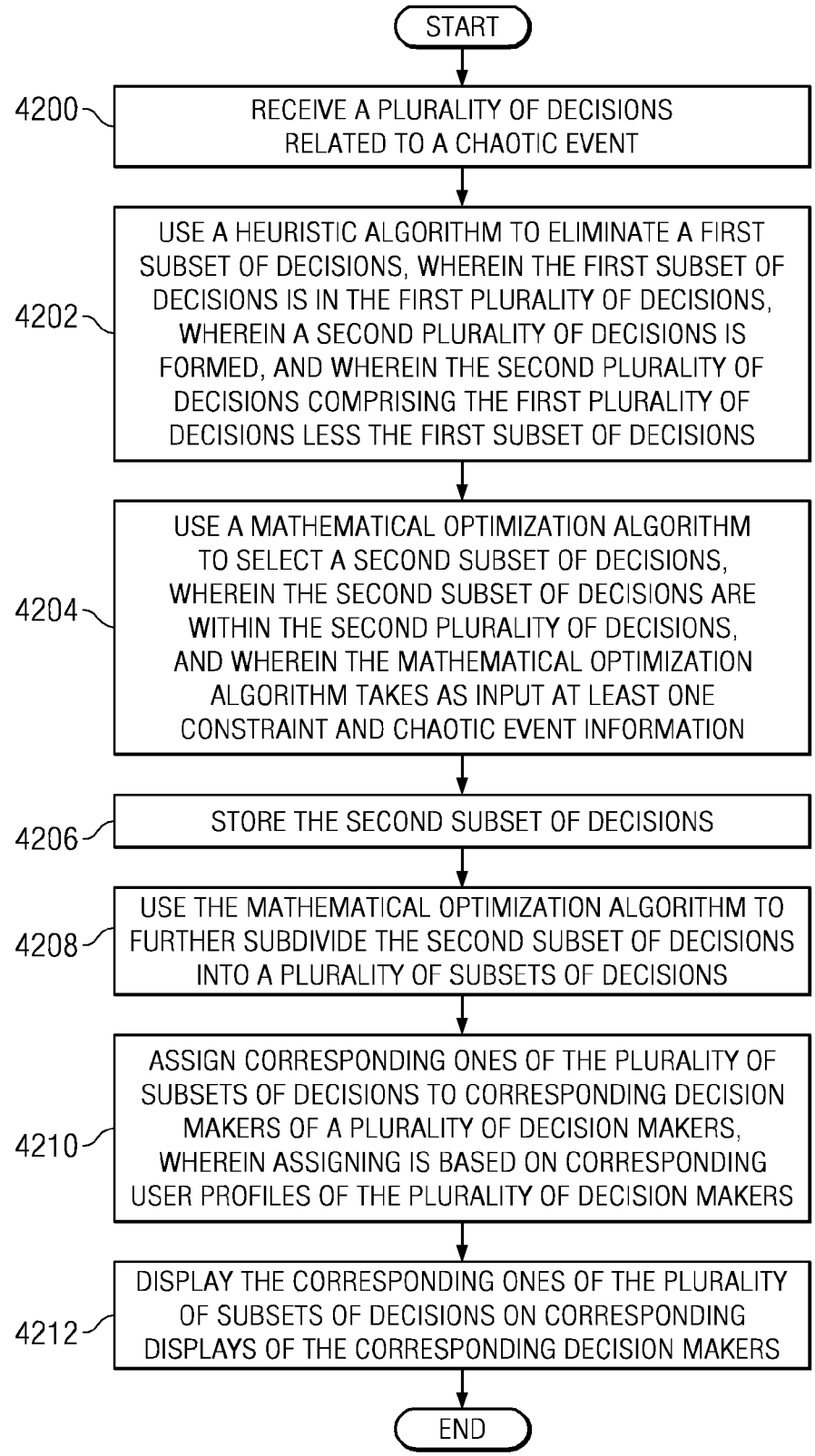

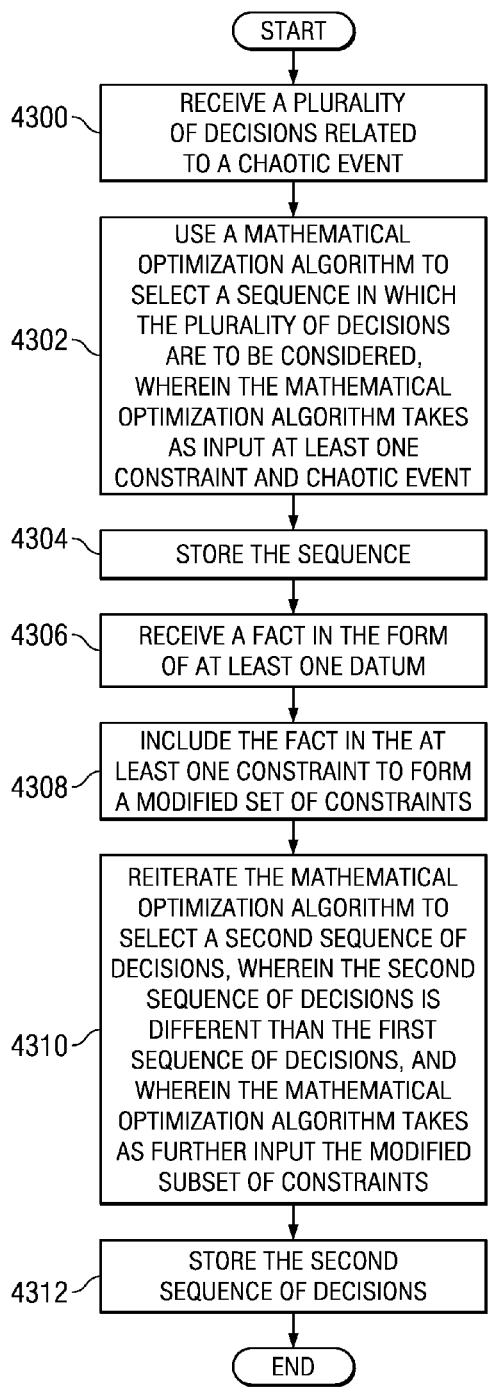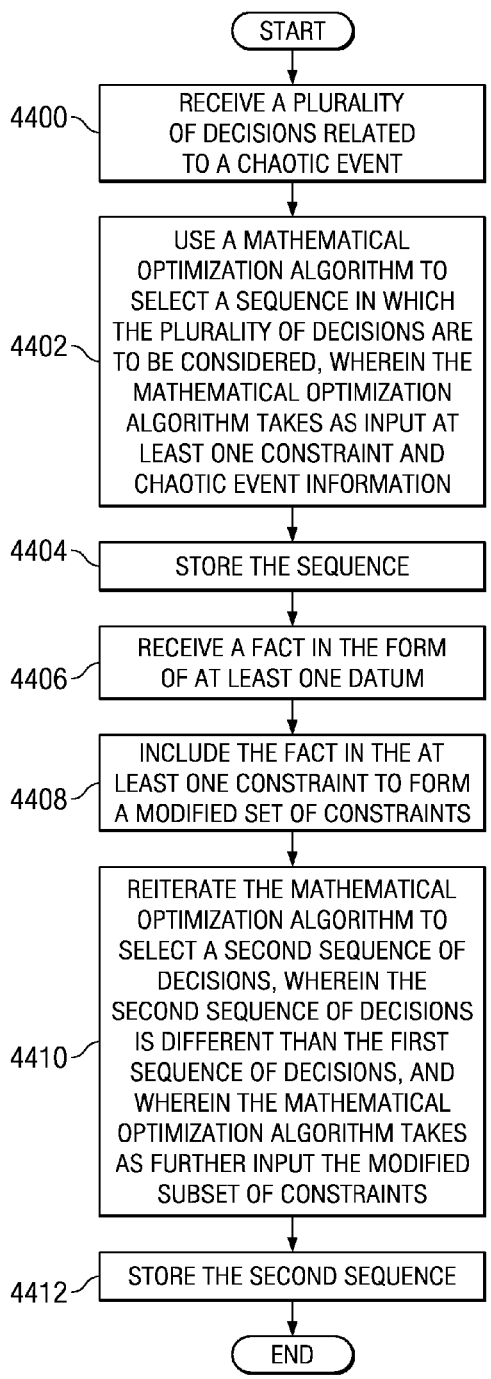

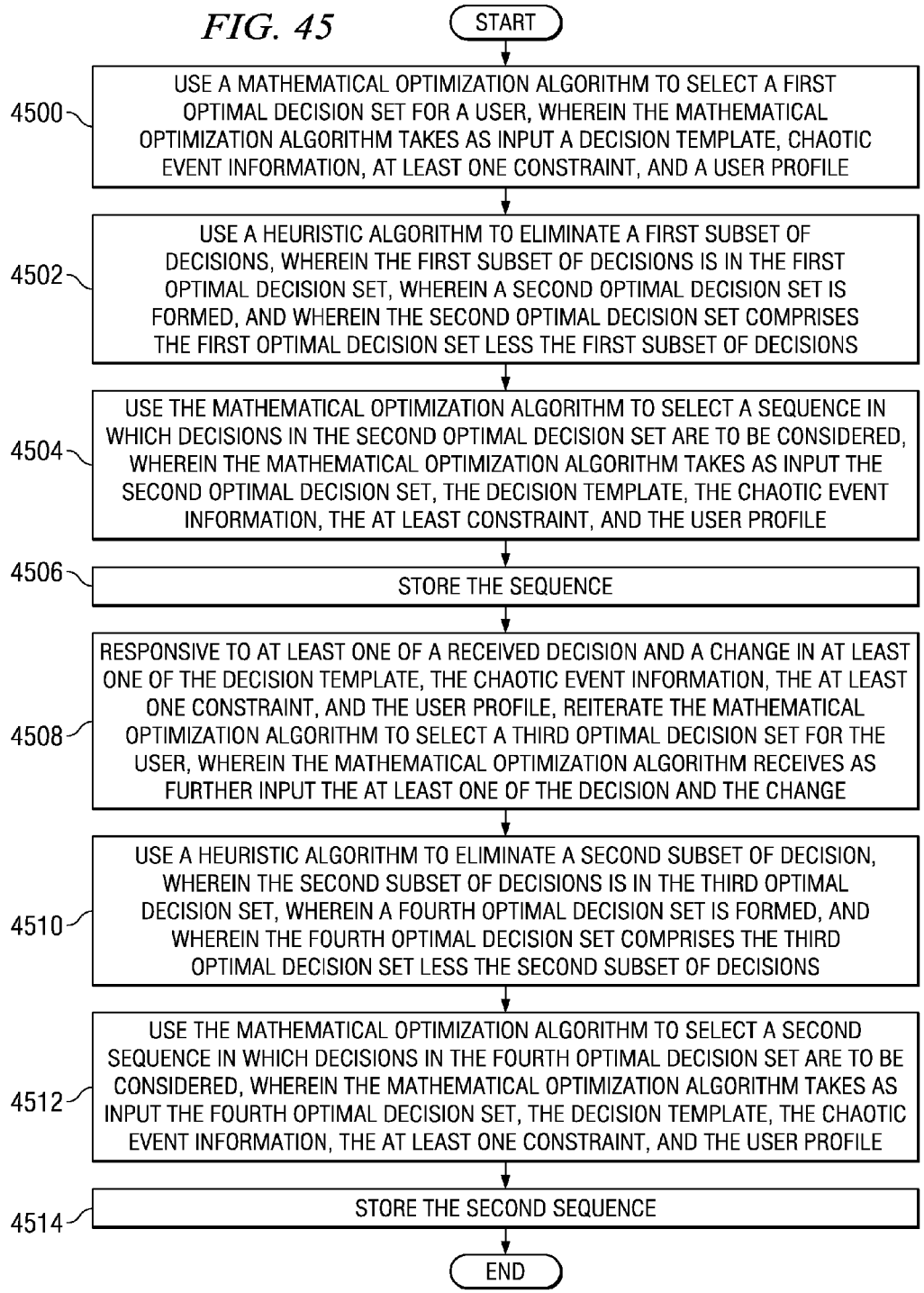

SYSTEM AND METHOD FOR OPTIMALLY CUSTOMIZABLE AND ADAPTIVE PERSONALIZED INFORMATION DISPLAY FOR INFORMATION ASSOCIATED WITH MANAGING A CHAOTIC EVENT

RELATED APPLICATIONS

This application is a continuation-in-part of System and Method for Managing a Chaotic Event, U.S. application Ser. No. 11/516,954, filed Sep. 7, 2006; and is also a continuation-in-part of System and Method for Optimizing Project Subdivision Using Data and Requirements Focuses Subject to Multidimensional Constraints, U.S. application Ser. No. 11/553,526, filed Oct. 27, 2006.

BACKGROUND OF THE INVENTION

1. Field of the Invention

The present invention relates generally to an improved data processing system. More particularly, the present invention relates to a computer implemented method, apparatus, and computer usable program code for managing a chaotic event.

2. Description of the Related Art

Major chaotic events are, by definition, times of great difficulty. Chaotic events are events that cause an interruption in routines normally performed by people in everyday activities because of damage inflicted to individuals and infrastructure. For example, there is great potential for episodes of profound chaos during hurricanes, earthquakes, tidal waves, solar flares, flooding, terrorism, war, and pandemics to name a few. Even when the chaotic event is statistically predictable, the results are often still shocking. Chaotic events do not occur frequently, but the results may be long lasting and unexpected.

Human beings, by nature, are generally very ill prepared at a mental level for planning for and dealing with these chaotic events. Leaders and other planners tend to only concentrate on a small number of obvious situations. Additionally, various chaotic events are difficult to plan for because of how rarely they occur and because of the unknowable. The unknowable effects may include the severity and geographic range of the affected area and the reaction to the event. Plans often have political or economic groundings rather than being empirically driven.

Further complicating chaotic events are the disruption to the lives of staff members, leaders of organizations, and individuals that may be expected to provide support, services, or leadership during and after the chaotic event. Unfortunately, during chaotic events, the people most needed may have been killed, injured, assisting family members, fleeing, or otherwise inaccessible. Standard contingency planning, especially for expert support, is necessary but insufficient because chaotic events are rare, catastrophic, and dynamic in nature.

The exact skills and quantities of each skill needed are unknowable. The availability of the necessary skill pool is problematic because trying to lock in additional skills in advance of a chaotic event is financially and organizationally infeasible. Providing the logistics necessary in advance to provide expert support for all potentially catastrophes is impossible. As a result, people, corporations, governments, enterprises, and agencies have great difficulty in finding necessary expert skills during chaotic events.

Additionally, the presentation of data to decision makers during a chaotic effect can have a major impact on the effectiveness of the decision makers. For example, during chaotic events decision makers can have great difficulty making optimal decisions, from a mathematically verifiable perspective, even when theoretically optimal information is available. The decision maker can be overwhelmed or confused by the way information is presented. The decision maker may also be unable to easily find important and relevant pieces of information in a sea of data. These problems may be further compounded when decisions are made by multiple decision makers.

SUMMARY OF THE INVENTION

The aspects of the present invention provide for a computer implemented method, apparatus, and computer usable program code for displaying information related to a chaotic event. A mathematical optimization algorithm is used to select an optimal decision set for a user. The mathematical optimization algorithm takes as input a decision template, chaotic event information regarding a chaotic event, and a user profile. The optimal decision set is displayed for the user.

Also provided is a method for optimally selecting a subset of decisions from a first plurality of decisions related to management of a chaotic event. The first plurality of decisions related to the chaotic event is received. A heuristic algorithm is used to eliminate a first subset of decisions. The first subset of decisions is in the first plurality of decisions. A second plurality of decisions is formed. The second plurality of decisions comprises the first plurality of decisions less the first subset of decisions. A mathematical optimization algorithm is then used to select a second subset of decisions. The second subset of decisions is within the second plurality of decisions. The mathematical optimization algorithm takes as input at least one constraint and chaotic event information. The second subset of decisions is stored.

Also provided is a method for determining a sequence of decisions related to a chaotic event. A plurality of decisions related to the chaotic event is received. A mathematical optimization algorithm is used to select a sequence in which the plurality of decisions are to be considered. The mathematical optimization algorithm takes as input at least one constraint and chaotic event information. The sequence is stored.

Also provided is a method for displaying information related to a chaotic event. A mathematical optimization algorithm is used to select a first optimal decision set for a user. The mathematical optimization algorithm takes as input a decision template, chaotic event information, at least one constraint, and a user profile. A heuristic algorithm is used to eliminate a first subset of decisions. The first subset of decisions is in the first optimal decision set. A second optimal decision set is formed. The second optimal decision set comprises the first optimal decision set less the first subset of decisions. The mathematical optimization algorithm is used to select a sequence in which decisions in the second optimal decision set are to be considered. The mathematical optimization algorithm takes as input the second optimal decision set, the decision template, the chaotic event information, the at least one constraint, and the user profile. The sequence is stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart for managing expert resources during times of chaos in accordance with the illustrative embodiments;

FIG. 9 is a block diagram illustrating a major information technology project, in accordance with an illustrative embodiment;

FIG. 13 is a block diagram illustrating a computer-implemented method of creating optimized sub-projects for a major information technology project, in accordance with an illustrative embodiment;

FIG. 14 is a block diagram illustrating optimally selected sub-projects for a major information technology project, in accordance with an illustrative embodiment;

FIG. 15 is a block diagram illustrating major information technology sub-projects that efficiently overlap underlying realities of existing information technology systems, in accordance with an illustrative embodiment;

FIG. 24 is an exemplary affinity matrix, in accordance with an illustrative embodiment;

FIG. 38 is a flowchart illustrating an operation of a system for chaotic event management, in accordance with an illustrative embodiment;

FIG. 39 is a flowchart illustrating a process of sub-dividing a decision set, in accordance with an illustrative embodiment;

FIG. 40 is a flowchart of a process of sequencing a set of decisions, in accordance with an illustrative embodiment;

FIG. 42 is a flowchart illustrating a process of generating a set of decisions, in accordance with an illustrative embodiment;

FIG. 43 is a flowchart illustrating a process of optimizing a sequence of decisions, in accordance with an illustrative embodiment;

FIG. 44 is a flowchart illustrating a process of generating an optimal sequence of decisions, in accordance with an illustrative embodiment;

FIG. 45 is a flowchart illustrating a process of generating and sequencing an optimal decision set, in accordance with an illustrative embodiment.

DETAILED DESCRIPTION OF THE PREFERRED EMBODIMENT

I. Preface

This document is divided into six major sections. This section, Section I is the preface and describes the overall organization of this document. The second section, Section II, provides general background knowledge of networks and computers. The third section, Section III, describes our prior work with regard to the management of chaotic events. The fourth section, Section IV, describes our prior work with regard to mathematically rigorous optimal selection of subprojects for a major project. The fifth section, Section V, describes our additional work in the area of management of chaotic events. The sixth section, Section VI, is the conclusion section. The terms "our" and "we" refer to the inventors of the material in this document and/or of the materials in the related documents described below. The terms "we" and "our" can refer to a singular inventive entity, a single person, or multiple persons where appropriate.

II. Computer and Network Background

This section, Section II, provides general background knowledge of computers and networks. The following section, Section III, describes our prior work in the area of chaotic event management.

Figure 1:
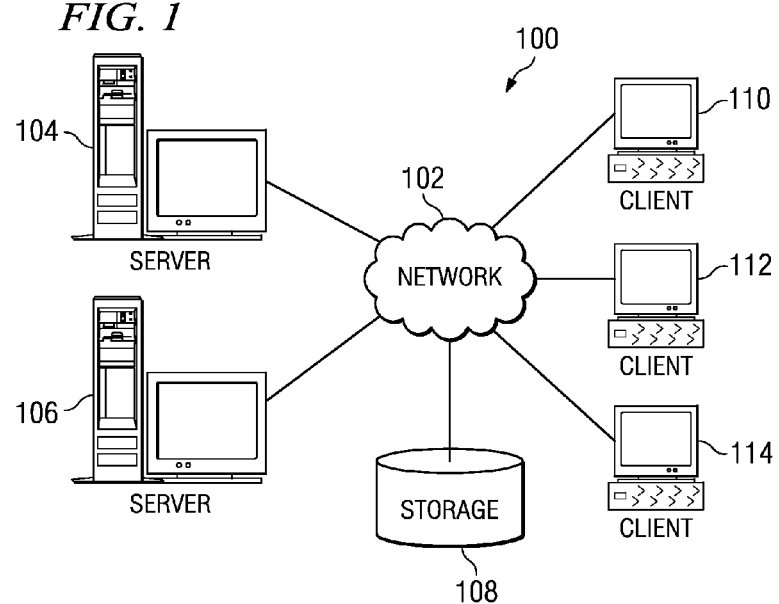
FIG. 1 is a pictorial representation of a network of data processing systems in which illustrative embodiments may be implemented.
Figure 2:
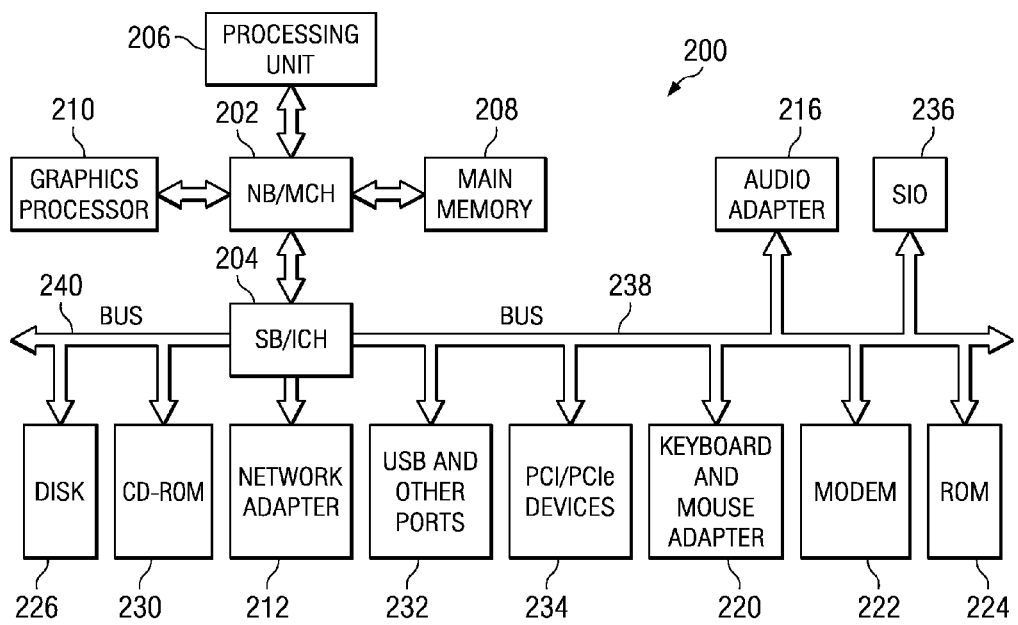
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

FIG. 2 is a block diagram of a data processing system in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc., in the United States, other countries, or both).

Instructions for the operating system, the object-oriented programming system, and applications or programs are located on storage devices, such as hard disk drive 226, main memory 208, tape drives, or any other form of memory or storage for data, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

III. Our Prior Work in the Area of Chaotic Event Management

The previous section, Section II, describes computers and networks generally. This section, Section III, describes our prior work in the area of chaotic event management. The following section, Section IV, describes our prior work in the area of optimized selection of sub-projects for a major information technology project.

Illustrative embodiments provide a computer implemented method, apparatus, and computer usable program code for managing a chaotic event. A chaotic event is detected automatically or manually based on received information. The process of the illustrative embodiments is initiated in response to the detection of a potentially chaotic event. In general terms, management of the event begins from a single point or multiple points, based on the detection of a potentially chaotic situation. A determination is made as to what the required resources are for the situation.

Resources or expert resources are skills, expert skills, and resources required by individuals with skills to deal with the chaotic event. Resources include each expert individual with the necessary skills as well as transportation, communications, and materials to properly perform the task required by the expertise or skill of the individual. For example, heavy equipment operators may be needed as well as doctors. Heavy equipment operators may need bulldozers, backhoes, and transportation to the event location, and the doctors may require nurses, drugs, a sterile room, a communications center, emergency helicopters, and operating instruments.

The needed skills are optimized based on requirements and constraints for expert services, a potential skills pool, cohorts of a related set of skills, and enabling resources. Optimization is the process of finding a solution that is the best fit based on the available resources and specified constraints. The solution is skills and resources that are available and is recognized as the best solution among numerous alternatives because of the constraints, requirements, and other circumstances and criteria of the chaotic event. A cohort or unified group may be considered an entity rather than a group of individual skills, such as a fully functioning mobile army surgical hospital (MASH) unit.

The service requirements are transmitted to the management location for reconciliation of needed skills against available skills. Skills requirements and individuals and cohorts available for deployment are selected based on optimization of costs, time of arrival, utility value, capacity of transportation route, and value. Routes are how the resource is delivered. For example, in some cases, a route is an airplane. In another example, a route is a high-speed data line that allows a surgeon to remotely view an image. The process is continuously monitored and optimized based on feedback and changing situations. The execution of the plan is implemented iteratively to provide the necessary expert resources. The expert resources are deployed by decision makers to manage the chaotic event by effectively handling the circumstances, dangers, events, and problems caused by the chaotic event.

Figure 3:
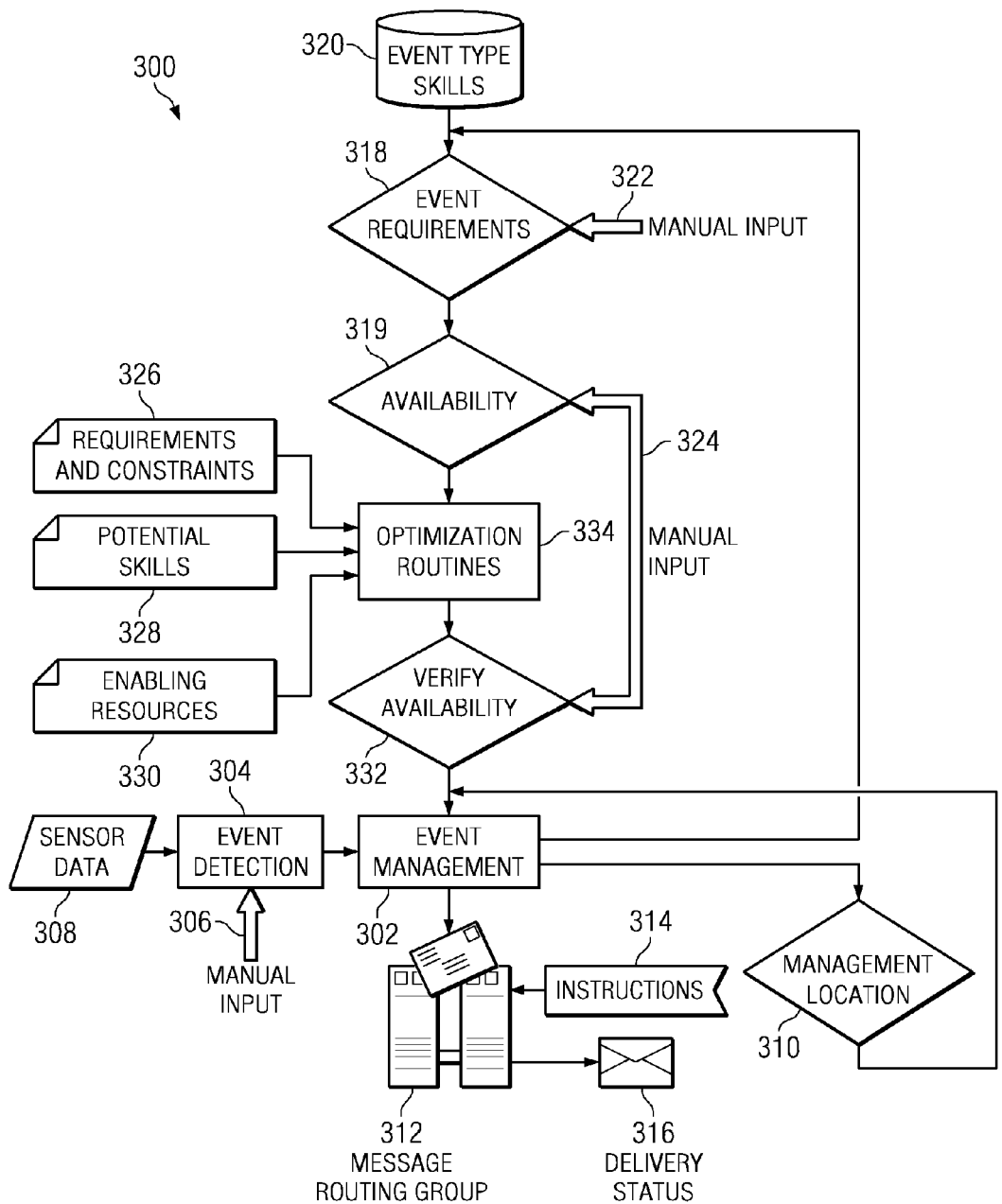
FIG. 3 is a block diagram for managing chaotic events in accordance with the illustrative embodiments.

FIG. 3 is a block diagram for managing chaotic events in accordance with the illustrative embodiments. Event management system 300 is a collection or network of computer programs, software components or modules, data processing systems, devices, and inputs used to manage expert skills for a chaotic event. Event management system 300 includes all steps, decisions, and information that may be needed to deal with a chaotic event. Event management system 300 may be a centralized computer program executed and accessible from a server, such as server 104 of FIG. 1 or a network of hardware and software components, such as network data processing system 200 of FIG. 2.

Event management system 300 or portions of event management system 300 may be stored in a databases or data structures, such as storage 108 of FIG. 1. Event management system 300 may be accessed in person or by using a network, such as network 102 of FIG. 1. Event management system 300 may be accessed by one or more users, decision makers, or event managers for managing the chaotic event. The user may enter information and receive information through an interface of event management system 300. The information may be displayed to the user in text and graphics. Additionally, the user may be prompted to enter information and decisions to help the user walk through the management of the chaotic event. For example, event management system 300 may walk a state governor through each step that should be taken for a sun flare that has crippled the state in a logical and effective sequence.

Event management system 300 is used for information processing so that decisions may be more easily made based on incoming information that is both automatically sent and manually input. Event management system 300 enables administrators, leaders, and other decision makers to make decisions in a structured and supported framework. In some cases, leaders may be so unprepared or shocked by the chaotic event that event management system 300 may walk leaders through necessary steps. In this manner, event management system 300 helps the leaders to take effective action quickly. Event management system 300 intelligently interacts with decision makers providing a dynamic interface for prioritizing steps and a work flow for dealing with the chaotic event in a structured framework. The decisions may be based on policy and politics in addition to logistical information.

Event management system 300 is managed by event management 302. Event management 302 begins the process of managing a chaotic event in response to event detection 304 detecting the event. For example, if the chaotic event is a series of catastrophic tornadoes, event detection 304 may become aware of the tornadoes through the national weather service. Alternatively, storm chasers may witness the series of tornadoes and report the event in the form of manual input 306 to event detection 304. Event detection 304 may also be informed of the chaotic event by sensor data 308. Sensor data is information from any number of sensors for detecting chaotic events including sensors for detecting wind, rain, seismic activity, radiation, and so forth. Event detection 304 informs event management 302 of the chaotic event occurrence and known details of severity so that preliminary estimates may be made. Event detection 304 is further described in FIG. 4, and predicting severity of chaotic events is further described in FIG. 5 below.

Once event detection 304 has informed event management 302 of the location and occurrence of a chaotic event, event management 302 works with management location 310 to determine a suitable location for management of the event. Event detection 304 sends a message to event management 302. The message may specify any ascertained information, such as the time, focal point, geographic area, and severity of the chaotic event if known. For example, if event management 302 is located on server 104 of FIG. 1 that has been flooded by torrential rains in Georgia, event management 302 may be transferred to server 106 of FIG. 1, located in Texas. Management location 310 allows the process of event management 302 to occur from the best possible location. Event management 302 may occur from multiple event management positions if there are multiple chaotic events simultaneously.

For example, the best possible location may be an external location out of the danger zone or affected area. Alternatively, the best possible location may be the location closest to the affected area that still has access to power, water, communications, and other similar utilities. Management location 310 may maintain a heartbeat connection with a set of one or more event management positions for immediately transferring control to a specified event management component if the heartbeat connection is lost from an event management component in the affected area. The heartbeat signal should be an encrypted signal.

A heartbeat connect is a periodic message or signal informing other locations, components, modules, or people of the status of event management 302. In another example, the chaotic event may be a federal disaster. A local management location 310 may transfer control of event management 302 to the headquarters of the supervising federal agency, such as Homeland Security or the Federal Aviation Administration (FAA). If event management 302 is damaged or inaccessible, a redundant or alternative event management location automatically takes control. Additionally, event management 302 may systematically make decisions regarding event management or transfer management location 310 to a different location if event management 302 does not receive instructions or feedback from decision makers or other individuals involved in management of the chaotic event.

For example, if a mayor providing user input and information from event management 302 becomes unavailable, decisions regarding management may be made based on the best available information and alternatives. Additionally, management location 310 may be transferred to a location where individuals are able and willing to provide user input and receive information from event management 302.

In some cases, such as a large chemical release, leaders for corporations, organizations, and government entities may not have direct access to event management 302. As a result, message routing group 312 may be used to communicate instructions 314 for the effective management of the chaotic event. Message routing group 312 is the hardware and software system used to communicate instructions 314 from event management 302. Instructions 314 may include directions, instructions, and orders for managing the response and other event-specific information.

Message routing group 312 may keep track of whether instructions 314 have been received by the intended party through the tracking of delivery status 316. Delivery status 316 indicates status information, such as if, when, how the message in instructions 314 was delivered, and descriptions of any problems preventing delivery.

Event management 302 passes information about the event to event requirements 318. For example, event management 302 may pass information regarding the severity of the chaotic event gleaned from manual input 306 and sensor data 308 to event requirements 318. Event requirements 318 determine which skills, resources, or other information is required for the chaotic event. Event requirements 318 determine whether required skills and resources may be provided in person or remotely. For example, welders and trauma doctors may be required to be in person, but a pathologist may work via remote microscope cameras and a high-speed data connection.

Event requirements 318 may be updated by event management 302 as more information becomes available about the chaotic event. Event requirements 318 may use event type skills 320 to determine the skills needed based on the type of chaotic event. Event type skills 320 is a collection of resources needed for each event type. For example, if a hurricane has damaged water-retaining facilities, such as reservoirs, levees, and canals, more civil engineers than normal may be required for the hurricane. Event type skills 320 is preferably a database of skills stored in a database or memory, such as main memory 208 of FIG. 2 required for all possible chaotic events. For example, event type skills 320 may specify the skills needed for a meltdown of a nuclear reactor including welders, waste disposal experts, nuclear engineers, paramedics, doctors, nuclear researchers, and so forth.

Event requirements 318 may also receive information regarding required skills in the form of manual input 322. Manual input 322 may be received from authorized individuals close to the chaotic event, experts in the field, or based on other in-field or remote observations.

Information from event requirements 318 is passed to availability 319. Availability 319 performs a preliminary determination of the skills and resources to determine available skills and resources. For example, experts with required skills may be called, emailed, or otherwise contacted to determine whether the expert is available, and if so, for how long and under what conditions or constraints. Individuals or organizations with manage, access, control, or possess resources are contacted to determine whether the resources may be used. Availability 319 may also rank potential skills and resources based on location, availability, proximity, cost, experience, and other relevant factors. Availability information is passed from availability 319 to optimization routines 324.

Optimization routines 324 uses information from availability 319, requirements and constraints 326, potential skills 328, and enabling resources 330 to iteratively make suggestions regarding optimal skills and resources. Iterations are based particularly on event severity and event type. For example, optimization routines 324 may be used once every six minutes at the onset of a chaotic event whereas after three months, the iterations may be updated once a day. Only skills and resources that may be available are considered by optimization routines 324. Optimal skills and resources are derived based on elapsed time to arrive on-scene, proximity, capacity, importance, cost, time, and value. For example, optimal location for skills may be preferentially ordered by skill type and value or estimated time of arrival to the scene of the chaotic event.

Optimization routines 324 is a process for maximizing an objective function by systematically choosing the values of real or integer variables from within an allowed set. The values used by optimization routines are values assigned to each skill, resource, route, and other factors that relate to delivery of the required skills and resources.

In one example, optimization routines 324 may be described in the following way:

Given: a function $f: A \to R$ from some set A

Sought: an element $x_0$ such that $f(x_0) \geq f(x)$ for all x in A

Typically, A is some subset of the Euclidean space $R^n$, often specified by a set of constraints, equalities or inequalities that the members of A have to satisfy. For example, constraints may include capacity, time, and value. For example, the capacity of a truck and a helicopter are different as are a dial-up Internet connection and a cable Internet connection.

The elements of A are called feasible solutions. The function $f$, that is maximized, is called an objective function or cost function. A feasible solution that maximizes the objective function is called an optimal solution and is the output of optimization routines 324 in the form of optimized skills and resources. Optimal skills and resources are the resources that are the best solution to a problem based on constraints and requirements. For example, the problem or skill to be optimized may be that event managers need a doctor with a specialty in radiation sickness with three or more years experience in or around Texas with transportation to Dallas, Tex. that is available for the next two weeks. The optimal solution in this case may be a doctor that lives in Northern Dallas with the required experience and availability. The optimal solution for skills and resources is also optimized based on cost. If a bulldozer may be moved from two locations with similar restraints, the optimal solution is the cheapest solution. In other words, all other constraints being met, a lower cost resource is preferably to a higher cost resource. Aspects of optimization routines 324 are further described in FIG. 6 for finding and organizing skills.

Requirements and constraints 326 specify the requirements and constraints for expert services. Requirements and constraints 326 may be established by local and federal law, organizational ethics, or other societal norms and policies. Similarly, requirements and constraints 326 may be adjusted by persons in authority based on the needs and urgency of those needs. For example, during a biological disaster, there may be a requirement that only individuals immunized for small pox be allowed to provide services. Additionally, requirements and constraints 326 may initially suggest that only medical doctors with three or more years of practice will be beneficial for the chaotic event. Requirements and constraints 326 may be adjusted as needed, removed, or replaced with a new looser restraint. Decision makers should be informed about the binding constraints, such as license required.

Requirements and constraints 326 may be dynamically adjusted based on conditions of the disaster. For example, if there is an extreme outbreak of small pox, constraints and requirements 326 may specify that any doctor immunized for smallpox, regardless of experience, would be useful for dealing with the small pox outbreak. Requirements and constraints 326 may be specified by governmental, public health, or business requirements.

Potential skills 328 specify the potential expert skills of individuals that may be available. Potential skills 328 may be generated based on commercial or governmental databases, job sites, research and papers, public licenses, or using a web crawler. For example, OmniFind produced by International Business Machines Corporation.

Enabling resources 330 are the resources that enable qualified experts to perform the required tasks. Enabling resources 330 may be manually generated by experts in each field or may be automatically generated based on past events. Enabling resources 330 may be stored in a database or storage, such as 108 of FIG. 1. For example, if a bomb has partially destroyed a building, a structural engineer may require the use of a concrete X-ray machine to properly perform the tasks that may be required. In another example, a heart surgeon may instruct a general surgeon how to perform specialized procedures using high resolution web-cameras. As a result, enabling resources 330 needs to have access to a data connection, including landlines or wireless communications at a specified bandwidth, and cameras, as well as a sterile location, medical equipment, and personnel to perform the procedure. In yet another example, doctors remotely servicing the outbreak of a virus may require email access to digital pictures taken by medical technicians in the area of the chaotic event.

Optimization routines 324 computes the optimum mix of skills and resources. The answer will consist of the person and/or resources, transportation routes to the disaster site, time of availability, and the shadow price of substituting an alternate resource. Optimization routines 324 specifies alternatives in case an optimum skill and resource is unavailable. As a result, the next most optimal skill and resource may be quickly contacted until the necessary skills and resources are found to manage the chaotic event.

Availability 319 and verify availability 332 determines which experts and resources are available automatically or based on manual input 334. In these examples, manual input 334 may be received as each individual or group responsible for the expert or resource is contacted and terms of availability are checked. Manual inputs 306, 322, and 334 may be submitted via phone, email, or other voice, text, or data recognition system. Alternatively, availability 319 and verify availability 332 may use an automatic message system to contact each expert to determine availability. For example, using pre-collected email addresses for the experts, an automated messaging system may request availability information from experts with the desired skill set. For example, the Centers for Disease Control (CDC) may have a database of experts specifying personal information, for example, addresses, contact information, and inoculation history that may be used to contact required experts and professionals.

Verify availability 332 determines whether the optimized skills and resources are available. Verify availability 332 confirms that the skills and resources selected by event management 302 to manage the chaotic event will in fact be available and may be relied on. For example, a surgical team that is selected by optimization routines 324 as the best fit for an earthquake trauma team may need to be called on the phone to confirm that the surgical team may be flown to the earthquake site in exactly twenty four hours. Once verify availability 332 has determined which experts and resources are available, that information is passed to event management 302.

The process for updating event requirements 318, availability 319, optimization routines 324, and verify availability 332 are repeated iteratively based on information regarding the chaotic event. For example, after an earthquake affecting the San Francisco area, event requirements 318 may be updated every eight hours for two months until all of the required needs and skills have been acquired.

Figure 4:
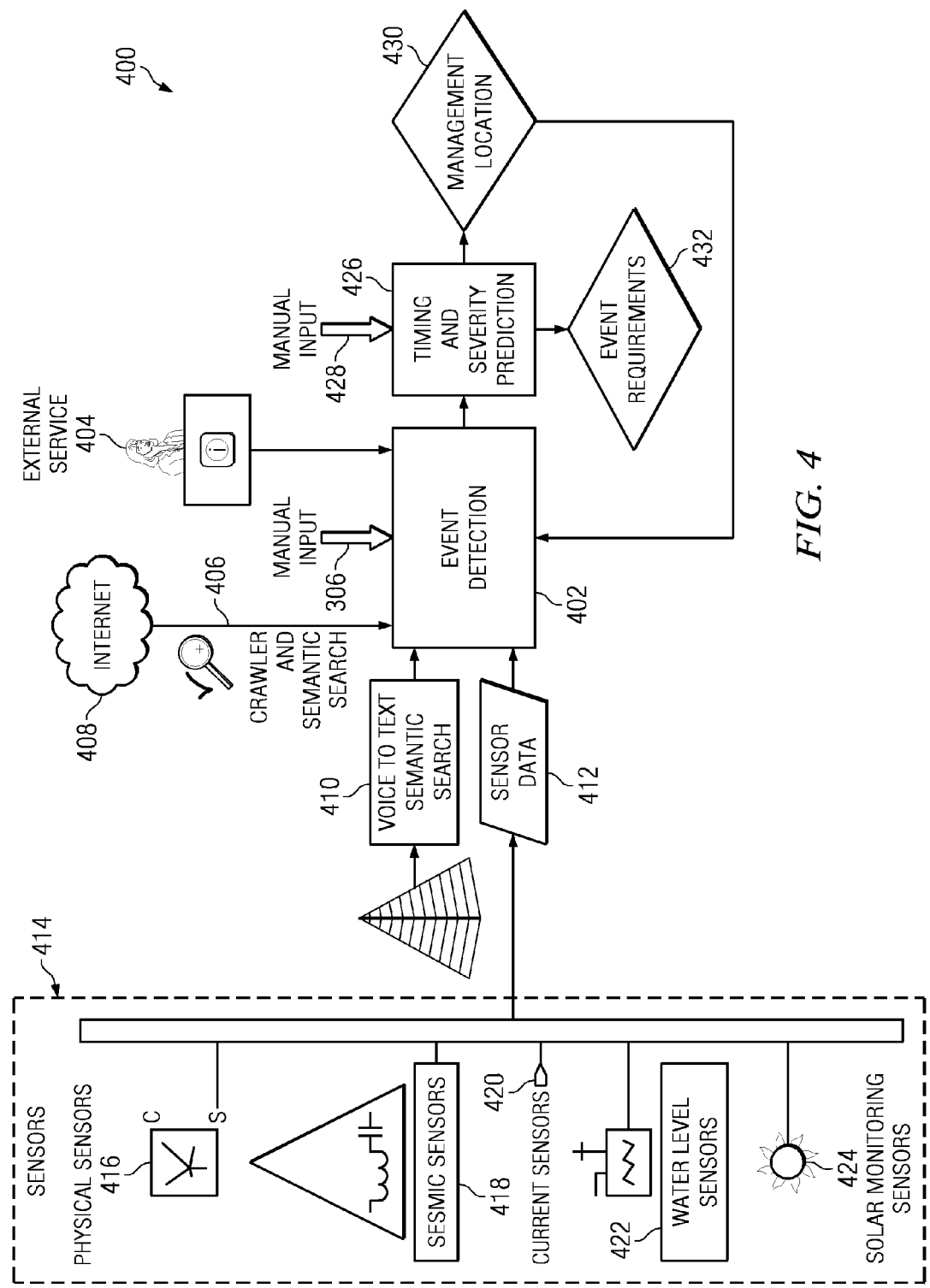
FIG. 4 is a block diagram for detecting chaotic events in accordance with the illustrative embodiments.

FIG. 4 is a block diagram for detecting chaotic events in accordance with the illustrative embodiments. Event detection system 400 may be implemented in an event detection component, such as event detection 304 of FIG. 3. Alternatively, event detection system 400 may be part of an event management module, such as event management 302 of FIG. 3. Event detection system 400 is the system used to detect a potentially chaotic event. Event detection system 400 may determine whether an event is real, and if so, whether the event is significant. For example, an undersea earthquake may or may not be a chaotic event based on location, size of the earthquake, and the potential for a tsunami.

Event detection 402 functions using various techniques and processes to detect a potentially chaotic event. Event detection 402 may become aware of the chaotic event through external service 404. External service 404 may be a government, business, or other organizational monitoring service. For example, external service 404 may include the National Transportation Board, National Weather Service, National Hurricane Service, news wire services, Lloyds of London for loss of ships, the Bloomberg service, or Guy Carpenter insurance database, and other commercial information brokers.

Event detection 402 may also receive manual input 406, such as manual input 306 of FIG. 3 as previously described. Manual input 306 may also be used to verify whether a chaotic event has actually occurred. Crawler and semantic search 406 may be used to access Internet 408. Crawler and semantic search 406 is a web crawler that searches publicly available portions of the Internet for keywords or other indications that a chaotic event has, is, or will occur. A web crawler is a program which browses Internet 408 in a methodical, automated manner. For example, the web crawler may note email traffic, news stores, and other forms of data mining. False alarms are filtered out with heuristic rules and man-in-the-loop functions.

Similarly, voice to text semantic search 410 may be used to identify that a chaotic event has taken place. Voice to text semantic search 410 may use voice to text translations or voice recognition technologies to recognize phrases, keywords, or other indicators of a chaotic event. For example, transmissions across emergency broadcast channels or to emergency services may be analyzed by voice to text semantic search to identify that a reservoir has broken.

Event detection 402 may also receive input from sensor data 412. Sensor data 412 is data, such as sensor data 308 of FIG. 3. Sensor data 412 may be received from sensors 414 which may include physical sensors 416, such as sensors that monitor gaps in bridges, seismic sensors 418 for monitoring seismic activity, current sensors 420 such as current sensors in utility lines for detecting electromagnetic pulses, water level sensors 422, and solar monitoring sensors 424 for indicating solar activity. Sensors 414 are used to automatically pass sensor data 412 indicating a chaotic event to event detection 402. Sensors 414 may also include monitors to indicate total loss of communications via internet or telephone to a given area, absolute volumes coming out of a particular area, spikes or communications jams, failures of cell phone towers, and other occurrences that indicate a chaotic event may have occurred.

Event detection 402 outputs the event detection to timing and severity prediction 426. Timing and severity prediction 426 indicates the known timing and severity of the chaotic event or a predicted time and severity if the chaotic event is anticipated. Timing and severity prediction 426 may receive information via manual input 428. For example, a scientist measuring seismic activity may send data and visual information regarding the eruption of a volcano to indicate the severity of the event. Timing and severity prediction 426 passes the information regarding time and severity to management location 430. Management location 430 is a location management module, such as management location 310 of FIG. 3.

Timing and severity prediction 426 passes information about the chaotic event to event requirements 432. Timing and severity prediction 426 predicts the severity of the chaotic event in addition to what skills and resources may be needed as well as the quantities of skills and resources. Event requirements 432 is an event specific module, such as event requirements 318 of FIG. 3. For example, if an unusually powerful solar flare is expected, communications and satellite coordinators and experts may be required to prevent effects of the solar flare or to recover from the effects after the event.

Figure 5:
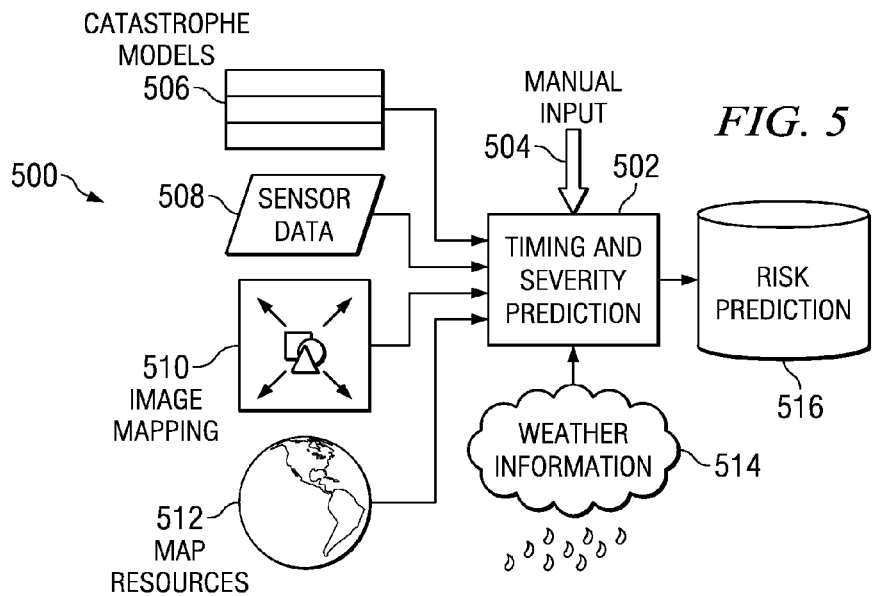
FIG. 5 is a block diagram for predicting severity of chaotic events in accordance with the illustrative embodiments.

FIG. 5 is a block diagram for predicting severity of chaotic events in accordance with the illustrative embodiments. Timing and severity prediction system 500 is a more detailed description of timing and severity prediction 426 of FIG. 4. As previously described, timing and severity prediction 502 receives manual input 504.

Timing and severity prediction 502 receives information from catastrophe models 506. Catastrophe models 506 are models of each possible chaotic event by region and the resulting affects and consequences of the chaotic event. Catastrophe models 506 are preferably created by scientists and other experts before the occurrence of the chaotic event. For example, catastrophe models 506 may model the effects of a category five hurricane striking South Carolina.

Sensor data 508 is data, such as sensor data 308 of FIG. 3. Additional information resources including, for example, image mapping 510, map resources 512 and weather information 514 may be used by timing and severity prediction 502 to determine the severity of the chaotic event. For example, image mapping 510 may show the impact crater of a meteor. Map resources 512 may be used to determine the number of buildings destroyed by a tornado. Weather information 514 may be used to show whether a hurricane is ongoing or whether recovery efforts may begin. Weather information 514 includes forecast models rather than raw data.

Timing and severity prediction 502 uses all available information to make risk prediction 516. Risk prediction 516 specifies the risks associated with the chaotic event. For example, risk prediction 516 may predict the dangers of a magnitude 7.4 earthquake in St. Louis before or after the earthquake has occurred.

Figure 6:
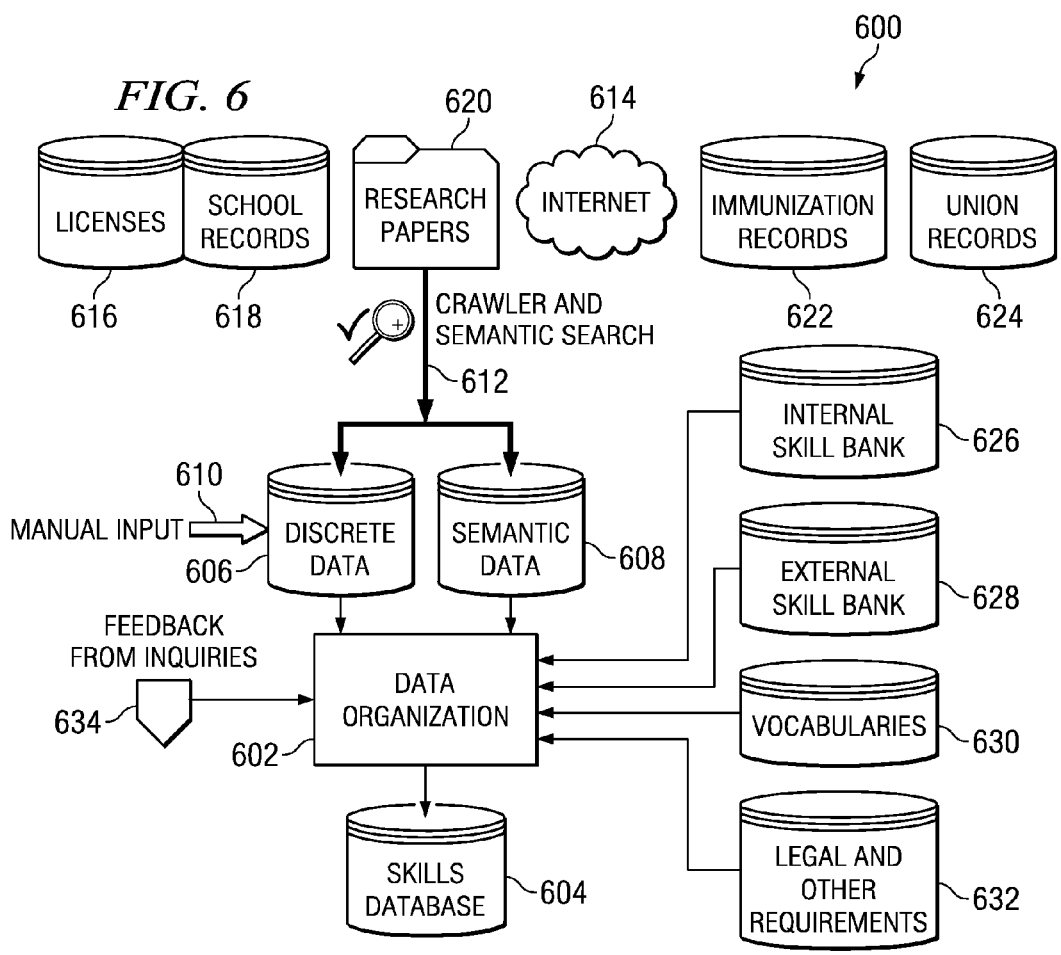
FIG. 6 is a block diagram for finding and organizing skills for chaotic events in accordance with the illustrative embodiments.

FIG. 6 is a block diagram for finding and organizing skills for chaotic events in accordance with the illustrative embodiments. Organization system 600 is a system that helps find expert skills or potentially available skills. Data is collected and organized by data organization 602 to populate skills database 604. Skills database 604 is a unified database of skills and supporting data in discrete and textual form. For example, skills database 604 may be implemented in event type skills 320 of FIG. 3. The data organized by data organization 602 may be physically instantiated or federated. In other words, the data may be actually copied into a database used by data organization 602 or accessed through a query through a federated database. Federated databases may allow access to data that is not easily transferred but provides useful information.

Data organization 602 organizes data from any number of sources as herein described. Data is received from discrete data 606 and semantic data 608. Discrete data 606 is something that may be entered in a database, such as numbers or specific words. Semantic data has to be read in context. A pathology report may be broken up into discrete data 606 including temperature, alive or dead. Manual input 610 may be communicated to discrete data 606. Data organization 602 may use queries for discrete and semantic data to find necessary information.

Web crawler and semantic search referred to as crawler and semantic search 612 may be used to gather data from any number of sources on Internet 614 that are publicly available. Crawler and semantic search 612 may be, Webfountain™, produced by International Business Machines Corporation or other similar products. For example, crawler and semantic search 612 may search licenses 616, school records 618, research papers 620, immunization records 622, organizational records, and union records 624. For example, crawler and semantic search 612 may discover a large number of doctors that have graduated from medical school but do not have licenses in the state where the chaotic event occurred.

Data organization 602 may further access internal skill bank 626, external skill bank 628, vocabularies 630, and legal and other requirements 632. Internal skill bank 626 is a skill bank maintained by data organization 602 in the event of a chaotic event. External skill bank 628 may be a skill bank maintained by an outside organization or individual. External skill bank 628 may be intended for emergency situations or may simply be a skill bank for organizing relevant skill sets in other business, government, or miscellaneous settings.

Feedback from inquiries 634 specifies whether an individual is available and that another individual should be considered. For example, a drilling engineer may disclose unavailability to assist with a mine collapse.

Figure 7:
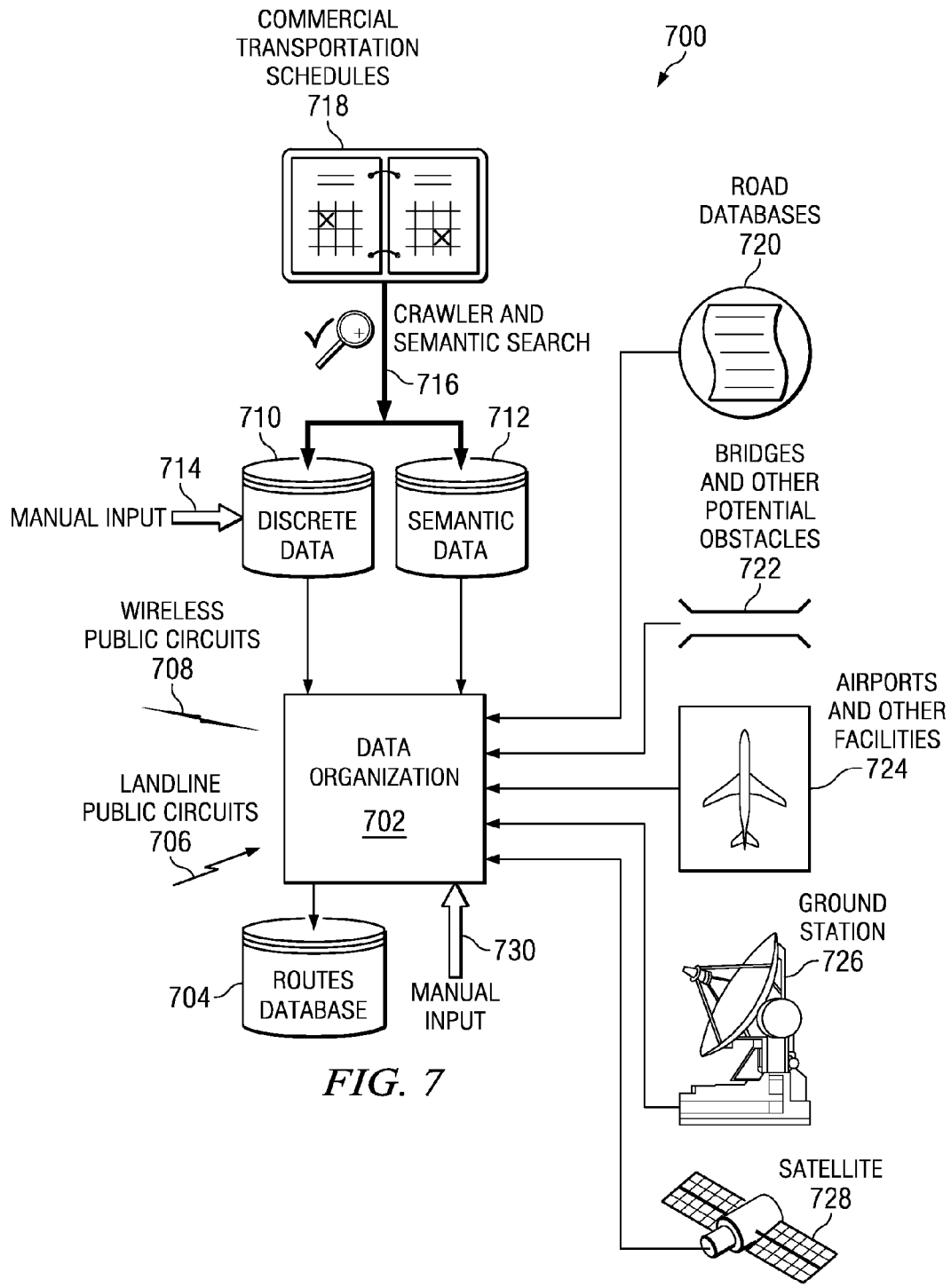
FIG. 7 is a block diagram for finding and organizing routes for chaotic events in accordance with the illustrative embodiments.

FIG. 7 is a block diagram for finding and organizing routes for chaotic events in accordance with the illustrative embodiments. Route system 700 may be implemented in optimization routine modules, such as optimization routines 324 of FIG. 3. Route system 700 is used to optimize available skills and resources based on distance, traveling time, capacity of a route, cost, and value as prioritized by decision makers from event management 302 of FIG. 3. Route system 700 performs optimizations based on questions which may include how far away the skills or resources are, how long the skills or resources take to get to the necessary location, and what the capacity is. For example, a truck may have a high capacity to move a team of surgeons if a road is available, but may take eight hours to get to a desired location. A helicopter may be used to quickly move a nuclear engineer regardless of road conditions. Route system 700 may be used to perform optimizations based on event requirements 318 of FIG. 3.

Data organization 702 organizes information from various resources, and that information is passed to routes database 704. Routes database 704 is a unified database of physical and electronic routes including distances and capacity for expert skills and resources and limiting constraints. Constraints for routes may include availability, volume, cost, capacity, bytes, flights per hour, and trucks per day. Routes database 704 may be used by availability components, such as availability 332 of FIG. 3 to determine whether expert skills and resources are feasibly accessible by a route either physically or electronically even if they are available.

Data organization 702 receives information from landline public circuits 706. Landline public circuits 706 may include communications lines, such as telephones, fiber-optics, data lines, and other physical means for transporting data and information. Data organization 702 also receives information from wireless public circuits 708 which may include wireless access points, cell phone communications, and other publicly available wireless networks.

Data is received from discrete data 710 and semantic data 712. Manual input 714 may be communicated to discrete data 710. Crawler and semantic search 716 may be used to gather data from any number of sources. For example, crawler and semantic search 716 may search commercial transportation schedules 718 to find tractor trailers, busses, airlines, trains, boats, and other means of commercially available means of transporting people and resources.

Data organization 702 may receive information from road databases 720 for determining which roads may be used to access the geographic region of the chaotic event. Road databases 720 may also specify which roads are accessible after the chaotic event. For example, after an earthquake in Salt Lake City, Interstate 15 may not be available because of overpass collapses.

Data organization 702 may also receive information from bridges and other potential obstacles 722. Airports and other facilities 724 may provide additional information regarding airports and other similar facilities including status and capacity, such as train stations, docks, and other transportation hubs. For example, a data network may be available but only with low bandwidth access.

Data organization 702 also receives information from ground station 726. Ground station 726 is a station located on the earth that is used for transmitting information to or receiving information from satellite 728 or other earth orbiting communication devices. For example, information regarding ground station 726 and satellite 728 may specify capacity, capability, data rates, and availability. Ground station 726 and satellite 728 may be used by individuals with expert skills or resources to coordinate the response to the chaotic event. For example, in the event that medical images need to be sent from rural Idaho to New York City, ground station 726 and satellite 728 may need to have available bandwidth. Data organization 702 may also receive information in the form of manual input 730.

FIG. 8 is a flowchart for managing expert resources during times of chaos in accordance with the illustrative embodiments. The process of FIG. 8 may be implemented by an event management system, such as event management system 300 of FIG. 3. In one example, the process of FIG. 8 is implemented by a program application that systematically walks one or more decision makers through the steps and decisions that need to occur to effectively manage the chaotic event. The program application systematically helps the decision make, develop, and implement a strategy for the chaotic event in a logical sequence based on predefined steps and priorities.

The process of FIG. 8 begins by detecting a chaotic event (step 802). The event may be detected by a module, such as event detection 304 of FIG. 3 and event detection system 400 of FIG. 4.

Next, the process selects an event management location and begins active management (step 804). Step 804 may be performed by a module, such as event management 302 of FIG. 3. The determination regarding event management location may be made based on feedback from a module, such as management location 310 of FIG. 3. Active management in step 804 may involve managing the situation by deploying personnel with expert skills and resources and coordinating relevant communication and recovery efforts.

Next, the process predicts severity and timing of the chaotic event, and the expert resources required (step 806). Step 806 may be implemented by a module, such as event requirements 318 of FIG. 3 and timing and severity prediction system 500 of FIG. 5. If the chaotic event is particularly severe, additional expert skills and resources may be required. Expert skills may be further determined using a module, such as organization system 600 of FIG. 6. For example, if a tsunami occurs off the western coast of the United States, a large number of doctors and water contamination specialists may be required.

Next, the process verifies the availability and cost of the expert resources (step 807). The process of step 807 may be implemented by a module, such as availability 319 of FIG. 3. Step 807 ensures that only potentially available resources are examined to save time, effort, and processing power.

Next, the process optimizes the expert resources (step 808). The process of step 808 may be performed by optimization routines, such as optimization routines 324 of FIG. 3. The expert resources may be optimized based on factors, such as requirements and constraints 326, potential skills 328, and enabling resources 330 of FIG. 3.

Next, the process confirms the availability of the expert resources by direct contact (step 810). The process of step 810 may be implemented by a module, such as verify availability 332 of FIG. 3. Availability may be based on the schedule, time, and commitments of individual experts or groups of experts. Availability may also be determined based on routes for communicating and transporting skills and resources based on a system, such as route system 700 of FIG. 7.

Next, the process determines whether the expert resources are available (step 812). The determination of step 812 may be based on transportation, cost, proximity, schedule, and time. For example, if the cost of flying a surgeon from Alaska to New York is impractical, the process may need to re-optimize the expert resources. If the expert resources are available, the process returns to step 806. The process of steps 806-812 is repeated iteratively to optimize and re-optimize the active management of the response to the chaotic event in step 804.

As a result, the management of the chaotic event is dynamic and adapts to changing circumstances. For example, if flooding from a hurricane washes out roads that were previously used to access staging areas, new routes for medical personnel and supplies needs to be determined in a step, such as step 810. In addition, water contamination experts and water testing equipment may be required in greater numbers for a category five hurricane than for a category two hurricane.

If the process determines the expert sources are not available in step 812, the process optimizes expert resources (step 808). In other words, optimized expert resources are further re-optimized based on confirmed availability in step 812. As a result, the decision makers or event managers may deploy the most appropriate resources to effectively manage each aspect of the chaotic event.

Thus, illustrative embodiments provide a system, method and computer usable program code for managing a chaotic event. By detecting chaotic events as soon as possible, effective management of expert skills and resources may be quickly and efficiently managed. By effectively optimizing expert skills and available routes based on availability, severity of the chaotic event, and other resulting factors, lives may be saved, and recovery efforts and the appropriate response may begin more effectively.

IV. Optimized Selection of Sub-Projects

This section, Section IV, describes a method for mathematically rigorous optimized selection of project subdivisions using data and requirements subject to multidimensional constraints. This section is shown with respect to the optimized selection of sub-projects for a major information technology project. The following section, Section V, describes the application of this optimized selection technology to the area of chaotic event management.

IV.1 Background of Optimized Selection of Sub-Projects

Large corporations or other large entities use information technology systems to manage their operations. An information technology system is a system of data processing systems, applications, data, reports, flows, algorithms, databases, and other infrastructure used to maintain the data and operations of the organization. A large scale information technology system is not necessarily located in one single physical location, but can be situated in many different physical sites implemented using numerous physical devices and software components. A large scale information technology system can be referred to as a major information technology system.

Major information technology system projects, such as those used by large corporations, often fail and some fail disastrously. Failure often costs millions of dollars, tens of millions of dollars, or even more in wasted time, manpower, and physical resources. Thus, substantial effort is usually exerted in planning the construction of a major information technology system. Planning construction of a major information technology system, at least in theory, reduces the chances of failure.

Major information technology systems projects are beyond the abilities of a single individual to implement alone. Likewise, construction of major information technology system projects can not be viewed as a single monolithic project due to the vastness and complexity of these system projects. Thus, major information technology system projects are often constructed in phases using groups of sub-projects. Various groups of people work to complete each sub-project. As work progresses, the sub-projects are assimilated together in order to create the major information technology system project.

However, even with planning and the use of sub-projects, most major information technology system projects fail or are never completed. Even if the major information technology system project is implemented, the resulting major information technology system project does not function optimally with respect to maximizing the efficiency of the organization for which the major information technology system project is constructed. For example, subsets of the whole major information technology system project may not match data, business requirements, and/or resources in an optional manner. As a result, the organization suffers from the inefficiencies of the final major information technology system project. Correcting or adjusting these inefficiencies may be cost prohibitive due to the fundamental nature of how the major information technology system project was constructed.

The most typical reason for failure or inefficiency of these system projects is that the construction of these system projects is approached from a non-data centric viewpoint. Instead, design of sub-projects of major information technology system projects often is performed by managers, executives, or others who are experts at understanding where a business should go or how a business should operate, but are not technically proficient at implementing or constructing a major information technology system project. As a result, the sub-projects "look good on paper" but, when implemented, fail or, if successful individually, can not be integrated together in a desired manner. An entire major information technology system project may fail or be inefficient if sub-projects that were designed to build the major information technology system projects can not be integrated. Currently available methods and system projects do not provide a means to reliably create efficient major information technology system projects. Therefore, it would be advantageous to have an improved method and apparatus for creating optimized sub-projects useful for creating and implementing a major information technology project.

IV.2 Optimized Selection of Sub-Projects for a Major Information Technology Project: Definitions and Examples A computer-implemented method, computer program product, and data processing system are provided for creating an optimized major information technology project having optimally selected optimized sub-projects. An optimized sub-project is a set of data representing a portion of the project. For example, an optimized sub-project could be a set of data that describes how physical data processing systems should be setup relative to each other. Another example of an optimized sub-project could be a set of data that describes how business reports should be generated, what information should be included in the business reports, who should receive the business reports and the order in which the business reports should be generated. Many other examples of optimized sub-projects exist.

As part of an exemplary process, one or more data processing systems receive boundary conditions, input regarding output objects, and input regarding "as-is" data sources. An "as-is" data source is an existing data source. Boundary conditions include all data that places one or more boundaries on a project. Examples of boundary conditions include resource data and constraint data. Resource data reflects resources available for the project, such as money and manpower. Constraint data includes constraints imposed on the project, such as data reflecting deadlines, legal requirements, data availability, and others. A special type of constraint data is data regarding political concerns. Data reflecting political concerns includes data that reflects political realities, such as resource allocation among organizational departments, timing of deliverables, and work allocation.

Examples of input regarding output objects include data reflective of output objects. Output objects are those outputs or deliverables that the project is designed to deliver. Specific examples of output objects include screens showing particular information, pictures, or query results; interactive graphical user interfaces; reports; services delivered, including deliverables; applications; queries; applications, flows, and algorithms; combinations thereof, and others.

Data regarding "as-is" data sources is data reflective of available data sources. Examples of "as-is" data sources can include available databases, available files, available hardcopy paper files, and other data sources. An "as-is" data source is not a data source that is yet to be developed or that is yet to be placed into a desired form. An "as-is" data source is distinguished from a "to be" data source. A "to be" data source is a data source that is not yet in existence or is not yet in a desired form, but that has been modeled or can be modeled.

Once the boundary conditions, input regarding output objects, and input regarding "as-is" data sources are received, the output objects are decomposed into data objects. A data object is a data structure that contains data reflective of an output object. A data object can be an "object" as that term is used in object-oriented programming for computer languages such as C++ and Java.

The term "decompose," which also includes the concept of factoring in computer science, refers to the process by which a complex problem or system is broken down into parts that are easier to conceive, understand, program, and maintain. In structured programming, algorithmic decomposition breaks a process down into well-defined steps. In object-oriented programming, one breaks a large system down into progressively smaller classes or objects that are responsible for some part of the problem domain. An object, process, data, or flow can be "decomposed" in a mathematical, data-centric manner according to many known methods.

Additionally, the output objects are also decomposed into process data objects, which are data objects reflective of logical processes used to create the output objects. A logical process used to create an output object can be any application, flow, algorithm, or similar process for creating an output object. Such flows can also be characterized as "objects" as that term is used in object-oriented programming.

The illustrative examples also include determining value clusters. A value cluster is the discrete intersection of data and that data's ability to add value to an organization. A value cluster may also be considered a group of resources that, when taken together, support one or more output objects having a utility value to an organization. A value cluster may be considered one of a data value cluster and a process value cluster. A data value cluster includes one or more data sources that support one or more data objects. A process value cluster includes one or more logical processes that support one or more output objects.

Next, the data objects are organized into "to be" data structures to form a "to be" data model and the "to be" data structures are mapped to the "as-is" data sources. The phrase "to be", as used herein, describes something that is desired for the major information technology project that may, or may not, yet exist. The phrase "to be" also can be referred to as "future" or "future model." Thus, a "to be" data model is a model or other description of a future data model. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Continuing with the illustrative example, the "to be" data structures are mapped to the "as-is" data sources. An "as-is" data source is an existing source of data. The existing source of data may not be complete, may not be of sufficient quality, and may not be in a format desired for the completed project; nevertheless, the "as-is" data sources may be adequate for the completed project.

Next, additional processes are determined for moving data from a source to a target. For example, a process can be determined for summarizing raw patient data and turning that raw patient data into a report for a hospital executive or for a doctor. Additionally, transformation issues are incorporated into the processes, such as estimating the costs and risks of moving data from a source to a destination in the correct format.

The exemplary embodiment also includes creating an affinity matrix based on the value clusters. An affinity matrix is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

Optimization, as used herein, is the mathematical study of problems in which a minimum or a maximum for a function of a real variable is sought by systematically choosing the values of the real number or integer variables from within an allowed set. The problem can be mathematically represented as follows:

Given: A function f: A-R from some set A to the real numbers. Sought: An element $x_0$ in A such that $f(x_0) \leq f(x)$ for all x in A ("minimization") or such that $f(x_0) \geq f(x)$ for all x in A ("maximization").

Typically, A is some subset of the Euclidean space Rn, often specified by a set of constraints, equalities or inequalities that the members of A have to satisfy. The elements of A are called feasible solutions. The function f is called an objective function, or cost function. A feasible solution that minimizes or maximizes the objective function is called an optimal solution. The domain A of f is called the search space, while the elements of A are called candidate solutions or feasible solutions.

Generally, when the feasible region or the objective function of the problem does not present convexity, there may be several local minima and maxima, where a local minimum x* is defined as a point for which there exists some δ>0 so that for all x such that $$\|x-x^*\| \leq \delta;$$

the expression $$f(x^*) \leq f(x)$$

holds. In other words on some region around x* all of the function values are greater than or equal to the value at that point. Local maxima are defined similarly.

Commercial optimization engines are available and can be used with the illustrative examples described herein. Examples of commercial optimization engines include Optimization Subroutine Library and MPSX (Mathematical Programming System Extended), both available from International Business Machines Corporation, ILOG Cplex, and GLPK (Gnu Linear Programming Kit). Thus, as defined herein, the term "optimized sub-project" refers to a mathematically defined data structure that describes the structure of a sub-project and steps to be taken to implement a sub-project of a major project. Accordingly, described differently, the exemplary processes described herein provide a computer implemented method, apparatus, and computer usable program code for generating optimized sub-projects based on a weighted value of desired outputs mapped against source data, required transformations, boundaries, and an affinity matrix.

The project sought to be constructed using the illustrative embodiments described herein can be any large project. Examples of other large projects suitable for the planning techniques described herein include government agencies, outer-space programs, major military operations, and other major projects. However, the non-limiting embodiments described herein provide an illustrative example of creating a major information technology project.

Taken together, the group of optimized sub-projects can be assimilated into a plan an organization can follow to build the most efficient project plan possible. Because the plan is data-centric, an efficient major information technology project can be constructed even if the major information technology project is very large and complex.

Figure 31:
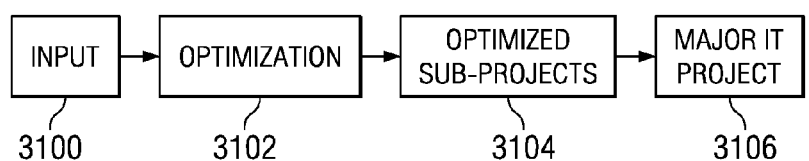
FIG. 31 is a block diagram illustrating a computer-implemented method of creating optimized sub-projects for a major information technology project, in accordance with an illustrative embodiment.
Figure 32:
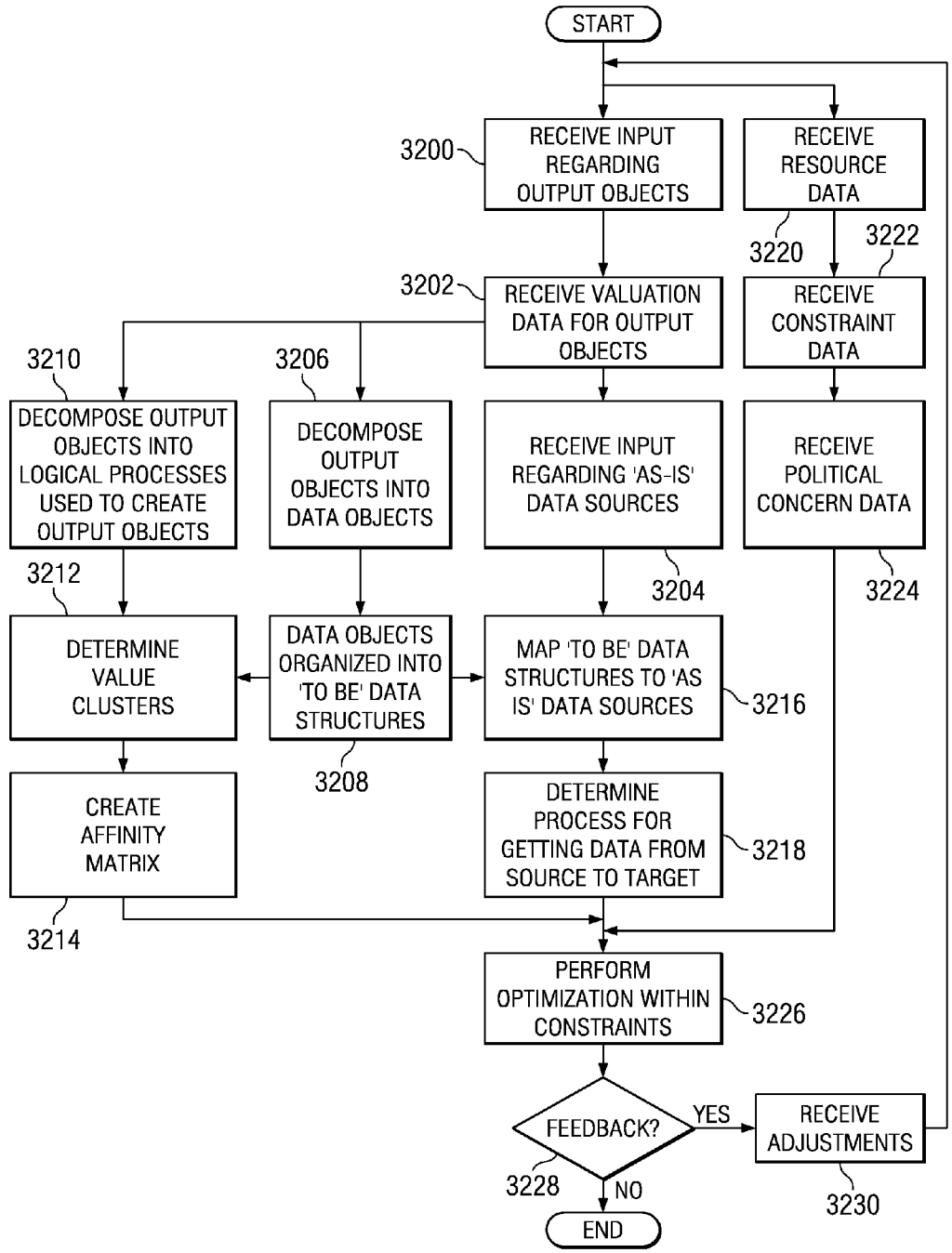
FIG. 32 is a flowchart illustrating a computer-implemented method of creating optimized sub-projects for a major information technology project, in accordance with an illustrative embodiment.

IV.3 Mathematically Optimized Selection of Subprojects for Major Information Technology Projects The following figures describe in detail the problem to be solved, the inadequacies of the prior art, and examples of the solution to the problem to be solved. FIG. 9 through FIG. 12 describe the problem to be solved and the inadequacies of the prior art. FIG. 13 through FIG. 15 illustrate a summary of an illustrative embodiment for solving the problem described in FIG. 9 through FIG. 12. FIG. 16 through FIG. 30 provide a detailed description of the devices and methods useful for implementing the illustrative embodiments described herein. FIG. 31 provides another overview of an illustrative embodiment for solving the problem of planning a project. FIG. 32 is a flowchart illustrating an illustrative embodiment of planning a major information technology project.

As specified above, FIG. 9 through FIG. 12 describe the problem to be solved and the inadequacies of the prior art. Common reference numerals used in different figures correspond to each other. Thus, for example, major information technology project 902 is the same in FIG. 9, FIG. 10, FIG. 11, and FIG. 12.

Referring now to the particular figures, FIG. 9 is a block diagram illustrating a major information technology project, in accordance with an illustrative embodiment. An organization has organizational goal 900 that the organization desires to implement. The goal may be to create a hospital system, a new government agency, a new major corporation, or any other goal. In the illustrative embodiments described herein, organizational goal 900 is a large scale goal similar to those described in the previous examples.

As part of organizational goal 900, major information technology project 902 is to be implemented to create a large scale information technology system project. An information technology system project is a system of data processing systems, applications, data, reports, flows, algorithms, databases, and other infrastructure used to maintain the data and operations of the organization. A large scale information technology system project is not necessarily located in one single physical location, but can be situated in many different physical sites implemented using numerous physical devices and software components. A large scale information technology system project can be referred to as a major information technology system project.

Major information technology project 902 has as goals one or more output objects. Output objects are those outputs or deliverables that the project is designed to deliver. Specific examples of output objects include report 904, report 906, application 908, application 910, screen 912, and screen 914.

A report is any type of output of a query or process. For example, a report could be a list of the number of patients having a particular set of properties. A report could also be a quarterly financial statement or any other type of report as that word is commonly known in business.

An application is any type of software application. An application can also be a script, flow, or other process that can be implemented in a computer.

A screen can be any graphical user output of an application. A screen can be a graphical user interface adapted to accept user input. For example, a screen could be a graphical user interface adapted to accept a query for a database, or a screen could be a graphical user interface adapted to accept data for entry into a database. A screen can also display a report.

Although major information technology project 902 is expressed as having output objects 904, 906, 908, 910, 912, and 914, many other types of output objects could also exist. For example, other types of output objects could be application, database, data cube, data structure, flat file of data, a graph, a directed graph, a project plan, an automated control system, a virtual reality visualization, a printed report, an on-screen representation of a printed report, a Web page, an email, an XML (Extended Markup Language) data structure, a document, a submission for an organization such as a government agency (like a FDA submission), an alert, a natural language representation of data, and a notification list. Other types of output objects exist.

Figure 10:
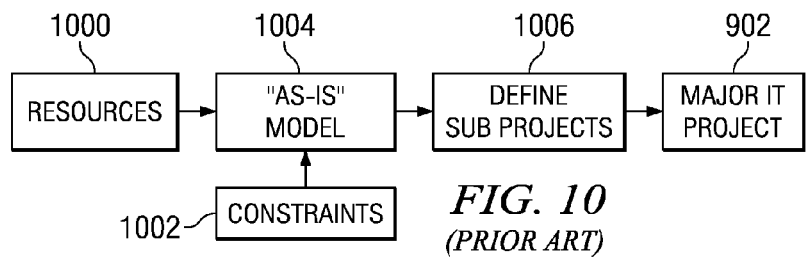
FIG. 10 is a block diagram of a prior art method of constructing a major information technology project.

FIG. 10 is a block diagram of a prior art method of constructing a major information technology project. The method shown in FIG. 10 can be implemented in one or more data processing systems, such as data processing systems 104, 106, 110, 112, and 114 in FIG. 1 or data processing system 200 shown in FIG. 2. The method shown in FIG. 10 can be implemented among multiple computers over a network, such as network 102 shown in FIG. 1.

Once an organization has specified organization goal 900 and the output objects desired for major information technology project 902 of FIG. 9, the organization then has to cause major information technology project 902 to be created. In the prior art, the process of implementing major information technology project 902 is performed in a "left to right" manner.

Figure 27:
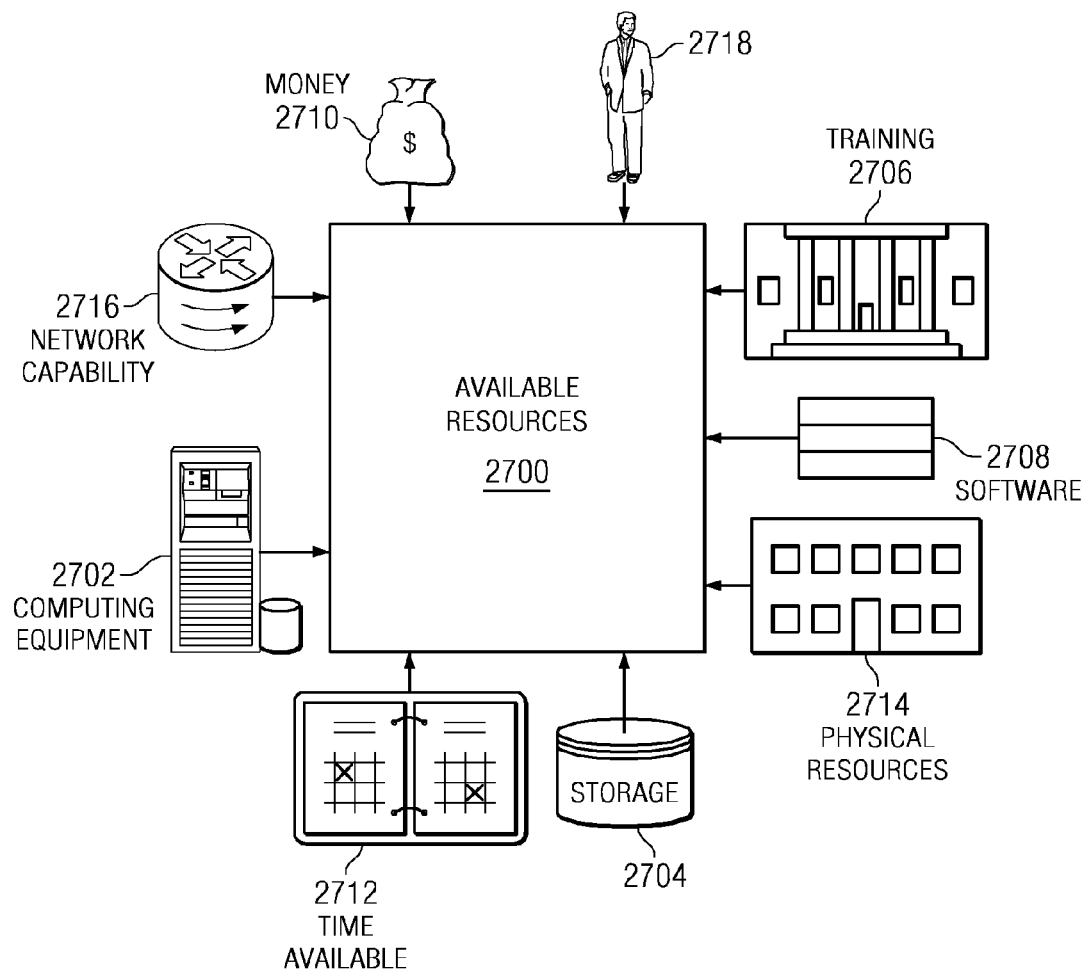
FIG. 27 is a block diagram illustrating exemplary available resources, in accordance with an illustrative embodiment.
Figure 28:
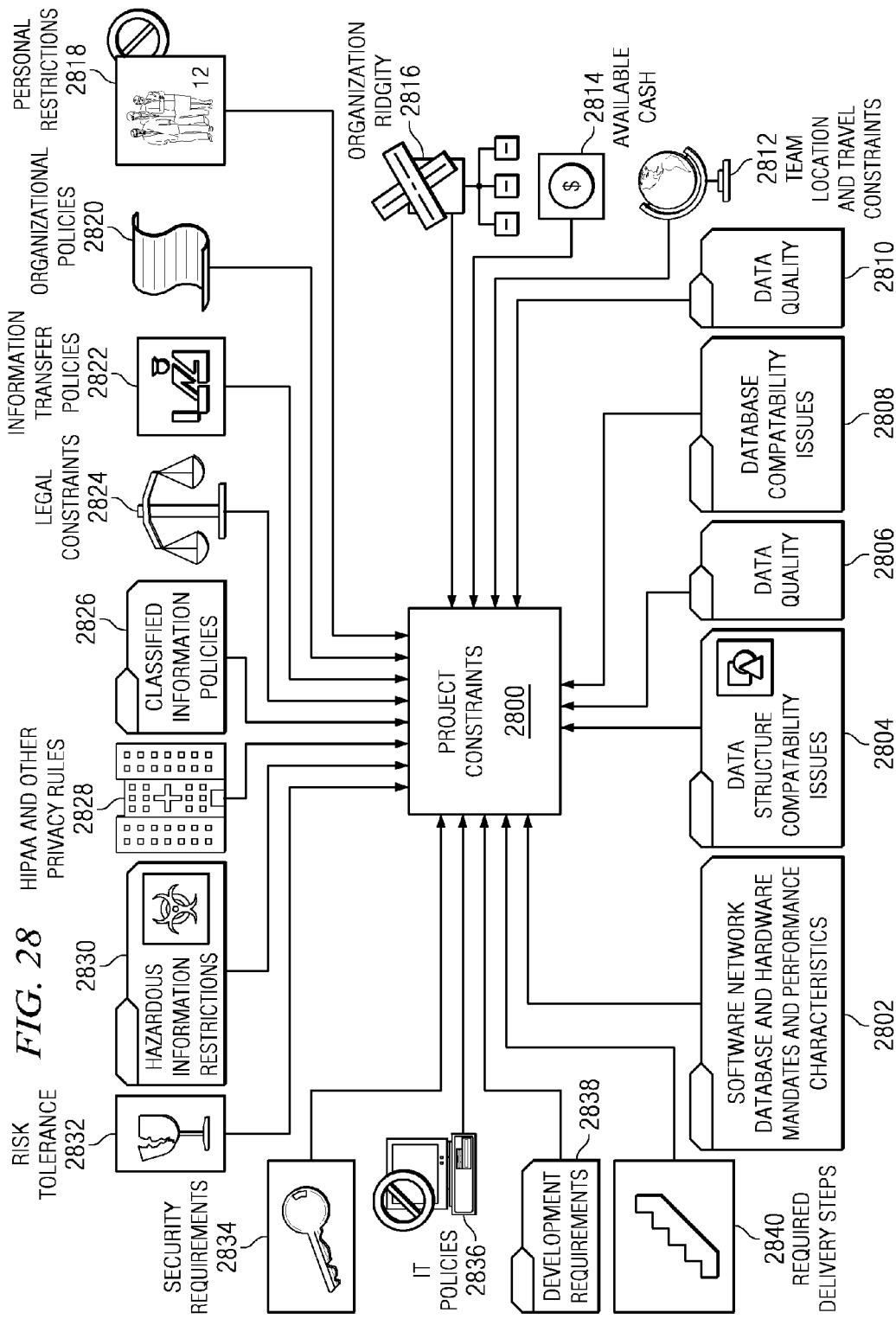
FIG. 28 is a block diagram illustrating exemplary project constraints, in accordance with an illustrative embodiment.

Specifically, one or more individuals identify all resources available 1000 to the organization for major information technology project 902. Examples of resources are shown in FIG. 27, though can include items such as money, manpower, existing databases, existing software, and the like. Similarly, one or more individuals identify all constraints 1002 imposed on the organization for major information technology project 1002. Examples of constraints are shown in FIG. 28, though can include items such as legal constraints, security requirements, time constraints, and the like.

Resources 1000 and constraints 1000 are fed into "as-is" model 1004. An "as-is" model describes all of the identified resources available to major information technology project 902 and all of the identified constraints imposed on major information technology project 902. Thus, an "as-is" model can be referred to as an existing model that describes existing resources. An "as-is" model can be reflected in a database or some other computer readable format; however, often "as-is" model 1004 is an ad-hoc report used by individuals to manually define subprojects 1006. Thus, one or more individuals and/or one or more computer programs define subprojects 1006. The sub-projects are then individually executed in a specified order, some of which are performed in parallel, to implement major information technology project 902.

Figure 11:
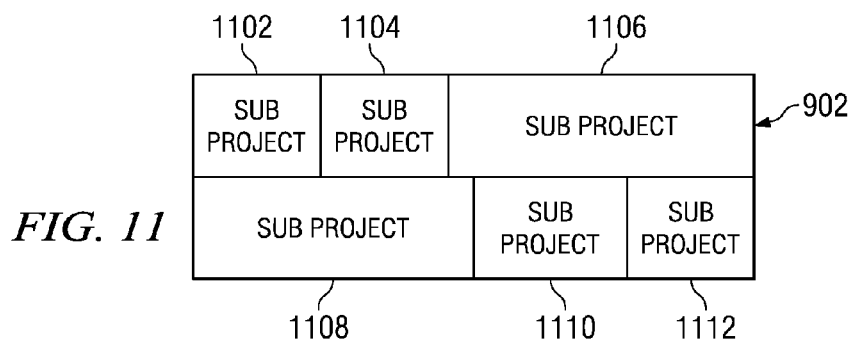
FIG. 11 is a block diagram of a set of sub-projects created using the prior art method shown in FIG. 10.

FIG. 11 is a block diagram of a set of sub-projects created using the prior art method shown in FIG. 10. As a result of performing the step of "define sub-projects" 1006 in FIG. 10, major information technology project 902 is divided up into sub-projects as shown. In the illustrative example of FIG. 11, major information technology project 902 includes six sub-projects; sub-project 1102, sub-project 1104, sub-project 1106, sub-project 1108, sub-project 1110, and sub-project 1112. Each sub-project is shown as having various different areas on the figure in order to show that each sub-project can have a different scale in terms of difficulty, size, or some other parameter. Most sub-projects are performed in a particular order, though some sub-projects could be performed in parallel.

Each sub-project reflects a particular aspect of building major information technology project 902. In a non-limiting example, each sub-project has a particular purpose described as follows. Sub-project 1102 is a sub-project to implement the physical machinery and wiring used to implement major information technology project 902. Sub-project 1104 is a project to create a new database used in major information technology project 902. Sub-project 1106 is a project to create a new software application useful for performing temporal analysis on data. Sub-project 1108 is a project to convert existing data to a new format. Sub-project 1110 is a project to create a graphical user interface for interacting with the database to be defined in sub-project 1104. Sub-project 1112 is a project to develop a second database.

Although sub-projects 1102 through 1112 are described in terms of specific examples, many other types of sub-projects exit. Additionally, major information technology project 902 can include more or fewer sub-projects. Most major information technology project 902 would have many more sub-projects. Moreover, sub-projects 1102 through 1112 could each include one or more smaller sub-projects. Each smaller sub-project is used to plan construction of the corresponding larger sub-project. Conceivably, smaller sub-projects could also include deeper levels of sub-projects.

Figure 12:
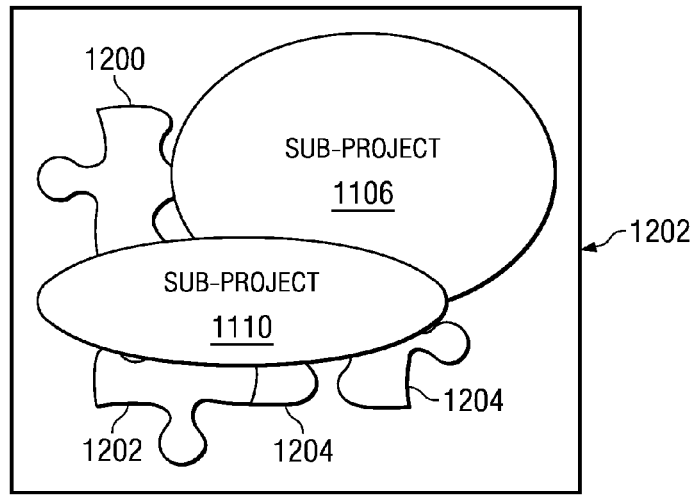
FIG. 12 is a block diagram illustrating major information technology sub-projects that inefficiently overlap underlying realities of existing information technology systems as a result of the prior art method shown in FIG. 10.

FIG. 12 is a block diagram illustrating major information technology sub-projects that inefficiently overlap underlying realities of existing information technology systems as a result of the prior art method shown in FIG. 10. As stated previously, the prior art method show in FIG. 10 of generating sub-projects for major information technology project 902 is unsatisfactory. The prior art method shown in FIG. 10 is unsatisfactory because the prior art method often results in total failure of major information technology project 902 or results in a final major information technology project that has unacceptable inefficiencies.

The cause of this result is illustrated in FIG. 12. In broad terms, the prior art method shown in FIG. 10 does not take into account the underlying technical realities of existing systems in "as-is" model 1004. In other words, the prior art method shown in FIG. 10 is not data centric. A method of creating a major information technology project is data centric when the method is based on empirical data, even if the empirical data includes subjective considerations that have been reduced to data models.

For example, major information technology project 902 shows sub-project 1106 and sub-project 1110 as defined according to the method shown in FIG. 10. However, each of sub-project 1106 and sub-project 1110 overlap multiple "as-is" conceptual objects. An "as-is" conceptual object is some underlying physical information technology-related thing. An "as-is" conceptual object can be an existing conceptual object. For example, sub-project 1110 overlaps all three of "as-is" data structure 1200, "as-is" data structure 1202, and "as-is" data structure 1204. Similarly, sub-project 1106 overlaps both "as-is" data structure 1200 and "as-is" data structure 1204. Although blocks 1200, 1202, and 1204 are characterized as "as-is" data structures, one or more of these blocks could be replaced with "as-is" applications, databases, physical hardware, or other "as-is" conceptual objects.

The overlap of sub-projects to multiple "as-is" conceptual objects shown in FIG. 12 illustrates why the prior art method shown in FIG. 10 often fails. Because sub-projects are designed without taking into account the underlying "as-is" conceptual objects, work on sub-projects proceeds without having all pertinent information. Those working on sub-project 1106 do not appreciate that "as-is" data structure 1200 will impact construction of both sub-project 1106 and sub-project 1110. As a result, duplicative effort may take place, resulting in possibly gross inefficiency. Alternatively, "as-is" data structure is not modified to handle the workload imposed by both sub-project 1106 and sub-project 1110, resulting in failure of both projects.

As stated above, FIG. 13 through FIG. 15 illustrate a summary of an illustrative embodiment for solving the problem described in FIG. 9 through FIG. 12. Common reference numerals used in different figures correspond to each other. Thus, for example, major information technology project 902 is the same in FIG. 9 through FIG. 15.

In particular, FIG. 13 is a block diagram illustrating a computer-implemented method of creating optimized sub-projects for a major information technology project, in accordance with an illustrative embodiment. The method shown in FIG. 13 can be implemented in one or more data processing systems, such as data processing systems 104, 106, 110, 112, and 114 in FIG. 1 or data processing system 200 shown in FIG. 2. The method shown in FIG. 13 can be implemented among multiple computers over a network, such as network 102 shown in FIG. 1.

FIG. 13 illustrates a counter-intuitive method 13000 of selecting a set of optimized sub-projects into a plan for creating an optimal project definition. Instead of proceeding from a "right to left" perspective shown in FIG. 10, the illustrative embodiment shown in FIG. 13 solves the problem of planning major information technology problem 902 from "left to right." Specifically, the term "left to right" in this context means that the illustrative process first defines a solution model 1302, instead of defining the problem—as in FIG. 10.

The solution model 1302, resources 1000, constraints 1002, and political concerns 1306 are all described in terms of data that can be manipulated by a computer-implemented process. Thus, the definition of solution model 1302, resources 1000, constraints 1002, and political concerns 1306 are provided to optimization engine 1304. An optimization engine is a computer-implementable software application that performs rigorously defined mathematically optimization, as defined above, on inputs 1302, 1306, 1000, and 1002.

After feedback 1308, the output of optimization engine is an optimized major information technology project 902 having optimally selected sub-projects 1310. The term "optimally selected sub-projects" means that the sub-projects were selected via a mathematical optimization project.

The process, however, usually proceeds through several adjustments and iterations in order to bring the optimized major information technology project 902 into closer agreement with expectations of those responsible for major information technology project 902. Thus, feedback process 1308 allows a user or process to adjust one or more of solution model 1302, resources 1000, constraints 1002, or political concerns 1306 and then re-execute optimization engine 1304.

Ultimately, the result of the process shown in FIG. 13 is an optimized major information technology project 902 having optimally selected sub-projects 1310 that are in accord with expectations of those responsible for major information technology project 902. The process shown in FIG. 13 is data centric. In other words, the process shown in FIG. 13 is based on data and mathematical characterizations of factors important to major information technology project 902. As a result, as shown in FIG. 14 and FIG. 15, the optimally selected sub-projects 1310 more closely reflect underlying realities of "as-is" conceptual objects. Thus, by using the method shown in FIG. 13, the probability of success of completing an efficient major information technology project 902 is greatly increased.

FIG. 14 is a block diagram illustrating optimally selected sub-projects for a major information technology project, in accordance with an illustrative embodiment. The optimally selected sub-projects shown in FIG. 14 are different than the non-optimally selected sub-projects shown in FIG. 12. Thus the shapes of sub-project 1400, sub-project 1402, sub-project 1404, sub-project 1406, sub-project 1408, sub-project 1410, and sub-project 1412 are different than the various sub-projects shown in FIG. 12. Optimally selected sub-projects shown in FIG. 14 are part of major information technology project 902.

By implementing optimally selected sub-projects 1400 through 1412 in a particular order, which could be parallel implementation in some instances, the probability of successfully implementing major information technology project 902 is substantially increased.

FIG. 15 is a block diagram illustrating major information technology sub-projects that efficiently overlap underlying realities of existing information technology systems, in accordance with an illustrative embodiment. FIG. 15 illustrates why the process shown in FIG. 13 is superior to the prior art method shown in FIG. 9.

Unlike in FIG. 12, which is a result of the prior art method shown in FIG. 10, the shown optimally selected sub-projects directly overlap underlying conceptual data objects. For example, optimally selected sub-project 1400 corresponds directly to conceptual data object 1200 without overlapping conceptual data object 1202. Similarly, optimally selected sub-project 1402 directly corresponds to conceptual data object 1202 without overlapping conceptual data object 1200. Thus, duplicative effort is avoided and major information technology project 902 is much more efficiently produced. Additionally, major information technology project 902 operates more efficiently when completed.

Figures 16, 17:
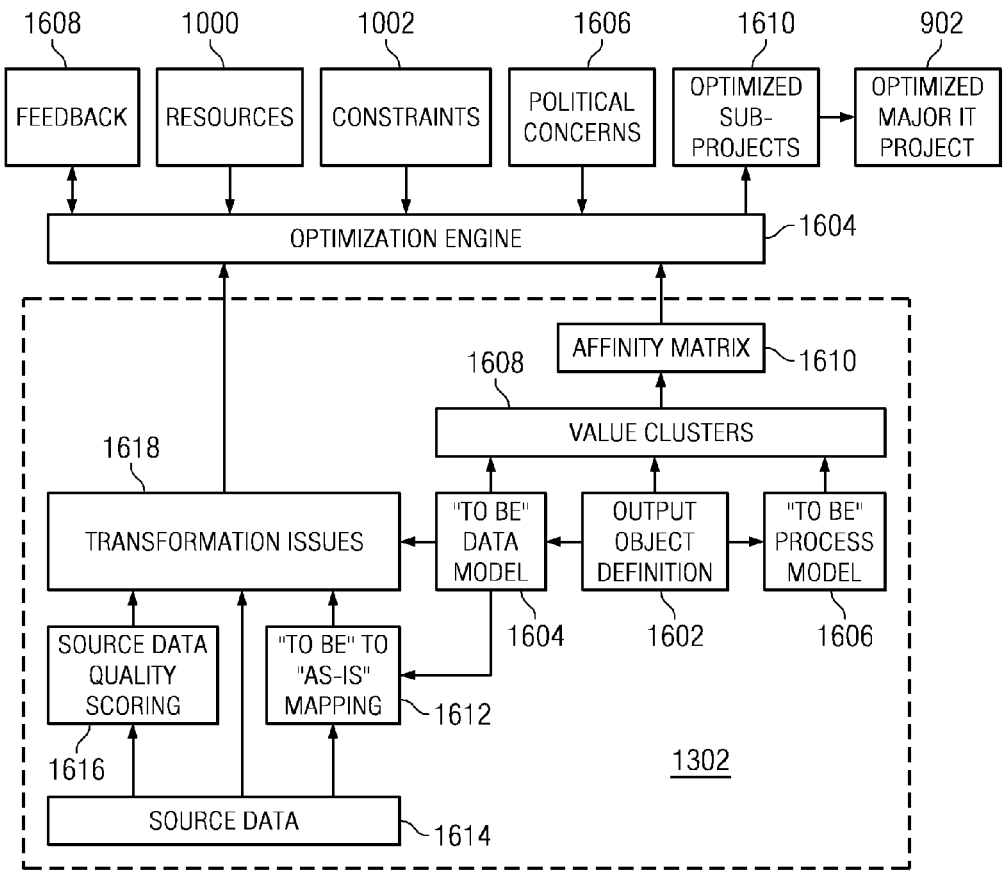
FIG. 16 is a block diagram illustrating a method of creating optimized sub-projects for a major information technology project, in accordance with an illustrative embodiment.
FIG. 17 is an exemplary output object valuation matrix, in accordance with an illustrative embodiment.

FIG. 16 is a block diagram illustrating a method of creating optimized sub-projects for a major information technology project, in accordance with an illustrative embodiment. In particular, the method shown in FIG. 16 is a more detailed version of the method shown in FIG. 13. Thus, corresponding reference numerals shown in FIG. 16 correspond to like numerals shown in FIG. 13. The method shown in FIG. 16 can be implemented in one or more data processing systems, such as data processing systems 104, 106, 110, 112, and 114 in FIG. 1 or data processing system 200 shown in FIG. 2. The method shown in FIG. 16 can be implemented among multiple computers over a network, such as network 102 shown in FIG. 1.

As in FIG. 13, solution model 1302, resources 1000, constraints 1002, and political concerns 1306 are provided to optimization engine 1304. In conjunction with optional feedback 1308, optimization engine creates optimized major information technology project 902 having optimally selected sub-projects 1310. However, the method shown in FIG. 16 details solution model 1302.

Construction of solution model 1302 begins with creating output object definitions 1602. Output objects are those outputs or deliverables that the project is designed to deliver. Specific examples of output objects include screen shots showing particular information, pictures, or query results; reports; services delivered; applications; queries; and others. Output objects are decomposed into three types of conceptual data objects: output data objects, process data objects, and connector data objects that connect the former two data objects. Output data objects are data objects that represent data and data structures, such as databases and other similar data objects. Process data objects are data objects that represent processes used to create the output objects, such as applications, algorithms, and flows.

For example, an output object could be a report. Decomposing this output object results in a corresponding output data object that is data that identifies or represents the report. Additionally, the report is decomposed into the logical processes used to create the report. Continuing the example, the each of three applications, algorithms, or flows used to create the report are identified and represented as a data object that can be called an output process object.

The sum of decomposed output data objects are then collected and assimilated into "to be" data model 1604. "To-be" data model 1604 is a model of all output data objects, data structures desired or needed for the output data objects, and any other data objects desired to implement optimized major information technology project 902. "To be" data model 1604 is data assembled into data models appropriate to producing one or more optimized sub-projects. A "to be" data structure therefore includes one or more data objects, as defined above.

Different parts of "to be" data model 1604 may be at different levels of completeness. Thus, an example of "to be" data model 1604 is a data structure that shows the "skeleton" of a massive database that is to be constructed. Although not all information regarding the future database is available, the "to be" model of the database describes the structure of the database and what information it should contain.

Similarly, the sum of decomposed output process objects are collected and assimilated into "to be" process model 1606. "To-be" process model 1606 is a model of processes and flows desired to implement optimized major information technology project 902. "To be" process model 1606 is data assembled into data models appropriate to producing one or more optimized sub-projects. A "to be" process therefore includes one or more data objects, as defined above.

Different parts of "to be" process model 1606 may be at different levels of completeness. Thus, an example of "to be" data model 1606 is an application that has not yet been written or that is incomplete. Although not all information regarding the future application is available, the "to be" model of the application describes the structure of the application and what information it should contain.

Next, "to be" data model 1604 and "to be" process model 1606 are arranged into value clusters. Possibly, connector data objects generated during output object definition 1602 are also integrated into value clusters 1608. A value cluster is the discrete intersection of data and that data's ability to add value to an organization. A value cluster may also be considered a group of resources that, when taken together, support one or more output objects having a utility value to an organization.

Value clusters 1608 may be considered a group of data value clusters, process value clusters, and connector value clusters. Each data value cluster includes one or more data sources that support one or more data objects. Each process value cluster includes one or more logical processes that support one or more output objects.

Value clusters 1608 are then related to each other using affinity matrix 1610. Affinity matrix 1610 is a matrix of data that indicates a relationship between groups of data sources and groups of output objects, and/or groups of available logical processes and groups of output objects. The affinity matrix describes data sources and output objects in terms of what output objects are available based on what data sources are available. Thus, for example, the affinity matrix can allow a user to determine that if Output Object "X" is available because its data sources are available, then Output Object "Y" and Output Object "Z" are also available because they use similar data sources.

Values clusters 1608, through affinity matrix 1610 are provided to optimization engine 1604. Optimization engine 1604 then performs mathematical optimization operations, taking as input affinity matrix 1610.

Returning to "to be" data model 1604, additional considerations are taken into account. For example, "to-be" data structures are mapped to "as-is" data structures, taking as input data source 1614. An "as-is" data structure is an existing data structure. Often, "as-is" data or data structures are not in a format compatible with final optimized major information technology project 902. Thus, the mapping of "to-be" data and data structures to "as-is" data and data structures is characterized as a conceptual data object.

Together with source data quality scoring 1616, mapping 1612 is modeled according to transformation issues 1618. Transformation issues 1618 are rigorously defined transformation risks and problems involved with mapping 1612 "to be" data and data structures to "as-is" data and data structures.

Examples of transformation issues 1618 include estimated costs for source to target conversion, estimated risk for source to target conversion, and other similar issues.

As described above, when considered as a whole output object definition 1602, "to be" data model 1604, "to be" process model 1606, value clusters 1608, affinity matrix 1610, "to be" to "as is" mapping 1612, source data 1614, source data quality scoring 1616, and transformation issues 1618 form solution model 1302. Solution model 1302 is provided as input into optimization engine 1304, along with resources 1000, constraints 1002, political concerns 1306, and feedback 1308. As a result of performing optimization, a deterministic optimized major information technology project 902 is produced with optimally selected sub-projects 1310.

FIGS. 17 through 31 illustrate various components and aspects of the features of FIG. 16. Thus, corresponding reference numerals in the different figures refer to the same features.

FIG. 17 is an exemplary output object valuation matrix, in accordance with an illustrative embodiment. An output object valuation matrix reflects valuation data, which is data that describes the value of an output object or a resource to an organization. An output object valuation matrix can be implemented as data and a data structure usable by a data processing system, such as data processing systems 104, 106, 110, 112, and 114 in FIG. 1 or data processing system 200 shown in FIG. 2. Exemplary output object valuation matrix 1700 shown in FIG. 17 can be implemented among multiple computers over a network, such as network 102 shown in FIG. 1. Additionally, output object valuation matrix 1700 shown in FIG. 17 describes the value of various projects, such as optimized sub-projects 1400 through 1412, to an organization. Output object valuation matrix 1700 is useful for determining affinity matrix 1610 in FIG. 16 and can also be used as input in optimization engine 1304.

As shown in FIG. 17, rows 1702 reflect various sub-organizations within the overall organization. Columns 1704 reflect projects. Different sub-organizations within the organization can value different projects differently. Output object valuation matrix takes these different valuations into account when creating an optimized major information technology project for which optimized sub-projects are selected.

Columns 1704 include information technology sub-project 1706, management sub-organization 1708, marketing sub-organization 1710, and production sub-organization 1712. Additional sub-organizations or different sub-organizations could exist.

Columns include project 1 1714 and project 2 1716. Examples of projects could include an optimized sub-project, as described above. Additional projects or a different number of sub-projects could exist. A specific example of a project could include establishing a database, creating an application, generating a graphical user interface, or any other project.

An intersection of a row and a column can be referred to as a cell. Each cell contains a real number. The real number is a relative valuation of a project to an organization. High numbers reflect greater importance. Low numbers reflect lower importance. A zero indicates that a project has no importance to the organization. A negative number indicates that a project is a detriment to the organization.

For example, project 1 1714 has a value of 100 to management sub-organization 1708 and project 2 1716 has a value of 400 to management sub-organization 1708. Thus, project 2 1716 is considered to be much more important to the management sub-organization 1708 than project 1 1714. Similarly, both project 1 1714 and project 2 1716 are more important to management sub-organization 1708 than to the other sub-organizations.

In turn, project 1 1714 has no value to marketing sub-organization 1710. For example, project 1 could be creation of a database with which marketing sub-organization 1710 does not interact.

However, project 1 1714 has a negative value to production sub-organization 1712. For example, project 1 1714 could interfere with operation of production sub-organization 1712 because project 1 1714 drains production sub-organization 1712 of resources needed by that organization. This fact could motivate a change in project 1, a change in production sub-organization 1712, or a change in some other part of major information technology project 302 shown in FIG. 9.

Figure 18:
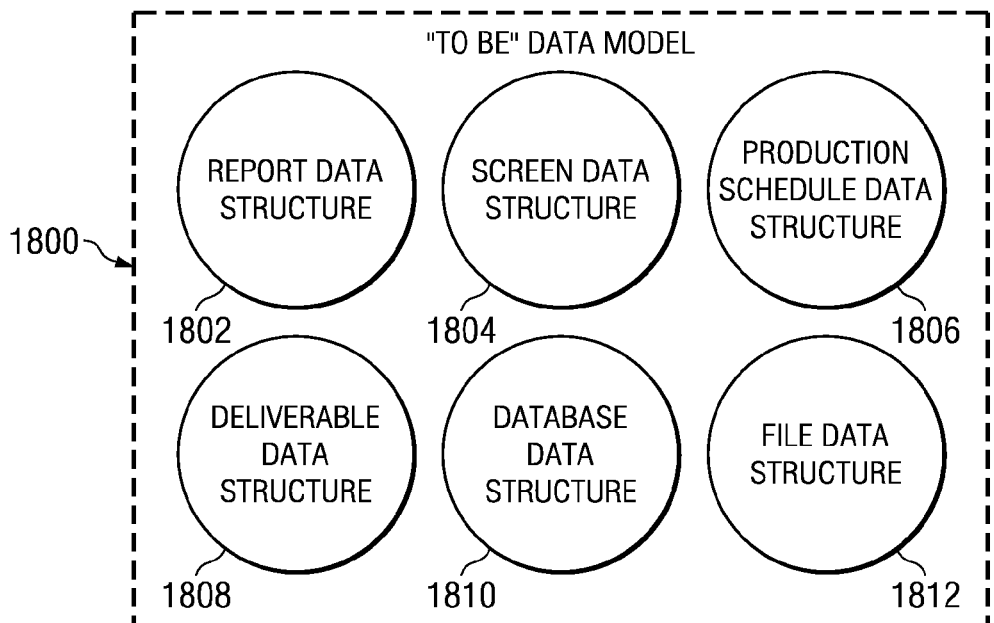
FIG. 18 is a block diagram of a "to be" data model, in accordance with an illustrative embodiment.

FIG. 18 is a block diagram of a "to be" data model, in accordance with an illustrative embodiment. "To be" data model 1800 corresponds to "to be" data model 1604 in FIG. 16.

A "to be" data model includes a group of "to be" data structures and "to be" data. The phrase "to be", as used herein, describes something that is desired for the major information technology project that may, or may not, yet exist. A "to be" data structure is data assembled into data models appropriate to producing one or more output objects. A "to be" data structure therefore includes one or more data objects, as defined above. Different parts of the "to be" data model may be at different levels of completeness. An example of a "to be" data structure is a data structure that shows the "skeleton" of a massive database that is to be constructed. Although not all information regarding the future database is available, the "to be" model of the database describes the structure of the database and what information it should contain.

Examples of "to be" data structures in "to be" data model 1800 include report data structure 1802, screen data structure 1804, production schedule data structure 1806, deliverable data structure 1808, database data structure 1810, and file data structure 1812. Additional "to be" data structures or different "to be" data structures could be included in "to be" data model 1800.

Report data structure 1802 could be a data structure detailing data or data structures desired, whether available or not, for a report output object. Similarly, screen data structure 1804 could be a data structure detailing data or data structures desired, whether available or not, for a screen output object. Likewise, production schedule data structure 1804 could be a data structure detailing data or data structures desired, whether available or not, for a production schedule output object. Likewise, deliverable data structure 1806 could be a data structure detailing data or data structures desired, whether available or not, for a deliverable output object. Likewise, database data structure 1810 could be a data structure detailing data or data structures desired, whether available or not, for a database output object. Finally, file data structure 1812 could be a data structure detailing data or data structures desired, whether available or not, for a file output object.

Taken together, the set of all "to be" data structures, and possibly relationships among the "to be" data structures, form "to be" data model 1800. "To be" data model 1800 will then be used as shown in FIG. 16.

Figure 19:
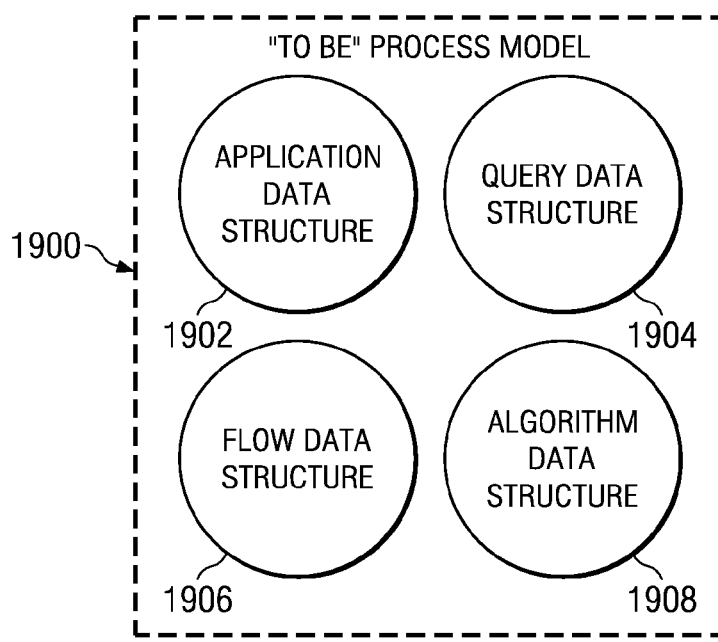
FIG. 19 is a block diagram of a "to be" process model, in accordance with an illustrative embodiment.

FIG. 19 is a block diagram of a "to be" process model, in accordance with an illustrative embodiment. "To be" data model 130 corresponds to "to be" data model 1606 in FIG. 16.

A "to be" process model includes a group of "to be" data structures and "to be" data reflective of a process used to implement an output object. The phrase "to be", as used herein, describes something that is desired for the major information technology project that may, or may not, yet exist. Different parts of the "to be" process model may be at different levels of completeness. An example of a "to be" data structure in a "to be" process model is a data structure that describes a massive application to be used in the major information technology project. Although not all information regarding the future application is available, the "to be" model of the application describes the structure of the application and what capabilities it should have.

Examples of "to be" data structures in "to be" process model 1900 include application data structure 1902, query data structure 1904, flow data structure 1906, and algorithm 1908. Additional "to be" data structures or different "to be" data structures could be included in "to be" process model 1900.

Application data structure 1902 could be a data structure detailing data or data structures desired, whether available or not, for an application output object. Similarly, query data structure 1904 could be a data structure detailing data or data structures desired, whether available or not, for a query output object. Likewise, flow data structure 1906 could be a data structure detailing data or data structures desired, whether available or not, for a flow output object. Finally, algorithm data structure 1908 could be a data structure detailing data or data structures desired, whether available or not, for an algorithm output object.

Taken together, the set of all "to be" process data structures, and possibly relationships among the "to be" process data structures, form "to be" process model 1900. "To be" process model 1900 will then be used as shown in FIG. 16.

Figure 20:
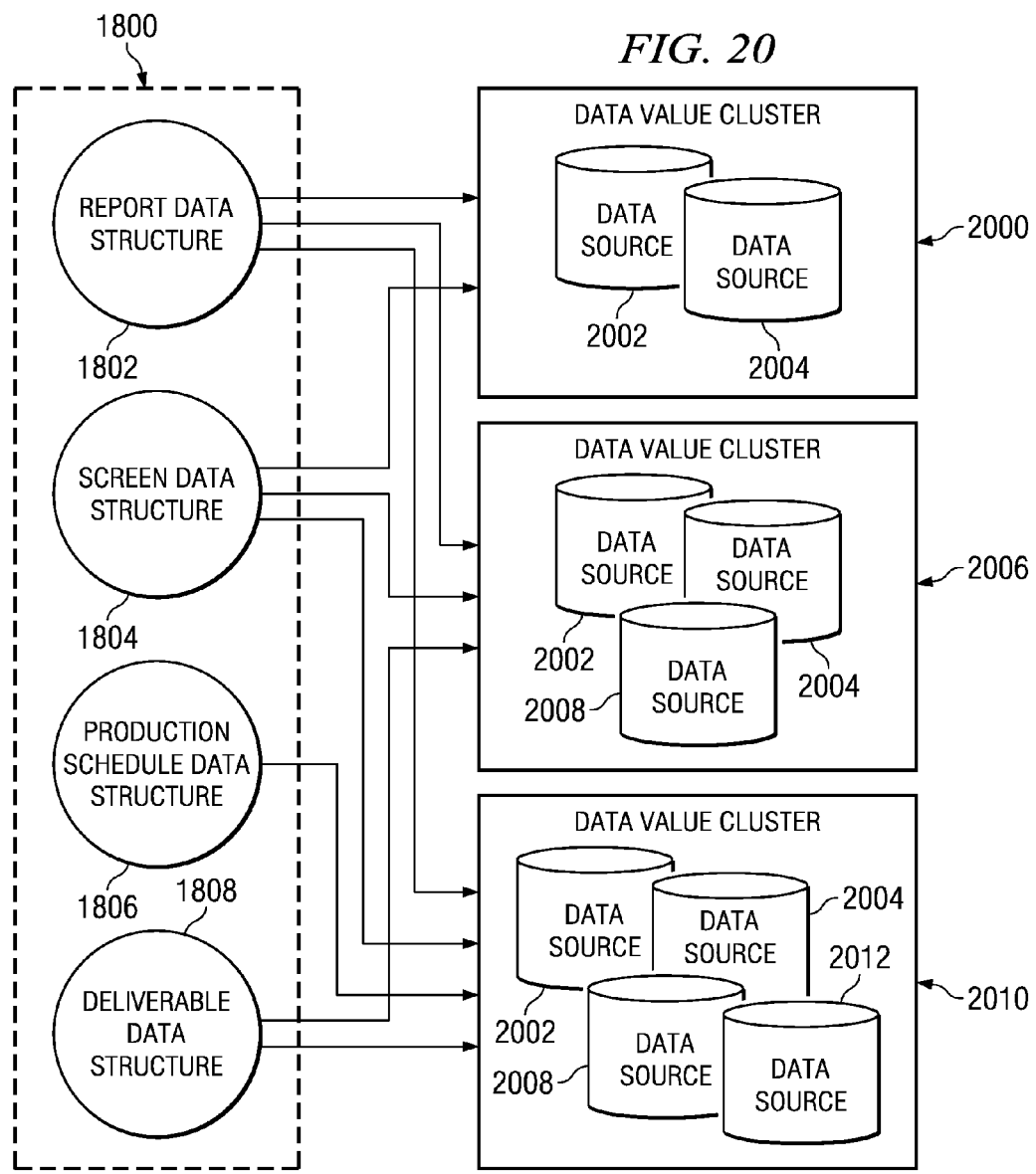
FIG. 20 is a block diagram illustrating data value clusters, in accordance with an illustrative embodiment.

FIG. 20 is a block diagram illustrating data value clusters, in accordance with an illustrative embodiment. The process of forming data value clusters can be implemented using a data processing system, such as data processing systems 104, 106, 110, 112, and 114 in FIG. 1 or data processing system 200 shown in FIG. 2. Data value clusters can be implemented among multiple computers over a network, such as network 102 shown in FIG. 1. As described above, a data value cluster is the discrete intersection of data and that data's ability to add value to an organization.

To form data value clusters, data structure models from "to be" data model 1800 are associated with different common data sources in data value clusters. For example, data value cluster 2000 includes data source 2002 and data source 2004. Report data structure model 1802 and screen data structure model 1804 each take advantage of these data sources in data value cluster 2000. Report data structure model 1802 also takes advantage of data value cluster 2006, which contains data source 2002, data source 2004, and data source 2008. Report data structure model 1802 also takes advantage of data value cluster 2010, which includes data source 2002, data source 2004, data source 2008, and data source 2012. Different data structure models are associated with different data value clusters as shown.

Structurally, data value clusters are implemented using matrices. Each value cluster is analyzed for its political and economic value to an organization or activities of an organization. Political power is expressed as a floating point number between 0.0 and positive infinity. Zero is totally powerless and positive infinity is an organization that receives anything it requests, if within the power of the organization. Example corporate organizations with a political power of infinity are the audit, compliance, and Sarbanes-Oxley compliance organizations. Other legal, tax, and environmental laws must be complied with, so no tradeoffs exist versus normal organizational goals. Most normal organizations would have a scaled political power value between 0.0 and 1.0. The absolute values of political power do not matter, only the political power ratio effects value cluster selection.

For example, relative political power can be objectively quantified in data value clusters using the following mathematics. Initially, an organization index is produced, where, $$0 \leq PP_{X=1}{}^{N} \leq \infty$$

Where X is the organizational index from 1 to N organizations.

Each of the value clusters provides some non-negative value to each of the X organizations. For the C value clusters projects considered by the planning unit, the value of each proposed cluster is:

$$0 \leq VC_{X,C}$$

Where X is the organization index and C is the index of the value cluster, and VC is the value cluster.

For each value cluster there exists a cost to extract, transform, and load the data to provision a particular value cluster. That cost is a non-negative number, and the cost of each value cluster is less than or equal to the total budget available, as shown by the following inequality:

$$0 \leq Cost_{D=1}{}^{C} \leq Budget$$

Where C is the total number of value clusters and Budget is the total budget available.

The optimal value cluster selection is a binary vector composed of zeros and ones that indicates the selection and funding of particular projects. This binary vector can be considered the "answer". As the optimization algorithm is run, various combinations of value clusters are computed in an attempt to increase the total value of an objective function described below. This process is well known in the art.

$$Plan_{Y=1}{}^{C} \in 0,1$$

Where Plan sub Y is 1 if production of the corresponding value cluster is selected and zero otherwise.

The methods described herein maximize the total value of the selected value clusters for the entire organization subject to a series of constraints. The objective function that is maximized is:

$$\text{Maximize} \sum_{X=1}^{M} \sum_{Y=1}^{C} PP_X \cdot Plan_Y \cdot VC_{X,Y}$$

Where M=maximum organizational index and C=number of value clusters.

The production of a given value cluster may deliver value to more than one part of the organization. For instance, a new production planning system may deliver value to a manufacturing department by improving manufacturing efficiency. This same value cluster may also deliver value to the marketing department by allowing sales persons to know when a particular order for a given customer will ship. The shipping department may also receive value by being able to negotiate favorable shipping rates by more accurate prediction of shipping needs.

Constraint data are added to reflect various constraints on the organization, such as physical, financial, organizational, legal, ethical, staffing, infrastructure, scheduling, and operational realities. For example, the total costs for all selected value cluster projects is less than or equal to the total budget available, as reflected in the following equation:

Subject to:

$$0 \leq \sum_{Y=1}^{C} PP_Y \cdot Cost_Y \leq Budget$$

Where Cost sub Y is the cost of producing value cluster number j.

Other constraints may be added to reflect the managerial or political considerations of the organization. For instance, if every organizational unit must receive at least 5% of their requested cluster values, a possible constraint would be:

For all dept, $$\left( \sum_{P=1}^{C} .05 * VC_{X,P} \right) \leq \left( \sum_{Q=1}^{C} Plan_Q * VC_{X,Q} \right)$$

Where X=department index, Q=project index, and Plan sub Q is the value cluster selection vector.

Other mathematical constraints can be added to more accurately reflect physical realities and management objectives. Thus, value clusters are objective, data-centric objects, such as matrices, that can be used as inputs in an optimization engine.

Figure 21:
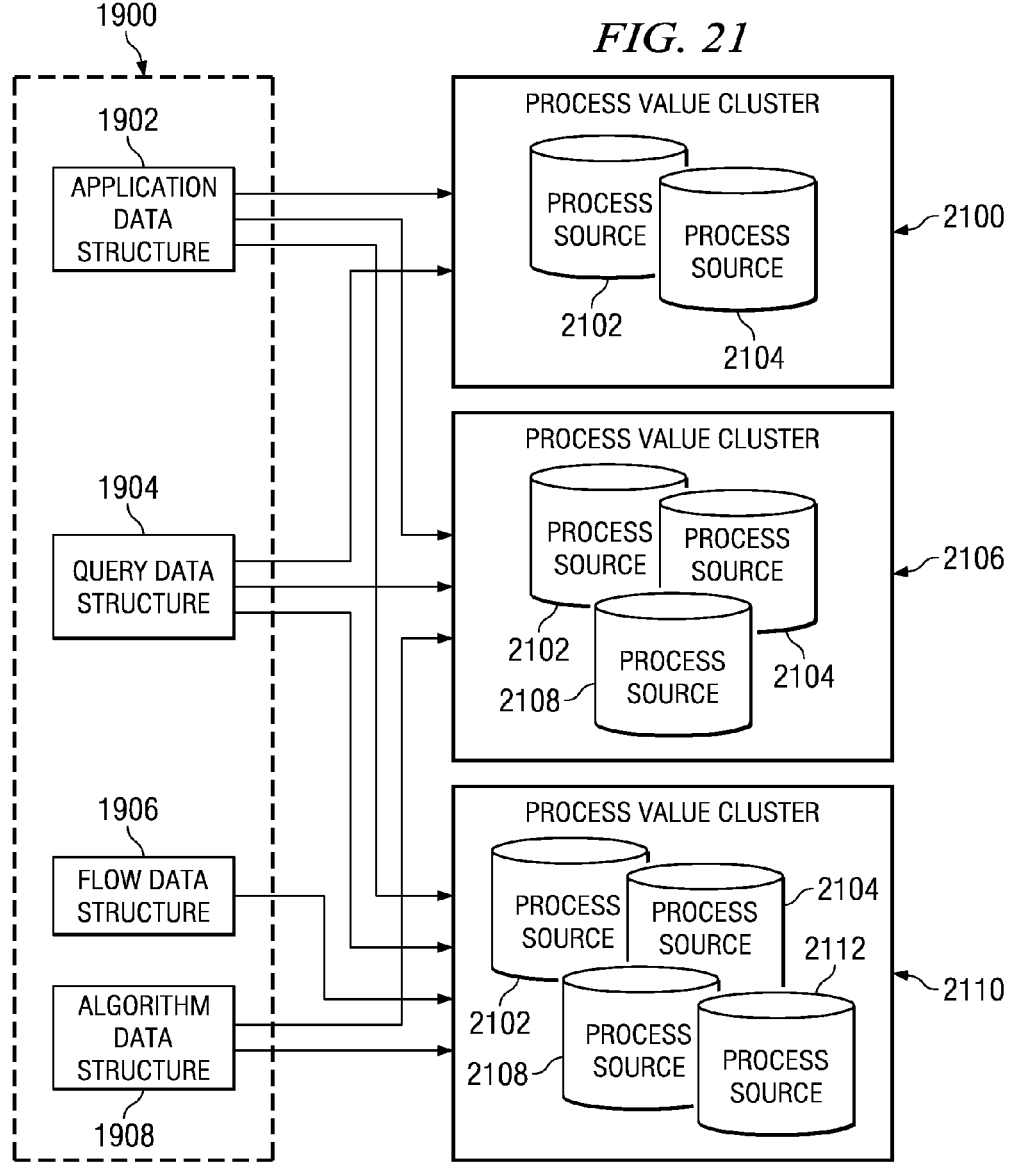
FIG. 21 is a block diagram illustrating process value clusters, in accordance with an illustrative embodiment.

FIG. 21 is a block diagram illustrating process value clusters, in accordance with an illustrative embodiment. The process of forming process value clusters can be implemented using a data processing system, such as data processing systems 104, 106, 110, 112, and 114 in FIG. 1 or data processing system 200 shown in FIG. 2. Process value clusters can be implemented among multiple computers over a network, such as network 102 shown in FIG. 1.

To form process value clusters, process data structure models from "to be" process model 1900 are associated with different common process sources in process value clusters. A process source can be an existing application, algorithm, or flow, or a similar process that is to be developed. For example, process data value cluster 2100 includes process source 2102 and process source 2104. Application process data structure model 1902 and Application process data structure model 1904 each take advantage of these process sources in process value cluster 2100. Application process data structure model 1902 also takes advantage of process value cluster 2106, which contains process source 2102, process source 2104, and process source 2108. Application process data structure model 1902 also takes advantage of process value cluster 2110, which includes process source 2102, process source 2104, process source 2108, and process source 2112. Different process data structure models are associated with different process value clusters as shown.

Figure 22:
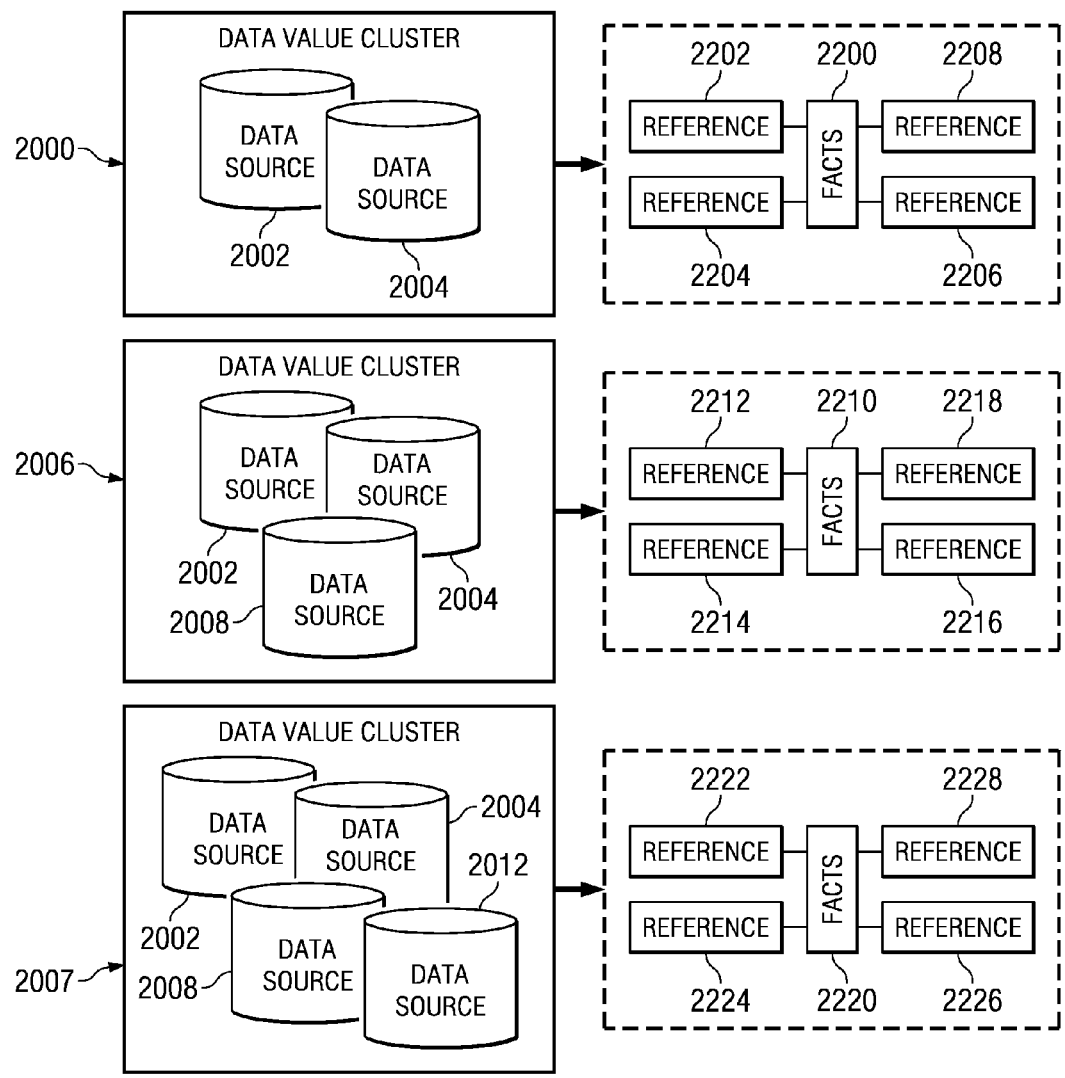
FIG. 22 is a block diagram illustrating elements of a "to be" data model, in accordance with an illustrative embodiment.

FIG. 22 is a block diagram illustrating elements of a "to be" data model, in accordance with an illustrative embodiment. Data value clusters shown in FIG. 22 correspond to data value clusters shown in FIG. 20.

For example, data value cluster 2000, which contains data source 2002 and data source 2004, are related to a set of facts 2200. Set of facts 2200 refers to a variety of references, such as reference 2202, reference 2204, reference 2206, and reference 2208. Similarly, data value cluster 2006, which includes data sources 2002, 2004, and 2008, are related to set of facts 2210. Set of facts 2210 refers to a variety of references, such as reference 2212, reference 2214, reference 2216, and reference 2218. Likewise, data value cluster 2010, which includes data sources 2002, 2004, 2008, and 2012 are related to set of facts 2220. Set of facts 2220 refers to a variety of references, such as reference 2222, reference 2224, reference 2226, and reference 2228.

FIG. 22 shows that to obtain certain data certain data sources should be developed or accessed and to be able to satisfy requirements of a project. The shown boxes are connected to provide a classic representation of a data model. The data value clusters shown in FIG. 22 tie to those data that enable individual sub-projects to work by producing corresponding particular output objects.

Figure 23:
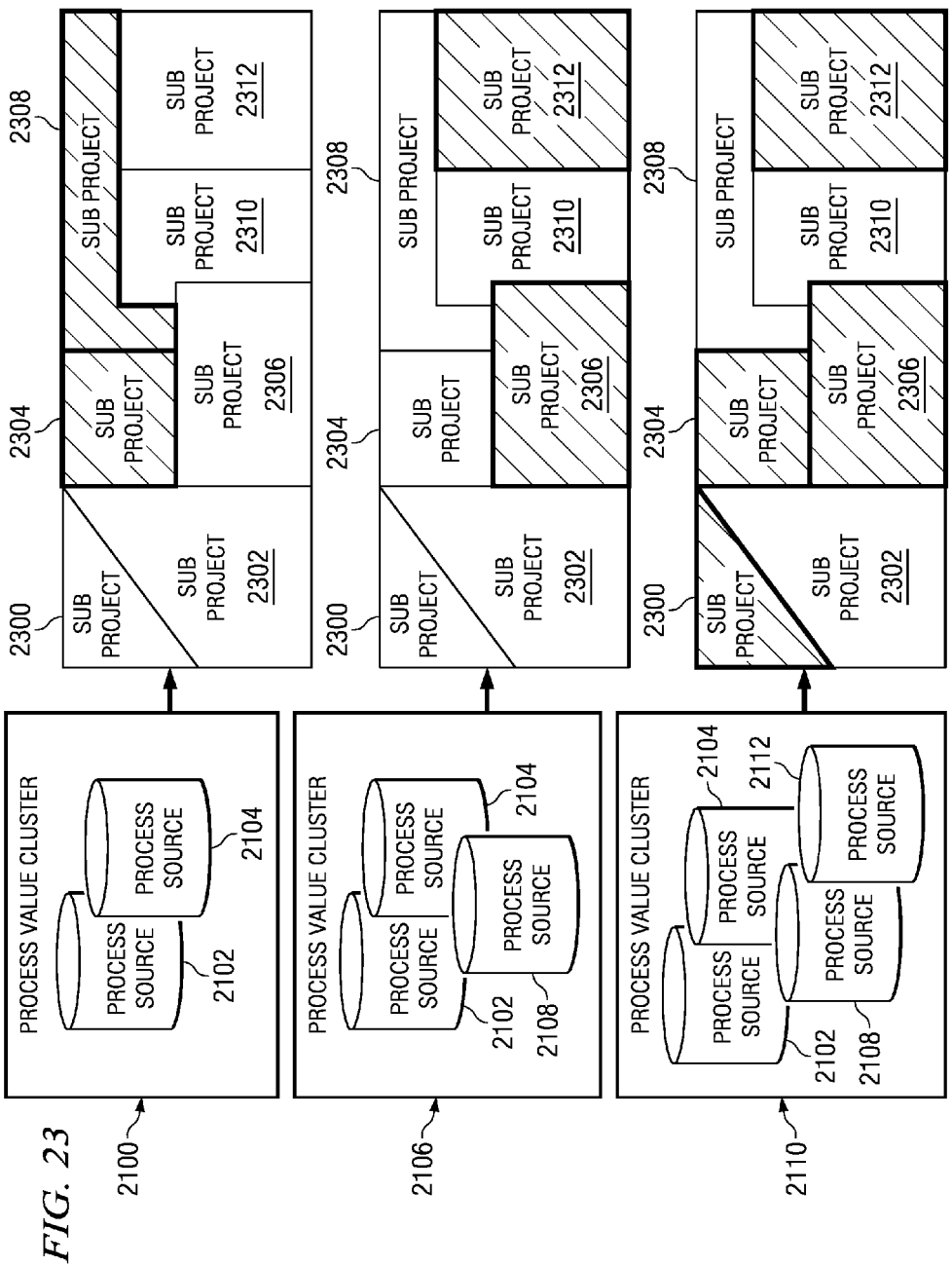
FIG. 23 is a block diagram illustrating elements of a "to be" process model, in accordance with an illustrative embodiment.

FIG. 23 is a block diagram illustrating elements of a "to be" process model, in accordance with an illustrative embodiment. Process value clusters shown in FIG. 23 correspond to process value clusters shown in FIG. 21.

Process value clusters correspond to different processes in various optimized sub-projects. For example, process value cluster 2100, which includes process sources 2102 and 2104 is used by optimized sub-project 1404 and optimized sub-project 1408 in FIG. 14. Similarly, process value cluster 2106, which includes process sources 2102, 2104, and 2108, is used by optimized sub-projects 1406 and 1412. Likewise, process value cluster 2110, which includes process sources 2102, 2104, 2108, and 2110, is used by optimized sub-projects 1400, 1404, 1406, and 1412 in FIG. 14.

The knowledge of how process value clusters relate to projects can be used to optimally select sub-projects for an optimized project. For example, if sub-projects 1404 and 1408 have been completed already, then process value cluster 2100 is also complete. This result means that process source 2102 and process source 2104 are available. If process source 2108 were to be developed, then process value cluster 2106 would be completed. Thus, sub-project 1406 and sub-project 1412 would be easily finished. Thus, the process value clusters allow for detailed, data-centric planning of which sub-projects should be completed in what order. The process can be two-way: The completion of projects also allows process value clusters to be delivered.

FIG. 24 is an exemplary affinity matrix, in accordance with an illustrative embodiment. The process of forming an affinity matrix can be implemented using a data processing system, such as data processing systems 104, 106, 110, 112, and 114 in FIG. 1 or data processing system 200 shown in FIG. 2. An affinity matrix can be implemented among multiple computers over a network, such as network 102 shown in FIG. 1.

Affinity matrix 2400 is a matrix of data that indicates a relationship between groups of data sources and groups of output objects, and/or groups of available logical processes and groups of output objects. Affinity matrix 2400 describes data sources and output objects in terms of what output objects are available based on what data sources are available. Thus, for example, affinity matrix 2400 can allow a user to determine that if Output Object "X" is available because its data sources are available, then Output Object "Y" and Output Object "Z" are also available because they use similar data sources.

Specifically, affinity matrix 2400 has a series of columns 2402 reflecting existing data sources and a series of rows 2404 corresponding to data structures in FIG. 18 and FIG. 19. For columns 2402, existing data sources include "as-is" data sources and any data sources that have been completed during the course of constructing the major information technology project. Thus, affinity matrix 2400 evolves over time and can be adjusted as part of a feedback process, such as feedback 708 in FIG. 16. In the illustrative example shown, columns 2402 include data source column 2406, data source column 2408, data source column 2410, data source column 2412, and data source column 2414.

Affinity matrix 2400 also has a series of rows 2404 of data structures corresponding to data structures in FIG. 18 and FIG. 19. For example, rows 2404 include report data structure row 1802, screen data structure row 1804, production schedule data structure row 1806, deliverable data structure row 1808, application data structure row 1902, application data structure row 1904, flow data structure row 1906, and flow data structure row 1908. Rows 2404 also include personal skills program data structure row 2418 and opportunities database for sales data structure row 2420. Rows 2418 and 2420 are newly added data structures corresponding to newly added output objects as a result of a feedback process. Thus, again, affinity matrix 2400 evolves over time and can be adjusted as part of a feedback process, such as feedback 1308 in FIG. 16.

An intersection of a column and a row can be referred to as a cell. Each cell has a number that is either zero or one. A zero indicates that a data source is not needed or is incomplete for a particular output object data structure in rows 2404. A one indicates that a data source exists and is used for a particular output object data structure in rows 2404. For this reason, as the major information technology project proceeds towards completion, more ones will appear in affinity matrix 2400 until every cell has a one when the major information technology project is completed. Thus, for example, report data structure 1802 either does not rely on or does not yet have available data sources 2406, 2408, 2410, and 2412; however, report data structure 1802 uses data source 2414. Furthermore, data source 2414 also exists and is available.

Affinity matrix 2400 can be used to estimate the ease or difficulty of adding new output objects to the major information technology project. For example, personal skills program data structure 2418 has a one in column 2408 and opportunities database for sales data structure 2420 has a one in column 2408 and column 2414. Given that ones already exist for these columns in other rows, such as row 1808, one can immediately ascertain that at least those data sources already exist and are completed. In fact, a one exists in at least one row for every column in affinity matrix 2400. Thus, assuming that the personal skills program and opportunities database for sales output objects do not use some other data source not reflected in columns 2402, one can also immediately ascertain that adding the personal skills program and opportunities database for sales output objects would be relatively simple. Adding these output objects would be relatively simple because the data sources upon which these output rely already exist and are completed.

Figure 25:
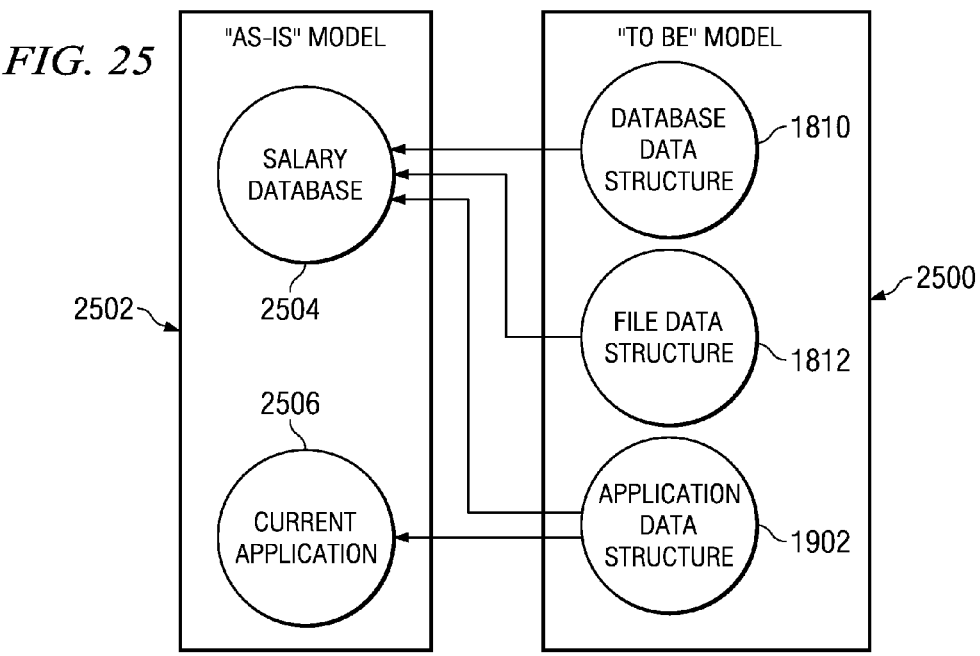
FIG. 25 is a block diagram illustrating mapping from an "as-is" model to a "to be" model, in accordance with an illustrative embodiment.

FIG. 25 is a block diagram illustrating mapping from an "as-is" model to a "to be" model, in accordance with an illustrative embodiment. FIG. 25 corresponds to mapping 1612 in FIG. 16. The mapping process shown in FIG. 25 can be implemented using a data processing system, such as data processing systems 104, 106, 110, 112, and 114 in FIG. 1 or data processing system 200 shown in FIG. 2. The mapping process shown in FIG. 25 can be implemented among multiple computers over a network, such as network 102 shown in FIG. 1.

"To be" model 2400 is mapped to "as-is" model 2402. During this process, "to be" data structures and "to be" process models are mapped to "as-is" data structures and "as is" processes. This mapping does not map all "to be" data structures and "to be" processes to all desired underlying data structures and processes, but rather to those data structures and processes that already exist. Thus, the mapping process shown in FIG. 25 describe how "to be" data structures and "to be" processes can take advantage of existing, or "as is", data structures and existing, or "as is", processes.

In the example shown in FIG. 25, database data structure 1810, file data structure 1812, and application data structure 1902 are all mapped to salary database 2504, which is an existing database. In other words, each of data structures 1810, 1812, and 1902 take advantage of or use salary database 2504. However, only application data structure 1902 takes advantage of or uses current application 2506. Thus, application data structure 1902 is mapped to current application 2506.

Figure 26:
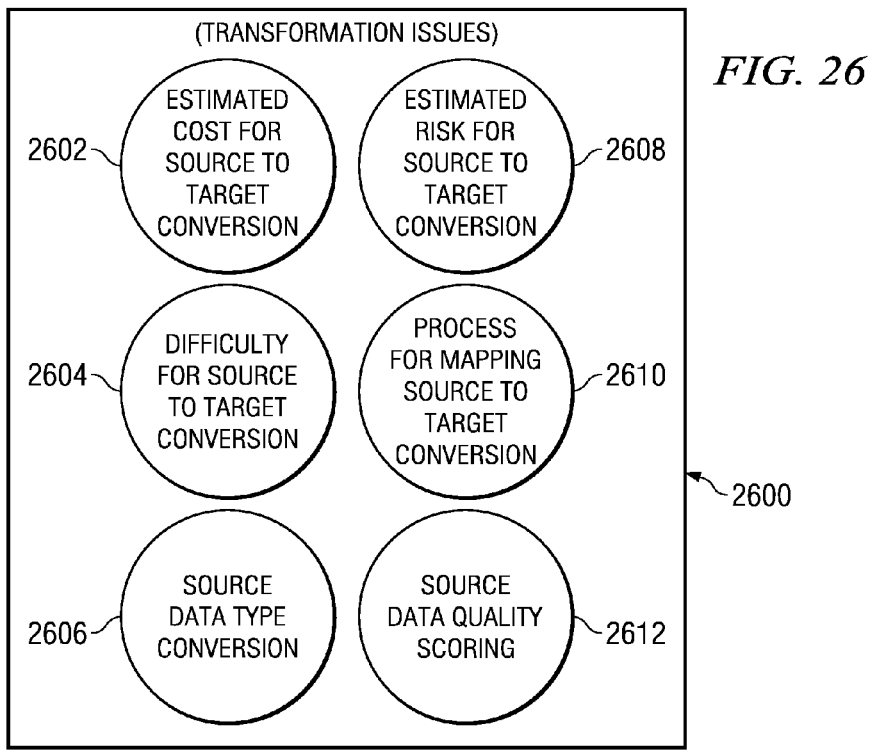
FIG. 26 is a block diagram illustrating transformation issues applied to the mapping from an "as-is" model to a "to be" model, in accordance with an illustrative embodiment.

FIG. 26 is a block diagram illustrating transformation issues applied to the mapping from an "as-is" model to a "to be" model, in accordance with an illustrative embodiment. FIG. 26 corresponds to transformation issues 1018 in FIG. 16. The transformation issues shown in FIG. 26 can be described as data in a data processing system, such as data processing systems 104, 106, 110, 112, and 114 in FIG. 1 or data processing system 200 shown in FIG. 2. The transformation issues described in FIG. 26 can be implemented among multiple computers over a network, such as network 102 shown in FIG. 1.

Transformation issues 2600 are issues regarding transforming "as is" data structures and processes into "to be" data structures and processes. Transformation issues 2600 are quantitative factors that are defined and then provided as input to an optimization engine, such as optimization engine 1304 in FIG. 13 and FIG. 16.

Examples of transformation issues include an estimated cost for source to target conversion 2602. This cost can be estimated and quantified, with the quantified value included as input in the optimization engine. Similar quantitative transformation issues include a quantitative assessment of the difficulty for source to target conversion 2604, source data type conversion 2606, estimated risk for source to target conversion 2608, process for mapping source to target conversion 2610 and source data quality scoring 2612.

FIG. 27 is a block diagram illustrating exemplary available resources, in accordance with an illustrative embodiment. FIG. 27 corresponds to resources 1000 in FIG. 10 and in FIG. 16. Available resources 2700 in FIG. 27 can be described as data in a data processing system, such as data processing systems 104, 106, 110, 112, and 114 in FIG. 1 or data processing system 200 shown in FIG. 2. Available resources 2700 described in FIG. 27 can be implemented among multiple computers over a network, such as network 102 shown in FIG. 1. Additionally, available resources 2700 can be considered a type of boundary conditions provided as input into an optimization engine, such as optimization engine 1304 in FIG. 13 and FIG. 16.

Available resources 2700 represent the accumulation of all available resources, as defined by the organization. Examples of available resources include physical computer equipment 2702, physical storage capacity 2704, training 2706, software 2708, money 2710, time available 2712, physical resources 2714 (such as buildings), network capability 2716, and personnel 2718. Available resources 2700 could be more, different, or fewer available resources than those shown in FIG. 27.

FIG. 28 is a block diagram illustrating exemplary project constraints, in accordance with an illustrative embodiment. FIG. 28 corresponds to constraints 1002 in FIG. 10 and in FIG. 16. Project constraints 2800 in FIG. 28 can be described as data in a data processing system, such as data processing systems 104, 106, 110, 112, and 114 in FIG. 1 or data processing system 200 shown in FIG. 2. Project constraints 2800 described in FIG. 28 can be implemented among multiple computers over a network, such as network 102 shown in FIG. 1. Additionally, project constraints 2800 can be considered a type of boundary conditions provided as input into an optimization engine, such as optimization engine 1304 in FIG. 13 and FIG. 16.

Project constraints 2800 represent the accumulation of all constraints, as defined by the organization. Examples of project constraints include problems in software, network, database, hardware mandates, and performance characteristics 2802. Other project constraints include data structure compatibility issues 2804, data quality issues 2806, database compatibility issues 2808, data quality 2810, team location and travel constraints 2812, cash shortages 2814, organizational rigidity 2816, personal restrictions 2818, organizational policies 2820, information transfer policies 2822, legal constraints 2824, classified information policies 2826, HIPAA or other privacy rules 2828, hazardous information restrictions 2830, risk tolerance 2832, security requirements 2834, information technology (IT) policies 2836, development requirements 2838, and required delivery steps 2840. Project constraints 2800 could be more, different, or fewer available resources than those shown in FIG. 28.

Figure 29:
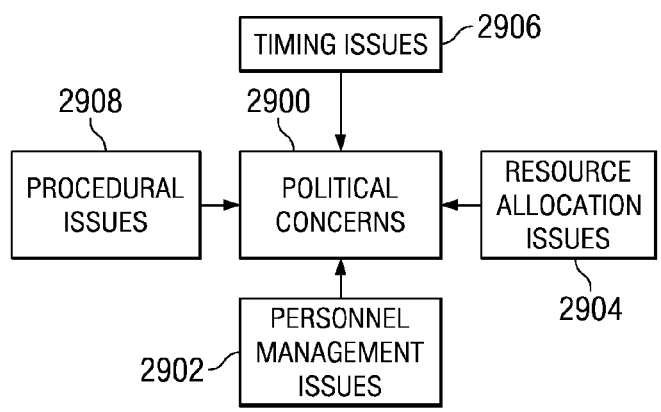
FIG. 29 is a block diagram illustrating exemplary political concerns, in accordance with an illustrative embodiment.

FIG. 29 is a block diagram illustrating exemplary political concerns, in accordance with an illustrative embodiment. FIG. 29 corresponds to political concerns 706 in FIG. 16. Political concerns 2900 shown in FIG. 29 can be described as data in a data processing system, such as data processing systems 104, 106, 110, 112, and 114 in FIG. 1 or data processing system 200 shown in FIG. 2. Political concerns 2900 described in FIG. 29 can be implemented among multiple computers over a network, such as network 102 shown in FIG. 1. Additionally, political concerns 2900 can be considered a type of boundary conditions provided as input into an optimization engine, such as optimization engine 1304 in FIG. 13 and FIG. 16.

Political concerns 2900 represent the accumulation of all political concerns, as defined by the organization. Examples of project concerns include personnel management issues 2902, resource allocation issues 2904, timing issues 2906, and procedural issues 2908. Each exemplary political concern 2902 through 2908 is quantified as a number so that a corresponding political concern can be processed by an optimization engine.

Examples of personnel management issues 2902 include preventing certain types of employees from interacting with each other. For example, a large law firm might desire to avoid having certain employees interact with each other in order to maintain certain privacy issues. Examples of resource allocation issues 2904 include a desire by an organization to require that for every dollar received by organization A, organization B should also receive two dollars. An example of timing issues 2906 is a desire by an organization to produce deliverables in a particular order or within a particular time period. Examples of procedural issues 2908 include a desire by an organization to require that a particular individual within an organization receive a particular report before some other individual in the organization.

Figure 30:
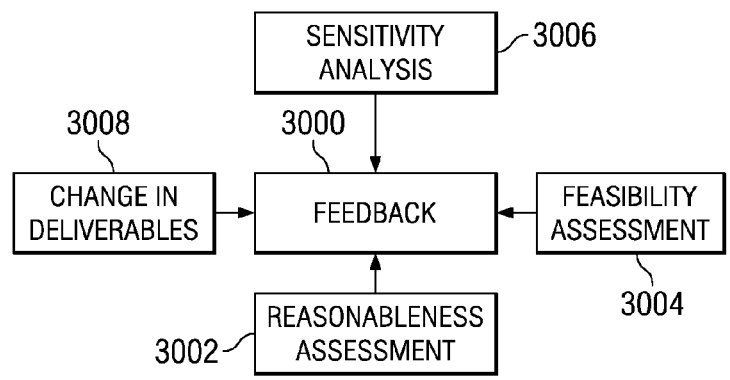
FIG. 30 is a block diagram illustrating examples of feedback applied to an optimization engine, in accordance with an illustrative embodiment.

FIG. 30 is a block diagram illustrating examples of feedback applied to an optimization engine, in accordance with an illustrative embodiment. FIG. 30 corresponds to feedback 708 in FIG. 16. Feedback 3000 shown in FIG. 30 can be described as data in a data processing system, such as data processing systems 104, 106, 110, 112, and 114 in FIG. 1 or data processing system 200 shown in FIG. 2. Feedback 3000 described in FIG. 30 can be implemented among multiple computers over a network, such as network 102 shown in FIG. 1.

Feedback 3000 includes changes made to the input provided to the optimization engine. Examples of feedback include a reasonableness assessment 3002, feasibility assessment 3004, sensitivity analysis 3006, and change in deliverables 3008. Each exemplary type of feedback 3002 through 3008 is quantified as a number so that the optimization engine can re-perform an optimization after receiving the corresponding feedback.

Examples of reasonableness assessment include an assessment by one or more individuals whether a particular result is desirable. A reasonableness assessment can result in one or more adjustments to one or more inputs to the optimization engine. Although a reasonableness assessment involves human input, a reasonableness assessment is either quantified or results in a quantified change to an input in an optimization engine. An example of a feasibility assessment 3004 includes an assessment by one or more individuals that a particular result is feasible. A feasibility assessment can result in one or more adjustments to one or more inputs to the optimization engine. Although a feasibility assessment involves human input, a feasibility assessment is either quantified or results in a quantified change to an input in an optimization engine.

An example of sensitivity analysis 3006 is to adjust slightly one or more inputs to the optimization engine and then to re-execute the optimization process. If the final result changes dramatically as a result of a slight adjustment, then the optimized solution, which is the optimized major information technology project, is considered fragile. Fragile solutions are undesirable because they are subject to a high degree of risk. Thus, one or more elements of the solution model might be adjusted in order to produce a stable solution that is not a fragile solution.

An example of a change in deliverables is a change in the desired output objects. For example, an organization might desire to produce more, fewer, or different output objects as the planning the major information technology project proceeds. Changes in these output objects change the inputs to the optimization engine.

FIG. 31 is a block diagram illustrating a computer-implemented method of creating optimized sub-projects for a major information technology project, in accordance with an illustrative embodiment. The method shown in FIG. 31 can be implemented in one or more data processing systems, such as data processing systems 104, 106, 110, 112, and 114 in FIG. 1 or data processing system 200 shown in FIG. 2. The method shown in FIG. 31 can be implemented among multiple computers over a network, such as network 102 shown in FIG. 1.

FIG. 31 summarizes the counter-intuitive method of selecting a set of optimized sub-projects into a plan for creating an optimal project definition. Instead of proceeding from a "right to left" perspective shown in the prior art method of FIG. 10, the illustrative embodiment shown in FIG. 31 solves the problem of planning a major information technology problem from "left to right."

In brief summary, input 3100 is fed into optimization engine 3102. Input 3100 includes solution model 1302 shown in FIG. 13 and FIG. 16. Input 3100 also includes boundary conditions. Boundary conditions include resources 1000 and constraints 1002, shown in FIG. 10 and FIG. 16, as well as political concerns, shown in FIG. 13 and FIG. 16. Input 3100 also includes feedback 1308, shown in FIG. 13 and FIG. 16. Input can also include other data, if desired.

A mathematical optimization operation is then performed on input 3100 during optimization 3102. As described above, optimization operations are known and have been implemented in available software. As a result of the optimization operation, optimized sub-projects 3104 are selected for major information (IT) project 3106.

FIG. 32 is a flowchart illustrating a computer-implemented method of creating optimized sub-projects for a major information technology project, in accordance with an illustrative embodiment. The method shown in FIG. 32 can be implemented in one or more data processing systems, such as data processing systems 104, 106, 110, 112, and 114 in FIG. 1 or data processing system 200 shown in FIG. 2. The method shown in FIG. 32 can be implemented among multiple computers over a network, such as network 102 shown in FIG. 1. The term "processor" as used in the description of FIG. 32 refers to one or more processors that are possibly connected via a network. The definitions of various terms used with respect to the description of FIG. 32, and the interactions of corresponding objects, can be found in the description of FIG. 13 through FIG. 30.

The process shown in FIG. 32 begins along two simultaneous paths. Along the first path, the processor receives input regarding output objects (step 3200). The processor then receives valuation data for output objects (step 3202).

From that point, simultaneously the processor both receives input regarding "as-is" data sources (step 3204) and also begins decomposing output objects. Specifically, the processor decomposes output objects into data objects (step 3206) and decomposes output objects into logical processes used to create the output objects (step 3210).

After decomposing output objects into data objects at step 3206, the processor organizes data objects into "to be" data structures. Simultaneously, the processor determines value clusters (step 3212) from the logical processes used to create the output objects at step 3210 and from the "to be" data structures at step 3208. The processor then creates an affinity matrix (step 3214) using the information gained form the value clusters determined in step 3212.

Returning to steps 3204 and 3208, the processor thereafter maps "to be" data structures organized in step 3208 to "as-is" data sources received in step 3204 (step 3216). The processor then determines processes for getting data from the source to the target (step 3218). Step 3218 is similar to transformation issues block 1018 in FIG. 16.

Returning to the start of the process, the processor also receives data regarding resources (step 3220), data regarding constraints (step 3222) and data regarding political concerns (step 3224). Steps 3220, 3222, and 3224 can be performed in parallel or in a different order shown in FIG. 32.

Next, the affinity matrix created in step 3214, the processes for getting data from the source to the target in step 3218, data regarding resources at step 3220, data regarding constraints at step 3222, and data regarding political concerns at step 3224 are provided as input into an optimization engine. The processor, using the optimization engine, then performs an optimization operation within the constraints provided (step 3226).

A determination is then made whether feedback is desired or required (step 3228). If feedback is desired or required, then the processor receives adjustments (step 3230). The process then returns to the start of the process and the entire process is repeated, though one or more steps of the process are modified or adjusted to take into account the feedback. However, if feedback is not desired or required, then the process terminates.

The output of the optimization engine can be stored in a storage device. The output of the optimization engine is the optimized project, having optimally selected optimized subprojects. A storage device can be any storage suitable for storing data, such as but not limited to hard disk drives, random access memory, read only memory, tape drives, floppy disk drives, or any other data storage medium.

Thus, a computer-implemented method, computer program product, and data processing system are provided for creating optimized sub-projects for a project. Boundary conditions, input regarding output objects, and input regarding "as-is" data sources are received. The output objects are decomposed into data objects and the output objects are also decomposed into logical processes used to create the output objects. Value clusters are determined. The data objects are organized into "to be" data structures and the "to be" data structures are mapped to the "as-is" data sources. Additional processes are determined for moving data from a source to a target. An affinity matrix is created based on the value clusters. Finally, an optimization operation is executed with an optimization engine to produce the optimized sub-projects. The optimization engine takes as inputs the boundary conditions, the "as-is" data sources, the data objects, the logical processes used to create the output objects, the value clusters, the "to be" data structures; the mapping of the "to be" data structures to the "as-is" data sources, the additional processes for moving data from the source to the target, and the affinity matrix.

The embodiments described herein have several advantages over known methods for planning various types of projects, such as major information technology projects. For example, the embodiments described herein provide data centric solution models that result in deterministically optimized projects having optimally selected optimized sub-projects. Thus, the probability that a project planned with the embodiments described herein will succeed is much higher than projects planned with known methods. Additionally, projects planned according to the embodiments described herein are very likely to result in a final project that operates much more efficient than a final project planned with known methods.

V. Advances in the Management of Chaotic Events

The previous section, Section IV, describes our prior work with regard to optimized selection of sub-projects for a major information technology project. In this section, Section V, this technology and the technology described with respect to Section III are extended in unexpected ways to the management of chaotic events.

Figure 33:
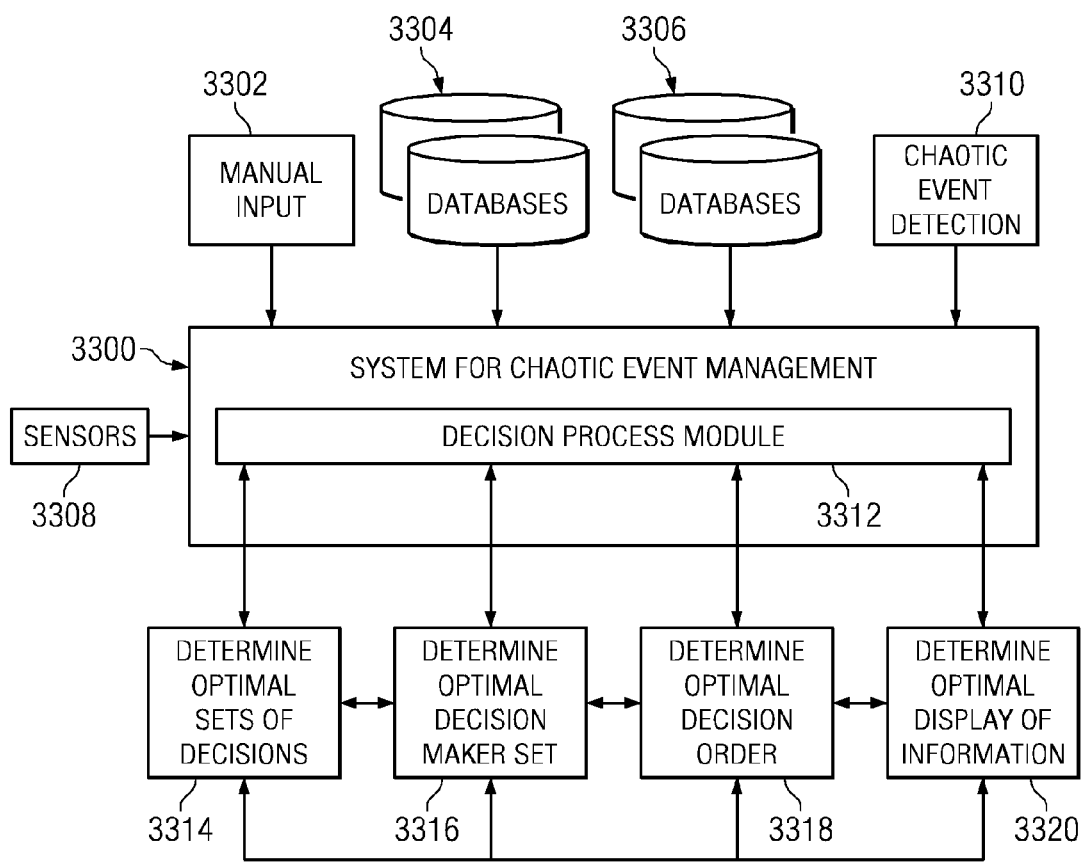
FIG. 33 is a block diagram of a system for chaotic event management, in accordance with an illustrative embodiment.

FIG. 33 is a block diagram of a system for chaotic event management, in accordance with an illustrative embodiment. The system for chaotic event management shown in FIG. 33 can be referred to as system 3300. System 3300 can be implemented in one or more data processing systems, such as data processing systems 104, 106, 110, 112, and 114 in FIG. 1, or data processing system 200 shown in FIG. 2. Aspects of system 3300 can also be implemented using the illustrative embodiments shown in FIGS. 4-6. Aspects of system 3300 can be implemented using devices and methods shown in FIGS. 7-31.

System 3300 provides for an optimized and adaptive mechanism to generate a mathematically optimal set of decisions, sequence of decisions, and associated information to one or more decision makers during chaotic events. Thus, the decision makers can most effectively respond to chaotic events even when the decision makers are under considerable stress, have limited time to make decisions, are in pain, or are limited in other ways. System 3300 generates decision sets for specific decision makers. System 3300 displays information to specific decision makers in formats that are most appropriate for those specific decision makers. System 3300 further provides a mechanism for unifying the decision process with multiple members of the decision team, and for reincorporating and dynamically processing feedback.

Thus, system 3300 provides an optimized path which will allow decision makers to reach mathematically optimal or near mathematically optimal solutions that are also non-brittle. A non-brittle solution is a solution that is relatively stable when small changes are made to the parameters that are input into system 3300. In this way, system 3300 creates an effective mechanism for decision makers to arrive at optimal or near optimal solutions, as mathematically defined, to complex decision sets that arise during real world chaotic events. Examples of the mathematics of optimization are provided with respect to FIG. 14.

System 3300 receives a variety of inputs of data that could be useful to decision makers when managing a response to a chaotic event. For example, system 3300 can receive manual input 3302 and information from numerous databases, such as database 3304 and database 3306. System 3300 can also receive input from sensors 3308 which detect various physical parameters of a chaotic event, such as but not limited to, wind speed, explosion, presence explosion strength, rainfall, flood levels, or any other physical measurement that may be of interest to decision makers.

System 3300 can use sensors 3308 or manual input 3302 to detect chaotic events. In particular, chaotic event detection 3310 is used to initiate an action by decision process module 3312.

Decision process module 3312 is part of system 3300. Decision process module 3312 may be one or more data processing systems, such as data processing systems 104, 106, 110, 112, and 114 in FIG. 1, or data processing system 200 shown in FIG. 2. Decision process module 3312 can incorporate a mathematical optimization algorithm, such as that described with respect to FIG. 14. Decision process module 3312 can take as inputs a variety of information, such as inputs from manual input 3302, databases 3304, databases 3306, sensors 3308 and chaotic event detection 3310.

Decision process module 3312 makes a number of determinations. For example, decision process module 3312 determines optimal sets of decisions as shown in block 3314. An optimal set of decisions is a set of a decisions arrived at by a mathematical optimization process taking into consideration constraints, such as, for example, money, time, available skills, available resources, manual input, data from sensors, or any other data. Decision process module 3312 also determines which decisions need to be made in a particular order to optimally respond to a chaotic event. Thus, the term optimal set of decisions refers to a set of decisions that is mathematically determined to most efficiently define a solution space using algorithms, such as those presented with respect to FIG. 14 and elsewhere herein.

Decision process module 3312 also determines an optimal decision maker set, such as in block 3316. An optimal decision maker set is a set of individuals and/or programs that should make decisions with respect to a response to the chaotic event. For example, a decision maker set can include a leader, such as, for example, the director of the Federal Emergency Management Agency, a number of sub-leaders, such as, for example, sub-directors or other individuals that answer to the authority of the director of the Federal Emergency Management Agency, a software program designed to decide when an earthquake will exceed a particular energy threshold for a particular geographical area, another software program that predicts the future path of a hurricane, or any other sets of decision makers.

Decision process module 3312 can also determine not only the set of decision makers, but also the relative organization decision makers. For example, decision process module 3312 may recommend that the director of the Federal Emergency Management Agency have the authority over the entire response effort to the chaotic event. Decision process module 3312 may then designate which individuals in the organization should have authority to make particular decisions. These individuals may or may not be part of the Federal Emergency Management Agency.

For example, decision process module 3312 may recognize from one or more databases 3304 or 3306 that a particular professor of geology has particular expertise with respect to an earthquake that occurred in a particular geographical area. Decision process module 3312 can then recommend that the particular professor have secondary decision making power with respect to particular aspects of the response to the earthquake and that the particular professor should only answer to the director of the Federal Emergency Management Agency.

Decision process module 3312 also determines an optimal decision order, as shown in block 3318. Decision process module 3312 specifically determines the order in which decisions should be made. Additionally, decision process module 3312 also determines subsets of decisions within the decision order. Thus, for example, decision process module 3312 can create sets and subsets of decisions to be made in a particular order by particular decision makers within a hierarchy of decision makers.

Decision process module 3312 also determines an optimal display of information as shown in block 3320. An optimal display of information is a display of information that, mathematically speaking, displays information in a most efficient format with respect to any given decision maker. For example, the professor of geology mentioned above may receive complex data in the form of matrices when information regarding the earthquake is displayed to the professor. However, in this particular example, the director of the Federal Emergency Management Agency does not have special technical expertise with respect to earthquakes in the particular geographical area. Therefore, decision process module 3312 will cause information to be displayed at a less technical level to the director of the Federal Emergency Management Agency. In block 3320, a display of information can also be adjusted according to the communication bandwidth that is available and according to user input, user desires, user skill level, or many other different parameters.

Decision process module 3312 operates using a massively recursive process. Thus, decision process module 3312 continually updates each of the determinations made in blocks 3314, 3316, 3318 and 3320. Additionally, decision process module 3312 takes as additional input during each iteration any new information that may arrive, decisions that are made at any particular point, as well as the output of previous iterations of decision process module 3312.

Thus, for example, the output of decision process module 3312, with respect to a previous iteration of determining optimal sets of decisions in block 3314, will become part of the input in a current and/or subsequent iteration of the mathematical optimization process of decision process module 3312. Similarly, the output of optimal decision maker sets, optimal decision order, and optimal display of information is also fed back into decision process module 3312 for additional iterations of the mathematical optimization algorithm. Thus, blocks 3314, 3316, 3318 and 3320 are all shown as interacting with each other via the arrows shown in FIG. 33.

Thus, system 3300 is capable in times of chaos of initiating a decision process based on manual input, sensor input or any other input, and producing inferential operations on information stored in databases in order to determine optimal decision sets, optimal decision maker sets, optimal decision order, and optimal display of information. These sets are subject to review, feedback, and modification in future iterations of a mathematical optimization algorithm. The processes in decision process module 3312 are adaptive based on cause, scope, and results of the chaotic situation. Decision process module 3312 determines availability of decision makers and adapts accordingly. Thus, for example, if decision makers become unavailable due to losses that occur during the chaotic event, or if additional decision makers become available during the response to the chaotic event, decision process module 3312 updates the sets of decisions, the optimal decision maker set, the order of decisions, and the display of information for each particular decision maker accordingly.

Decision process module 3312 also further determines which decision maker should make decisions and in what particular order the decisions should be made. Decision process module 3312 subdivides the generated decision sets into manageable units of work chunks. In this manner, decision process module 3312 determines an optimal order of questions to be asked and decisions to be made in order to minimize cognitive overhead of decision makers and to maximize an efficiency of the decision making process when responding to a chaotic event. Additionally, decision process module 3312 determines an adaptive and personalized set of displays to maximize the efficiency of each individual decision maker.

Decision process module 3312 and system 3300 are also sensitive to available resources, such as communication bandwidth and display types. The net effect of the combined systems and methods is to optimize an entire decision cycle in times of chaos, accounting for dynamically changing conditions, different sets of decision makers, different types of decision styles, political considerations encoded as mathematical constructs, and capabilities of decision makers, with the goal of enabling the decision makers to reach a non-brittle, mathematically optimal or near optimal solution to the complex decision sets that arise when responding to real world chaotic events. As used herein, the term non-brittle means that a particular solution does not change dramatically in response to a small change in the input to the mathematical optimization algorithm.

Decision process module 3312 can also use mathematical heuristics to eliminate decisions from the set of variable decisions that would be considered to be undesirable or otherwise a waste of time. For example, an initial set of decisions can be generated, wherein one of the decisions is whether to send helicopter rescue operations into an area being battered by a high-end force five hurricane. In this particular case, making such a decision would be considered an undesirable waste of time because the answer would be considered to be obviously a 'no'. Thus, heuristic mathematical techniques can be used to eliminate such decisions from the decision making process.

However, decision process module 3312 can incorporate user input with respect to decisions that the user desires to make. Thus, for example, even if the heuristics of decision process module 3312 were to eliminate the decision regarding helicopter rescue missions, a particular human decision maker could potentially initiate such a decision regardless of the fact that decision process module 3312 did not present that decision to the decision maker.

System 3300 and decision process module 3312 are intelligent systems in that system 3300 and decision process module 3312 can learn by incorporating solution outputs as inputs. Additionally, system 3300 and decision process module 3312 learn in response to continuing manual input and input from various data sources. For example, as decision makers practice for response to a chaotic event, decision process module 3312 and system 3300 incorporate all of the input and decisions made by decision makers back into the mathematical optimization algorithm. As a result, at each iteration, system 3300 and decision process module 3312 produce results that are more likely to correspond to expectations of the decision makers. Additionally, as system 3300 and decision process module 3312 receive continuing input and decisions regarding a response to an actual chaotic event, decision process module 3312 and system 3300 further update the list of decision makers, sets of decisions to be made, the order in which decisions are to be made, and the display of the decisions and other information. Thus, system 3300 and decision process module 3312 constantly update and refine these elements in order to maximize the efficiency of a response to a chaotic event, particularly with regard to large, complex responses to large scale chaotic events.

Figure 34:
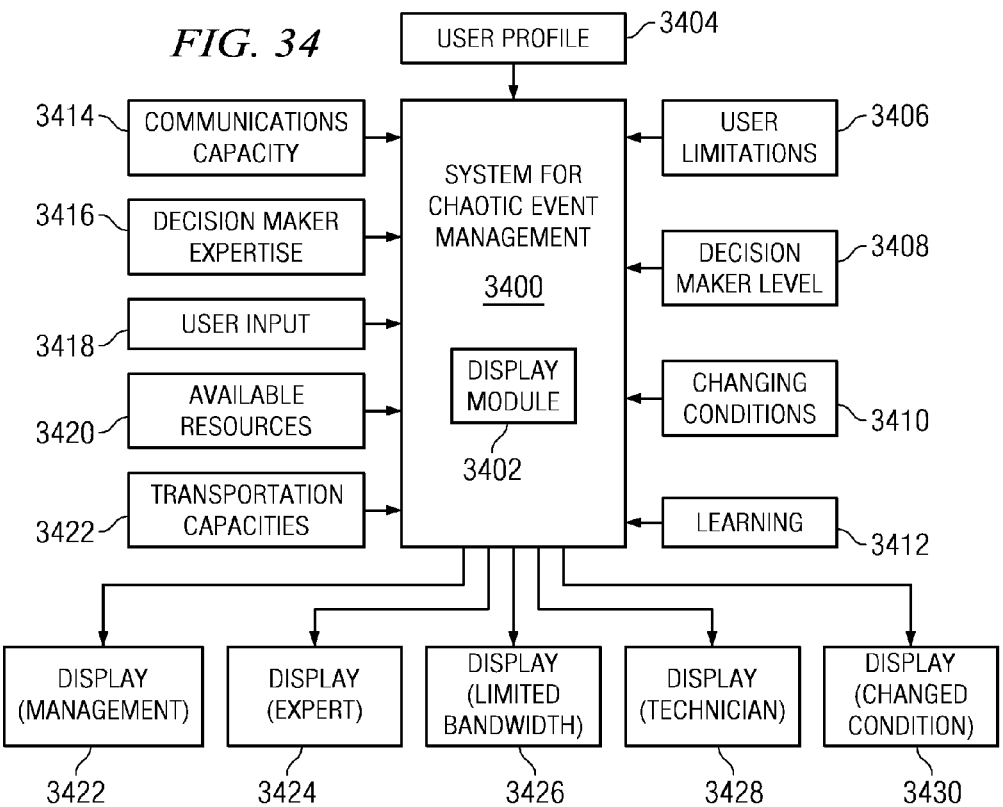
FIG. 34 is a block diagram of an additional function for a system for chaotic event management, in accordance with an illustrative embodiment.

FIG. 34 is a block diagram of an additional function for a system for chaotic event management, in accordance with an illustrative embodiment. The system for chaotic event management shown in FIG. 34 is the same as system 3300 shown in FIG. 33. Thus, the system for chaotic event management can be referred to as system 3400.

System 3400 includes display module 3402. Display module 3402 is used to determine how to display decisions and information to any given particular decision maker. Display module 3402 takes as input a variety of information, including but not limited to, user profile 3404, user limitations 3406, decision maker level 3408, changing conditions 3410, learning 3412, communications capability 3414, decision maker expertise 3416, user input 3418, available resources 3420, and transportation capacities 3422.

User profile 3404 can include a variety of information, such as but not limited to, the name of the user, the skills of the user, a user input, an education of the user, a rank of the user within a particular organization, a limitation of the user, a cultural fact regarding the user, a subject area of interest of the user, a priority of the user, a hierarchy of users, and other information that might be relevant to describe a particular user. User profile 3404 can also be used with regard to decision process module 3312 of FIG. 33 for determining optimal sets of decisions, optimal decision maker sets, optimal decision ordering, and other aspects of the presentation of decisions to be made in response to a chaotic event.

User limitations 3406 may be a part of user profile 3404 or may be stored as data sets apart from user profile 3404. User limitations 3406 include, for example, a fact that a user is blind, a fact that a user is deaf, a fact that the user does not have a mathematical background when the user is responsible for a decision that requires mathematical knowledge, a fact that a user is unavailable until a particular time, a fact that a user is injured, or any other particular limitations that might apply to a particular user. These limitations are used in determining how to display a set of decisions or other information to that user. For example, if a user is deaf, then all information is provided in picture or text format. Similarly, user limitations 3406 can be used when determining whether or not a particular user should be the decision maker at a particular level.

Similarly, decision maker level 3408 can also influence how display module 3402 displays information to a particular user. The term "decision maker level" is synonymous with the term "decision maker rank." For example, when decision maker level 3408 is above a certain point, then display module 3402 may display not only decisions sets that are pertinent to that particular user, but also decision sets pertinent to other users in order that the high level decision maker can directly or manually influence the decision sets of lower level individuals in the organization. In contrast, a decision maker level 3408 can be used to limit the availability of information to low level decision makers. A decision maker level 3408 can also be used to adjust what type of information is displayed to a particular user.

Changing conditions 3410 also influence how display module 3402 displays information and how decision process module 3312 of FIG. 33 performs its functions. For example, if a condition of a chaotic event changes, then display module 3402 may display information relevant to the change in order to call attention of the change to the decision maker. For example, if a new tornado warning is issued, then display module 3402 can be used to adjust the display for a particular decision maker to indicate that a tornado has been spotted in the decision maker's area. Changing conditions 3410 can also be used to change the sets of decisions to be made as determined in decision process module 3312 of FIG. 33.

Additionally, display module 3402 can receive as input learning 3412. As described above, display module 3402 receives input and feedback. Display module 3402 uses that information to determine an optimal method of displaying information to a particular user, as well as to determine how that information is to be displayed.

Communications capability 3414 also can be used as input into display module 3402 to determine how to display information to a particular user, or what information to display to a particular user. For example, if a specialized surgeon is assisting a general surgeon to perform a procedure over a long distance, then display module 3402 takes into account the communications capability 3414 between the specialist surgeon and the general surgeon. For example, if communications capability 3414 is a high speed connection, then display module 3402 may cause available pictures and/or video of the ongoing surgical procedure to be communicated to the display of the specialist surgeon. However, if communications capability 3414 is not sufficient to transfer such video or picture information, then display module 3402 may cause audio information or text information to be displayed to the specialist surgeon. Similarly, the communications capability 3414 available to the general surgeon is also taken into account in determining how display module 3402 displays information to the general surgeon.

Decision maker expertise 3416 is also used as input into display module 3402 to determine how to display information and what information to display to a particular user. For example, if a decision maker is considered an expert with respect to a particular aspect of the chaotic event, then display module 3402 may cause complex, technically detailed information to be displayed or otherwise transmitted to the particular decision maker. In contrast, if the decision maker does not have particular expertise, then display module 3402 may cause different information or less technically oriented information to be displayed to the particular decision maker.

User input 3418 can also be used as input into display module 3402 in order to determine how information is displayed and what information to display to the particular user. For example, if a particular decision maker does not have expertise in a particular aspect of responding to the chaotic event, but that particular user desires and has sufficient rank to obtain detailed technical data, user input 3418 can be used to cause display module 3402 to retrieve and display such information to the particular user. Additionally, user input 3418 can be used to determine how information is displayed, such as, for example, an audio format, video format, text format, outline format, trees format, or any other particular format of interest to the particular user.

User input 3418 can also be used to secure certain information from being displayed to other users of lower rank. This function is especially used in the case where classified data is used in determining optimal decision sets, optimal decision order, optimal decision makers, and optimal display types. Note that secure information, such as classified or secret information, can also possibly be used by decision process module 3312, but not displayed to those not authorized to see such information. A flag or tag can be used to mark information or information sources as being classified, secret, or otherwise secured. For example, in the case of a major terrorist attack on a nuclear weapons facility, certain secret information regarding the facility can be used in determining what decisions need to be made, but the decision process module restricts such information to decision makers having the authority to see the information. In extreme cases, the identities of decision makers can be kept secret from each other.

Additionally, available resources 3420 can be used as input into display module 3402 in order to determine how information should be displayed or what information to display to a particular user. For example, if system 3400 determines that a particular decision maker does not have any available resources 3420 at a particular time, display module 3402 may cause the particular display of that particular user to show that no action is to be taken due to lack of available resources 3420. However, when such resources become available, then display module 3402 will cause the display of that particular user to be updated to reflect decisions that can be made with respect to responding to the chaotic event.

Additionally, transportation capacities 3422 can be used as input into display module 3402 in order to determine how information should be displayed or what information to display to a particular user. For example, if enough trucks and airplanes are available to move needed supplies to a disaster area, then the logistics portion of the decision making process can be simplified so that, for example, a decision maker need not decide what supplies should be sent. However, if transportation capacity is sub-optimal, then display module 3402 can alter the display to also include a list of available supplies and a decision tree as to which supplies should be sent. Likewise, display module 3402 can alter the display to include types of transportation available and a decision tree as to how supplies should be sent.

Taken together, display module 3402 in conjunction with system 3400 can create many different types of displays. For example, display module 3402 can create management display 3422, which is adapted to most efficiently assist a manager or high level decision maker during the course of his or her duties. Additionally, display module 3402 can create expert display 3424. Expert display 3424 is particularly oriented towards use by an expert, and thus is more likely to be oriented to convey technical information or technical data. Display module 3402 can also be used to create limited bandwidth display 3426. Limited bandwidth display 3426 displays information in a form that can be transmitted over the available bandwidth. For example, if the bandwidth is large enough for audio communications but too small for video communications, then audio and text information may be communicated to a particular display.

Display module 3402 can also be used to create technician display 3428. Technician display 3428 can be oriented towards assisting decisions that a particular technician operating on a particular aspect of a problem caused by the chaotic event is to make. For example, if a hurricane knocks out a power transformer, then display module 3402 can display an electrical circuit diagram of the transformer to the technician. Additionally, display module 3402 can create a change condition display 3430. Change condition display 3430 alerts a user to changed conditions and may include multiple forms of display, such as, for example, flashing video, color, audio alarms, or other means for displaying changed conditions.

Figure 35:
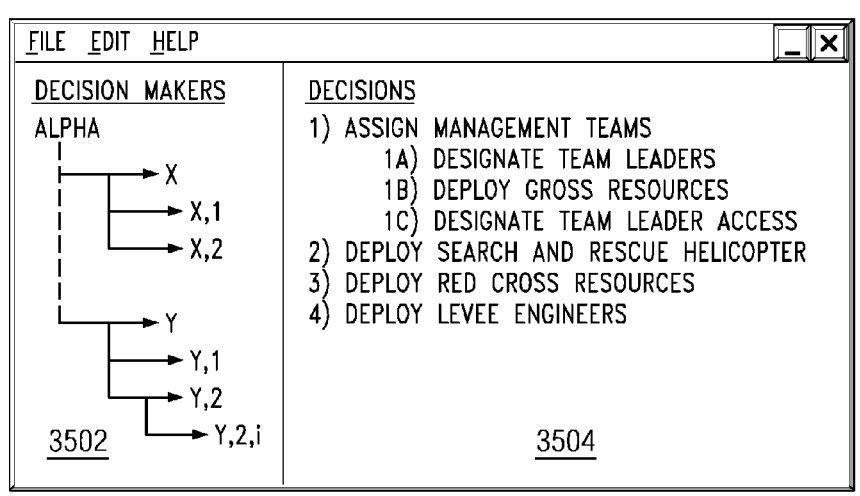
FIG. 35 is an exemplary screenshot of an output of a system for chaotic event management, in accordance with an illustrative embodiment.

FIG. 35 is an exemplary screenshot of an output of a system for chaotic event management, in accordance with an illustrative embodiment. The exemplary screen shot shown in FIG. 35 can be created using a display module and a system for chaotic event management, such as display module 3402 and system 3400 of FIG. 34. In particular, screen shot 3500 can be rendered using a data processing system, such as data processing systems 104, 106, 110, 112, and 114 in FIG. 1, or data processing system 200 shown in FIG. 2.

Screen shot 3500 shows an exemplary management display, such as management display 3422 in FIG. 34. Thus, for example, window 3502 shows a list of all available decision makers at the various levels. Window 3502 also shows the hierarchy of decision makers. The system for chaotic event management can receive input from the user with respect to decision makers in order to change the hierarchy shown in window 3502.

Additionally, window 3504 shows a set of decisions and an order in which those decisions should be made. For example, window 3504 shows that the first decision that the decision maker should make is to assign management teams. Window 3504 also shows a subset of decisions within the first decision, such as to designate team leaders, deploy gross resources, and designate team leader access.

In this particular example, the chaotic event is a levee breach. Thus, the system for chaotic event management recommends, after assigning management teams, that the decision maker decide whether to deploy search and rescue helicopters, then to decide whether to deploy Red Cross resources, and finally, to decide whether to deploy levee engineers.

Figure 36:
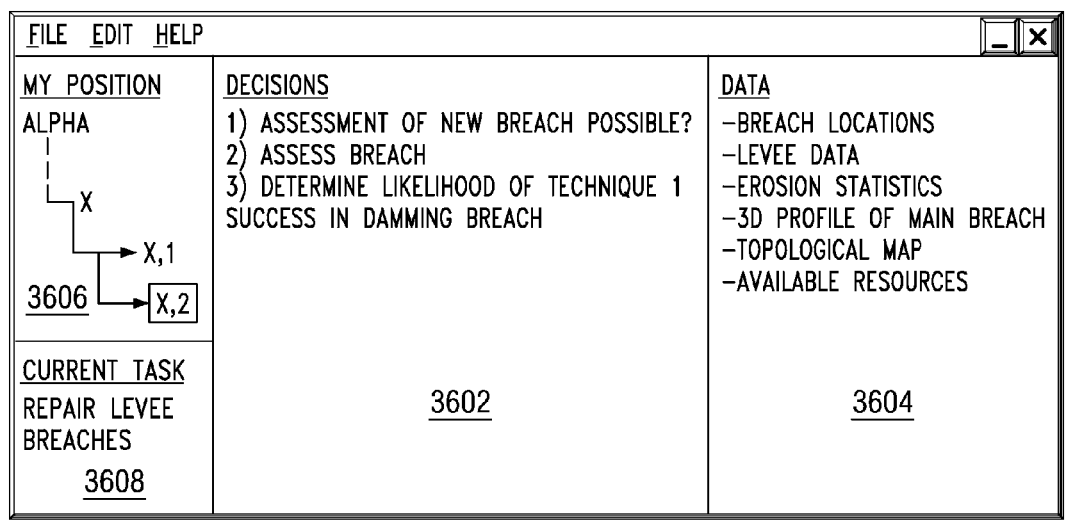
FIG. 36 is an exemplary screenshot of an output of a system for chaotic event management, in accordance with an illustrative embodiment.

FIG. 36 is an exemplary screenshot of an output of a system for chaotic event management, in accordance with an illustrative embodiment. Screen shot 3600 is an exemplary screen shot that can be created using display module 3402 of system 3400 shown in FIG. 34. Screen shot 3600 can be rendered by data processing systems, such as data processing systems 104, 106, 110, 112, and 114 in FIG. 1, or data processing system 200 shown in FIG. 2.

In particular, screen shot 3600 shows a subset of decisions to be made by an expert at the scene of a particular levee breach. Screen shot 3600 is different than screen shot 3500 shown in FIG. 35 because the role of the expert is different than that of the manager. For example, the expert has different concerns and makes different decisions compared to the leader of the response effort.

Thus, for example, screen shot 3600 shows window 3602, which includes a set of decisions and an order in which the decisions should be made. In this example, the expert should first assess if a determination physically and securely can be made to determine if a new breach has occurred. In the second decision, the expert should assess the current levee breach. In the third decision, the expert should assess the likelihood of a first technique to succeed in damming the breach.

To assist the expert user, screen shot 3600 includes window 3604, which includes a variety of data that the expert can access. For example, the expert could access breach locations, levee data, such as, for example, dimensions or type of levee, erosion statistics, water flow at a particular rate over a particular type of material, three-dimensional profiles of the main breach, a topological map of the geographical area in which the breach took place, and a list of available resources for responding to the breach.

Screen shot 3600 also shows window 3608, which shows the current tasks that the expert is involved in, such as, for example, to repair levee breaches. Screen shot 3600 also includes window 3606, which shows the position of the decision maker in the hierarchy of decision makers. This information may be useful in case the expert needs to consult a higher level decision maker when making a particular decision, or to request additional resources.

Additionally, window 3606 can be used to show contact information for the other users in the decision hierarchy. Additionally, window 3606 can be used to show other individuals that may have skills that the expert determines would be of use in performing the task of inspecting and repairing the levee breach.

Figure 37:
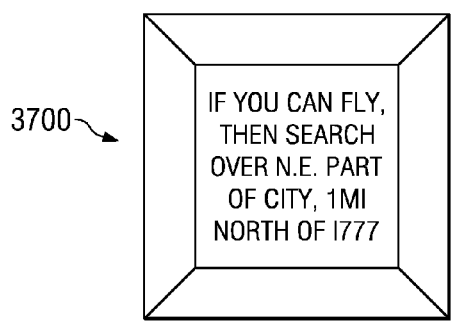
FIG. 37 is an exemplary screenshot of an output for a system for chaotic event management, in accordance with an illustrative embodiment.

FIG. 37 is an exemplary screenshot of an output of a system for chaotic event management, in accordance with an illustrative embodiment. Display 3700 is a display that can be created using display module 3402 using information from system 3400 in FIG. 34. Screen shot 3700 can be rendered using a data processing system, such as data processing systems 104, 106, 110, 112, and 114 in FIG. 1, or data processing system 200 shown in FIG. 2.

Screen shot 3700 is relatively simple, showing a small amount of text. In constructing screen shot 3700, display module 3402 in FIG. 34 receives as input that screen shot 3700 would have to be displayed on a tiny display window of an onboard system of a helicopter having no audio capability and limited bandwidth capability. Thus, display module 3402 of FIG. 34 sends a very simple text message to the display on screen shot 3700.

Additionally, display module 3402 and system 3400 of FIG. 34 recognize from available input that the helicopter pilot is flying in an intense storm and will have limited ability to assess complex instructions or to assess complex decisions because the pilot will be distracted by the need to safely pilot the aircraft. As a result, display module 3402 of FIG. 34 causes the simple instruction shown in screen shot 3700 to be displayed. In particular, screen shot 3700 shows the text message "if you can fly, then search over northeast part of city, 1 mile north of I-777." This simple message can be quickly and easily understood by the helicopter pilot, who can then make an appropriate decision as to whether or not the helicopter pilot can proceed to the area where a rescue is needed.

FIG. 38 is a flowchart illustrating an operation of a system for chaotic event management, in accordance with an illustrative embodiment. The process shown in FIG. 38 can be implemented using a system for chaotic event management, such as system 3300 shown in FIG. 33 or system 3400 shown in FIG. 34 and can be further implemented using one or more data processing system, such as such as data processing systems 104, 106, 110, 112, and 114 in FIG. 1, or data processing system 200 shown in FIG. 2.

The process begins as the system receives notification of a chaotic event (step 3800). The system then performs a decision process (step 3802). The decision process is implemented using mathematical heuristic algorithms and a mathematical optimization algorithm based upon input from a variety of sources. Sources can include input on constraints, available resources, data regarding a chaotic event, manual input from sensors measuring a chaotic event, and possibly many other types of inputs.

The system then simultaneously performs four determinations. The system determines an optimal decision maker set in step 3804. An optimal decision maker set is a set of decision makers that should make decisions with respect to responding to the chaotic event. The system also determines an optimal set of decisions (step 3806). An optimal set of decisions is a set of decisions that is mathematically determined, based on available inputs, to most efficiently respond to a particular chaotic event. An optimal set of decisions represents a mathematical solution to an optimization process using an objective function, model formulation, constraints and available resources.

The process also determines an optimum decision order (step 3808). An optimal decision order is a mathematically determined order in which decisions should be made in order to maximize the efficiency of response to the chaotic event. Again, the optimum decision order is an output of a mathematical optimization algorithm. The system also determines an optimal display of information (step 3810). An optimal display of information is a display of information mathematically determined to maximize efficiency of display of information to one or more decision makers. An example of optimally determined display information can be found in FIG. 35 through FIG. 37.

The system receives each of the determinations in steps 3804 through 3810 (step 3812). The system then receives manual input and/or automatic input (step 3814). During this step, the system receives input from users, decision makers, sensors, or one or more data sources that might be required or desired. The input can also include a decision template. A decision template is a data structure that defines a structure of a set of decisions for a particular type of chaotic event. A decision template can include sample decisions that are to be made with respect to a particular type of chaotic event.

The system then determines whether to iterate the decision process before displaying information (step 3816). The determination of whether to iterate the decision process is made primarily by first iterating the decision process, changing the iteration process slightly and determining if a slight change leads to a greatly different result. A result that is greatly different based on a small change in initial conditions is referred to as a brittle answer. In most cases, the system will reprocess the model over a range of inputs to determine changes to the optimal solution. If the optimal solution is brittle, the system user can be presented additional information about the range of new answers, given changes to the input values. If the slight change results in little substantial change in the final result, then the process iteration is complete.

Therefore, at step 3816, if the system decides that iteration of the decision process is to be performed, then the process returns to step 3802 and repeats. Otherwise, if the decision process is not to be iterated, the system displays the decision maker set (step 3818). The system then displays the decision set and decision order to respective decision makers according to an optimal display method (step 3820).

The system then performs multiple functions simultaneously. The system receives decisions from decision makers as those decisions are made (step 3822). The system also receives feedback (step 3824). Feedback includes user input, results of prior decision processes, such as previous optimal decision maker sets, previous optimal sets of decisions, previous optimal decision orders, and previous optimal displays. Feedback also includes input regarding the chaotic event, such as changing conditions of the chaotic event.

The system also receives other new information (step 3826). Other new information can include changes to information related to the chaotic event, such as, for example, the fact a tornado was generated within a hurricane, the fact that a levee breach was caused by a hurricane, or measurements of changes of wind speed of the hurricane, or other information. Other new information can include additions to or subtractions from the set of available decision makers, new available data, loss of available data, loss of monitoring devices, new communications ability, loss of communications ability, new resources, loss of resources, or any other new information that could be relevant to the decision making process.

The system then determines whether a new iteration is desired or recommended (step 3828). A new iteration is desired or recommended in most cases as soon as any decision is received in step 3822, feedback is received in step 3824, or other new information is received at step 3826. However, in other embodiments, a new iteration may not be desired or recommended when processing power is limited as a result of the chaotic event. In this case, a delay between iterations may be recommended in order to most efficiently use available processing power. If a new iteration is desired or recommended, then the process returns to step 3802 and repeats. If a new iteration is not desired or recommended, then the system determines whether to end the process (step 3830). If the process is not to end, then simultaneously the system continues to perform steps 3822, 3824, and 3826. Otherwise, the process terminates.

FIG. 39 is a flowchart illustrating a process of sub-dividing a decision set, in accordance with an illustrative embodiment. The process shown in FIG. 39 can be implemented using a system for chaotic event management, such as system 3300 shown in FIG. 33 or system 3400 shown in FIG. 34. The process shown in FIG. 39 can be implemented in one or more data processing systems, such as data processing systems 104, 106, 110, 112, and 114 in FIG. 1, or data processing system 200 shown in FIG. 2.

The process begins as the system receives information on decision makers (step 3900). Information on decision makers can include user profiles and other information regarding decision makers. A user profile can include a variety of information, such as skill of the user, user input, education of the user, a limitation of the user, a cultural fact regarding the user, political influence of the user, a rank of the user within an organization, a name of the user, a subject area of interest of the user, a priority of the user, and a hierarchy of users, although other information can be included in a user profile.

The process then retrieves stored templates for decision types and decision maker types (step 3902). A template for a decision type is a data structure which contains a set of difficult decisions for a response to a particular chaotic event type or is a data structure that is adapted to receive information or output from a chaotic event management system, such as system 3300 shown in FIG. 33 or system 3400 shown in FIG. 34. A decision maker type template is a data structure that holds information relevant to different types of decision makers, such as, but not limited to, managers, experts, technicians, police personnel, fire personnel, government officials, Federal Emergency Management Agency officials, National Guard officers, National Transportation Safety Board investigators, military personnel, or other professionals. A decision maker type template can also be a data structure for holding an output of a system for chaotic event management, such as system 3300 shown in FIG. 33 or system 3400 shown in FIG. 34.

The system then incorporates prior learning (step 3904). Prior learning includes any feedback incorporated into the system and includes prior outputs of the system. The system then performs a heuristic selection process to eliminate unsatisfactory results (step 3906). A heuristic selection process is defined as a mathematical heuristic selection method. Unsatisfactory results are results that are deemed to be unsatisfactory to a user or decision maker.

The system then performs a mathematical optimization algorithm to subdivide the resulting decision set (step 3908). By subdividing the decision set, the system creates small work chunks that are more easily managed by the decision maker. Thus, the decision maker is not faced with an overwhelming set of decisions or a set of decisions that are considered to be too difficult to make under stress or in a limited amount of time. The process of performing optimization to subdivide a decision set can be implemented using the methods and devices described with respect to FIG. 13 through FIG. 31.

The system then receives any additional feedback (step 3910). Feedback can include the output of the heuristic selection process, the output of previous mathematical optimization algorithms with respect to creating the initial decision set, subdividing a decision set, or the selection of decision makers. Feedback can also include user input, a change in facts regarding the chaotic event, or other types of new information.

The system then determines whether to perform recursion (step 3912). A recursion process should be performed any time a feedback is received. However, in some cases where processing power is limited, the recursion process may be performed only within certain time intervals or only when certain important facts, as determined by a user, are received. If recursion is to be performed, then the process returns to step 3908 and repeats. Otherwise, if no recursion is to be performed at this point or if continual recursion is performed, then the system stores optimally selected decision sets (step 3914).

The system then determines whether to iterate the entire process (step 3916). Ideally, the process should be iterated continuously as new feedback is continuously received. However, iteration may be limited to a particular number of times or to receipt of particular types of information or receipt of what is determined to be important information in order to conserve processing power. If the process is to iterate, then the process returns to step 3900 and repeats. Otherwise, the process terminates.

FIG. 40 is a flowchart of a process of sequencing a set of decisions, in accordance with an illustrative embodiment. The process shown in FIG. 40 can be implemented in a system for chaotic event management, such as system 3300 shown in FIG. 33 or system 3400 shown in FIG. 34. The process shown in FIG. 40 can be implemented in a data processing system, such as data processing systems 104, 106, 110, 112, and 114 in FIG. 1, or data processing system 200 shown in FIG. 2.

The process begins as the system receives an optimally selected decision set (step 4000). The system then optimizes a subset of decisions with respect to decision order (step 4002). The subset of decisions is within the optimally selected decision set. The system then determines whether additional subsets of decisions should be ordered (step 4004). If additional subsets of decisions are to be ordered or otherwise sequenced, then the process returns to step 4002 and repeats.

If no additional subsets of decisions are to be ordered or sequenced at step 4004, then the system generates an ordered decision set with focused supporting data (step 4006). An ordered decision set is a set of decisions to be taken in a particular order. Focused supporting data is data that supports the selected order of decisions. Focused supporting data is also data that supports the reason why the decisions were selected or the order of decisions was designated. Focused supporting data is also data to be used by the decision maker to make a particular decision.

The system then displays the ordered decision set for a particular decision maker (step 4008). Thus, multiple decision makers can receive different sets of decisions with different sequences. Which users or decision makers receive which sets of decisions in any given particular order depends on a user profile of each particular user.

The system then determines whether interaction with decisions, other decision makers, and other information is to be performed (step 4010). If such an interaction is to be performed, then the system generates a new optimally selected decision set (step 4012). The process then returns to step 4000 and repeats. However, if an interaction is not to be performed, then the process terminates.

Figure 41:
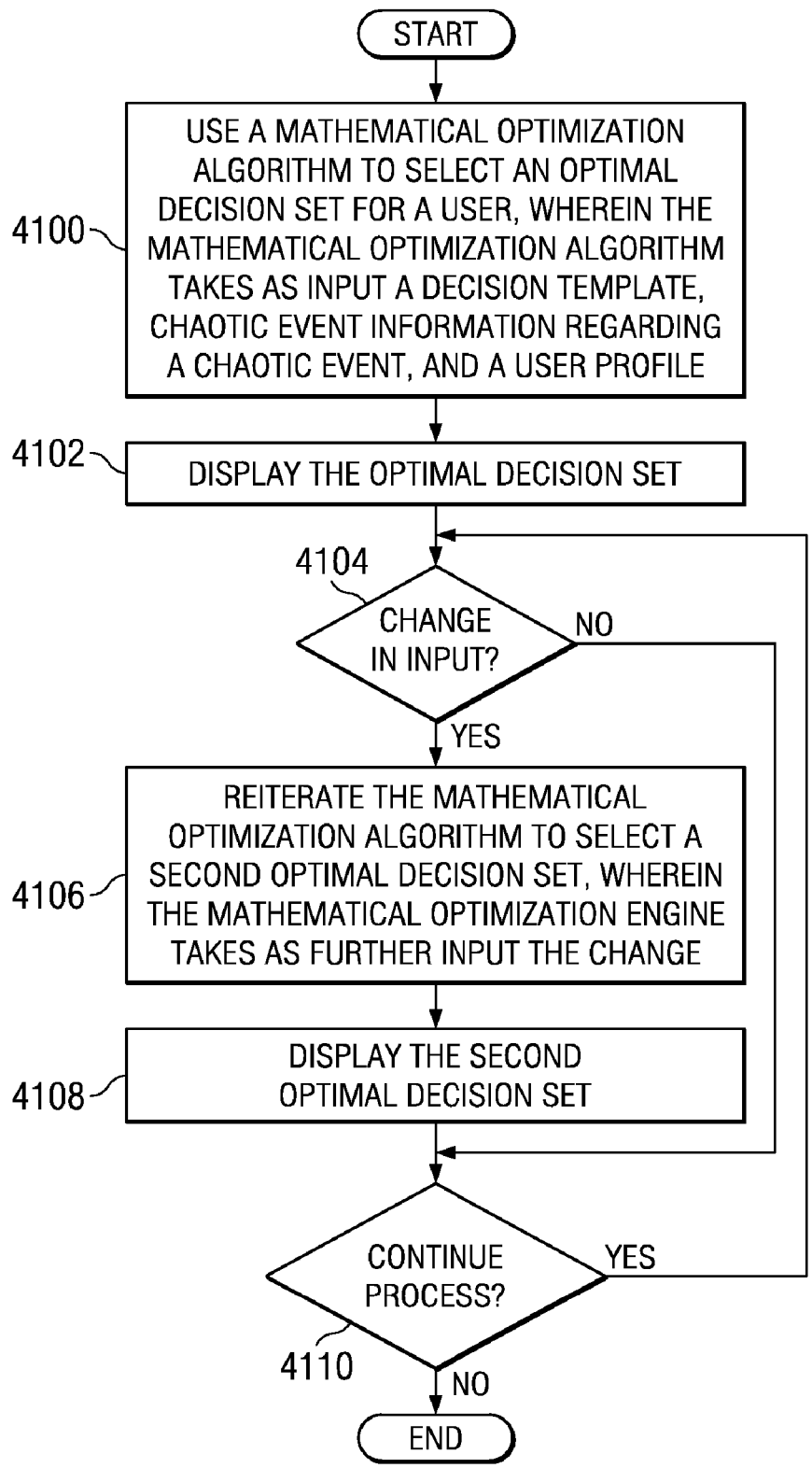
FIG. 41 is a flowchart illustrating a process of generating optimal decision sets, in accordance with an illustrative embodiment.

FIG. 41 is a flowchart illustrating a process of generating optimal decision sets, in accordance with an illustrative embodiment. The process shown in FIG. 41 can be implemented using a system for chaotic event management, such as system 3300 shown in FIG. 33 or system 3400 shown in FIG. 34. The process can also be implemented using one or more data processing systems, such as data processing systems 104, 106, 110, 112, and 114 in FIG. 1, or data processing system 200 shown in FIG. 2.

The process begins as the system uses a mathematical optimization algorithm to select an optimal decision set for a user, wherein the mathematical optimization algorithm takes as input a decision template, chaotic event information regarding a chaotic event, and a user profile (step 4100). The system then displays the optimal decision set (step 4102). The system then determines whether any change in input occurs (step 4104). A change in input can occur as a result of previous outputs of the system, new inputs from the user, new inputs of information from data sources, or changes in information regarding a chaotic event.

If a change in input occurs, then the system reiterates the mathematical optimization algorithm to select a second optimal decision set, wherein the mathematical optimization engine takes as further input the change (step 4106). The system then displays the second optimal decision step (step 4108). The system then determines whether to continue the process (step 4110). If the process is to continue, then the process returns to step 4104 and repeats. Note that a 'no' result to the change in input decision at step 4104 results in the process skipping to step 4110. If the process at step 4110 does not continue, then the process terminates.

FIG. 42 is a flowchart illustrating a process of generating a set of decisions, in accordance with an illustrative embodiment. The process shown in FIG. 42 can be implemented in a system for chaotic event management, such as system 3300 shown in FIG. 33 or system 3400 shown in FIG. 34. The system shown in FIG. 42 can also be implemented using one or more data processing systems, such as data processing systems 104, 106, 110, 112, and 114 in FIG. 1, or data processing system 200 shown in FIG. 2.

The process begins as the system receives a plurality of decisions related to a chaotic event (step 4200). The system then uses a heuristic algorithm to eliminate a first subset of decisions, wherein the first subset of decisions is in the first plurality of decisions, wherein a second plurality of decisions is formed, and wherein the second plurality of decisions comprises the first plurality of decisions less the first subset of decisions (step 4202).

The system then uses a mathematical optimization algorithm to select a second subset of decisions, wherein the second subset of decisions are within the second plurality of decisions, and wherein the mathematical optimization algorithm takes as input at least one constraint and chaotic event information (step 4204). The system then stores the second subset of decisions (step 4206).

The system then uses the mathematical optimization algorithm to further subdivide the second subset of decisions into a plurality of subsets of decisions (step 4208). The system assigns corresponding ones of the plurality of subsets of decisions to corresponding decision makers of a plurality of decision makers, wherein assigning is based on corresponding user profiles of the plurality of decision makers (step 4210).

The system then displays the corresponding ones of the plurality of subsets of decisions on corresponding displays of the corresponding decision makers (step 4212). The process terminates thereafter.

In an illustrative embodiment, the at least one constraint in the process shown in FIG. 42 can be many different types of constraints. Exemplary constraints include a user profile, a priority, a list of priorities, a stored decision template, a previously determined subset of decisions, a mathematical characterization of a political consideration, available resources, a communication method, a time allowed to perform a task, risk tolerance, data quality, data reliability, a physical measurement or calculation related to the chaotic event, a monetary limitation, a classified information policy, a security requirement, and a hazardous material restriction. Numerous other types of constraints can be included when executing the process of FIG. 42.

In another illustrative embodiment, the second subset of decisions can be displayed. Additionally, a display window on the display can be altered based on the user profile. Thus, depending on the type of decision maker, upon user preferences, or upon other information, the type of information displayed and how the information is displayed can be altered with respect to each individual decision maker.

In an illustrative embodiment, the first subset of decisions can be an unsatisfactory decision as determined by at least one user. An unsatisfactory decision can be, for example, a decision that would be immediately obvious, a decision that does not make sense within the context of the chaotic event, or other decisions that may be considered to be unsatisfactory.

In another illustrative embodiment, the process can be extended by receiving a fact in the form of at least one datum. A fact is included in the at least one constraint to form a modified set of constraints. The mathematical optimization algorithm can be reiterated to select a third subset of decisions, when the third subset of decisions are within the second plurality of decisions, wherein the third subset of decisions is different than the second subset of decisions, and wherein the mathematical optimization algorithm takes as further input the modified subset of constraints. The resulting third subset of decisions is then stored.

The third set of decisions can then be further subdivided as described above with respect to FIG. 42. The fact in question can be any number of facts including, but not limited to, a change in the chaotic event information, a removal of a constraint, an addition of a constraint, an addition of a new decision maker, a removal of a decision maker, a change in rank of a decision maker, a decision rendered by a decision maker, user input and combinations thereof.

FIG. 43 is a flowchart illustrating a process of optimizing a sequence of decisions, in accordance with an illustrative embodiment. The process shown in FIG. 43 can be implemented in a system for chaotic event management, such as system 3300 shown in FIG. 33 or system 3400 shown in FIG. 34. The process shown in FIG. 43 can be implemented using a data processing system, such as data processing systems 104, 106, 110, 112, and 114 in FIG. 1, or data processing system 200 shown in FIG. 2.

The process begins as the system receives a plurality of decisions related to a chaotic event (step 4300). The system then uses a mathematical optimization algorithm to select a sequence in which the plurality of decisions are to be considered, wherein the mathematical optimization algorithm takes as input at least one constraint and chaotic event information (step 4302). The system then stores the sequence (step 4304).

The system then receives a fact in the form of at least one datum (step 4306). The system includes the fact in the at least one constraint to form a modified set of constraints (step 4308).

The system reiterates the mathematical optimization algorithm to select a second sequence of decisions, wherein the second sequence of decisions is different from the first sequence of decisions, and wherein the mathematical optimization algorithm takes as further input the modified subset of constraints (step 4310). The system then stores the second sequence of decisions (step 4312). The process terminates thereafter.

In an illustrative embodiment, the sequence of decisions is mathematically optimized to achieve a particular goal in the shortest possible time. For example, a goal may be to contain a levee breach, or a goal may be to rescue individuals within a particular geographical location. Thus, in an illustrative embodiment, the sequence of decisions is mathematically optimized to bound a solution space in the shortest possible time.

FIG. 44 is a flowchart illustrating a process of generating an optimal sequence of decisions, in accordance with an illustrative embodiment. The process shown in FIG. 44 can be implemented in a system for chaotic event management, such as system 3300 shown in FIG. 33 or system 3400 shown in FIG. 34. The process shown in FIG. 44 can be implemented using one or more data processing systems, such as data processing systems 104, 106, 110, 112, and 114 in FIG. 1, or data processing system 200 shown in FIG. 2.

The process begins as the system receives a plurality of decisions related to a chaotic event (step 4400). The system then uses a mathematical optimization algorithm to select a sequence in which the plurality of decisions are to be considered, wherein the mathematical optimization algorithm takes as input at least one constraint and chaotic event information (step 4402).

The system then stores the sequence (step 4404). The system then receives a fact in the form of at least one datum (step 4406). The system includes the fact in the at least one constraint to form a modified set of constraints (step 4408).

The system then reiterates the mathematical optimization algorithm to select a second sequence of decisions, wherein the second sequence of decisions is different from the first sequence of decisions, and wherein the mathematical optimization algorithm takes as further input the modified subset of constraints (step 4410). The system then stores the second sequence of decisions (step 4412). The process terminates thereafter.

In an illustrative embodiment, resource information regarding resources useful for responding to the chaotic event is received in the system. The mathematical optimization algorithm takes as further input the resource information.

In another illustrative embodiment, the system monitors for change in the chaotic event information. Then, responsive to detecting the change, the system reiterates the mathematical optimization algorithm to select a second optimal decision set, wherein the mathematical optimization algorithm takes as further input the change. The system then displays the second optimal decision set for the user.

In another illustrative embodiment, the system receives information that a second user is a decision maker with respect to a chaotic event, wherein the second user has a second user profile. The system reiterates the mathematical optimization algorithm to select a second optimal decision set for the user, and a third optimal decision set for the second user, when the mathematical optimization algorithm takes as further input the second user profile.

The system then displays the second optimal decision set on a first display associated with the user, and wherein the second optimal decision set is further displayed on a first window of the first display. The system also displays this third optimal decision set on a second display associated with the second user, wherein the third optimal decision set is further displayed on a second window of the second display, and wherein the first window and the second window have different display characteristics based on an output of the mathematical optimization engine. In another illustrative embodiment, the system adjusts how the optimal decision set is displayed based on a limitation of a particular display used by the user.

FIG. 45 is a flowchart illustrating a process of generating and sequencing an optimal decision set, in accordance with an illustrative embodiment. The process shown in FIG. 45 can be implemented in a system for chaotic event management, such as system 3300 shown in FIG. 33 or system 3400 shown in FIG. 34. The system shown in FIG. 45 can be implemented in one or more data processing systems, such as data processing systems 104, 106, 110, 112, and 114 in FIG. 1, or data processing system 200 shown in FIG. 2.

The process begins as the system uses a mathematical optimization algorithm to select a first optimal decision set for a user, wherein the mathematical optimization algorithm takes as input a decision template, chaotic event information, at least one constraint, and a user profile (step 4500). The system then uses a heuristic algorithm to eliminate a first subset of decisions, wherein the first subset of decisions is in the first optimal decision set, wherein a second optimal decision set is formed, and wherein the second optimal decision set comprises the first optimal decision set less the first subset of decisions (step 4502).

The system then uses the mathematical optimization algorithm to select a sequence in which decisions in the second optimal decision set are to be considered, wherein the mathematical optimization algorithm takes as input the second optimal decision set, the decision template, the chaotic event information, the at least one constraint, and the user profile (step 4504). The system then stores the sequence (step 4506).

Responsive to at least one of a received decision and a change in at least one of the decision template, the chaotic event information, the at least one constraint, and the user profile, the system reiterates the mathematical optimization algorithm to select a third optimal decision set for the user, wherein the mathematical optimization algorithm receives as further input the at least one of the decision and the change (step 4508). The system then uses a heuristic algorithm to eliminate a second subset of decisions, wherein the second subset of decisions is in the third optimal decision set, wherein a fourth optimal decision set is formed, and wherein the fourth optimal decision set comprises the third optimal decision set less the second subset of decisions (step 4510).

The system then uses a mathematical optimization algorithm to select a second sequence in which decisions in the fourth optimal decision set are to be considered, wherein the mathematical optimization algorithm takes as input the fourth optimal decision set, the decision template, the chaotic event information, the at least one constraint, and the user profile (step 4512). The system then stores the second sequence (step 4514), and terminates thereafter.

In an illustrative embodiment, when using the mathematical optimization algorithm to select the sequence, the mathematical optimization engine further takes as input the first subset of decisions. In this manner, the process can be massively recursively performed using as input output of previous iterations of the system.

The illustrative embodiments described herein solve many of the problems faced by decision makers charged with the responsibility of responding to a chaotic event. Particularly with respect to responding to large scale chaotic events, such as a major hurricane like Hurricane Katrina, decision makers are faced with an overwhelming number of decisions based on limited information. Even when information is available, limited time is available in which to make decisions. When time is limited, information that is particularly relevant may not present itself to the decision makers in a short enough time. Additionally, lower level decision makers may not know to whom to turn for instructions. The illustrative embodiments described herein provide a mechanism to solve all of these problems.

VI. Conclusion

The invention can take the form of an entirely hardware embodiment, an entirely software embodiment or an embodiment containing both hardware and software elements. In a preferred embodiment, the invention is implemented in software, which includes firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for displaying information related to a chaotic event for a plurality of decision makers managing a plurality of effects of the chaotic event, the computer implemented method comprising:

using a mathematical optimization algorithm causing the processor to select an optimal decision set for a corresponding decision maker, wherein the mathematical optimization algorithm takes as input a decision template, a plurality of chaotic event information regarding the chaotic event, and a corresponding decision maker profile, and wherein the chaotic event is an interruption in a plurality of routines normally performed by people in everyday activities because of damage inflicted to individuals and infrastructures; and displaying the optimal decision set for the corresponding decision maker.

2. The computer implemented method of claim 1 further comprising:

responsive to a change in at least one of the decision template, the plurality of chaotic event information, and the corresponding decision maker profile, reiterating the mathematical optimization algorithm to select a second optimal decision set for the corresponding decision maker, wherein the mathematical optimization algorithm receives as further input the change; and displaying the second optimal decision set for the corresponding decision maker.

3. The computer implemented method of claim 1 wherein displaying is performed in a display window of a data processing system, and wherein the method further comprises:

altering the display window based on an output of the mathematical optimization algorithm, whereby the display is altered according to at least one of the decision template, the plurality of chaotic event information, and the corresponding decision maker profile, and combinations thereof.

4. The computer implemented method of claim 1 further comprising:

receiving resource information regarding resources useful for responding to the chaotic event, wherein the mathematical optimization algorithm takes as further input the resource information.

5. The computer implemented method of claim 1 wherein the corresponding decision maker profile comprises at least one element selected from the group consisting of: a skill of the corresponding decision maker, a corresponding decision maker input, an education of the corresponding decision maker, a limitation of the corresponding decision maker, a cultural fact regarding the corresponding decision maker, a political influence of the corresponding decision maker, and a rank of the corresponding decision maker, and wherein the at least one element influences how the mathematical optimization algorithm selects the optimal decision set.

6. The computer implemented method of claim 1 further comprising:
receiving a decision;
reiterating the mathematical optimization algorithm to select a second optimal decision set, wherein the mathematical optimization algorithm takes as further input the decision; and
displaying the second optimal decision set for the corresponding decision maker.

7. The computer implemented method of claim 1 further comprising:
monitoring for a change in the plurality of chaotic event information; and
responsive to detecting the change, reiterating the mathematical optimization algorithm to select a second optimal decision set, wherein the mathematical optimization algorithm takes as further input the change; and
displaying the second optimal decision set for the corresponding decision maker.

8. The computer implemented method of claim 1 further comprising:
receiving information that a second corresponding decision maker has a second corresponding decision maker profile; and
reiterating the mathematical optimization algorithm to select a second optimal decision set for the corresponding decision maker and a third optimal decision set for the second corresponding decision maker, wherein the mathematical optimization algorithm takes as further input the second corresponding decision maker profile;
displaying the second optimal decision set on a first display associated with the corresponding decision maker, and wherein the second optimal decision set is further displayed on a first window of the first display; and
displaying the third optimal decision set on a second display associated with the second corresponding decision maker, wherein the third optimal decision set is further displayed on a second window of the second display, and wherein the first window and the second window have different display characteristics based on an output of the mathematical optimization engine.

9. The computer implemented method of claim 1 further comprising:
adjusting how the optimal decision set is displayed based on a limitation of a particular display used by the corresponding decision maker.

10. A computer program product comprising:
a computer usable medium having computer usable program code for displaying information related to a chaotic event for a plurality of decision makers managing a plurality of effects of the chaotic event, the computer program product including:
computer usable program code for using a mathematical optimization algorithm to select an optimal decision set for a corresponding decision maker, wherein the mathematical optimization algorithm takes as input a decision template, a plurality of chaotic event information regarding the chaotic event, and a corresponding decision maker profile, and wherein the chaotic event is an interruption in a plurality of routines normally performed by people in everyday activities because of damage inflicted to individuals and infrastructures; and
computer usable program code for displaying the optimal decision set for the corresponding decision maker.

11. The computer program product of claim 10 further comprising:

computer usable program code for, responsive to a change in at least one of the decision template, the plurality of chaotic event information, and the corresponding decision maker profile, reiterating the mathematical optimization algorithm to select a second optimal decision set for the corresponding decision maker, wherein the mathematical optimization algorithm receives as further input the change; and
computer usable program code for displaying the second optimal decision set for the corresponding decision maker.

12. The computer program product of claim 10 wherein displaying is performed in a display window of a data processing system, and wherein the method further comprises:
computer usable program code for altering the display window based on an output of the mathematical optimization algorithm, whereby the display is altered according to at least one of the decision template, the plurality of chaotic event information, the corresponding decision maker profile, and combinations thereof.

13. The computer program product of claim 10 further comprising:
computer usable program code for receiving resource information regarding resources useful for responding to the chaotic event, wherein the mathematical optimization algorithm takes as further input the resource information.

14. The computer program product of claim 10 wherein the corresponding decision maker profile comprises at least one element selected from the group consisting of: a skill of the corresponding decision maker, a corresponding decision maker input, an education of the corresponding decision maker, a limitation of the corresponding decision maker, a cultural fact regarding the corresponding decision maker, and a political influence of the corresponding decision maker, and a rank of the corresponding decision maker, and wherein the at least one element influences how the mathematical optimization algorithm selects the optimal decision set.

15. The computer program product of claim 10 further comprising:
receiving a decision;
reiterating the mathematical optimization algorithm to select a second optimal decision set, wherein the mathematical optimization algorithm takes as further input the decision; and
displaying the second optimal decision set for the corresponding decision maker.

16. The computer program product of claim 10 further comprising:
monitoring for a change in the plurality of chaotic event information; and
responsive to detecting the change, reiterating the mathematical optimization algorithm to select a second optimal decision set, wherein the mathematical optimization algorithm takes as further input the change; and
displaying the second optimal decision set for the corresponding decision maker.

17. The computer program product of claim 10 further comprising:
receiving information that a second corresponding decision maker has a second corresponding decision maker profile; and
reiterating the mathematical optimization algorithm to select a second optimal decision set for the corresponding decision maker and a third optimal decision set for the second corresponding decision maker, wherein the mathematical optimization algorithm takes as further input the second corresponding decision maker profile;

displaying the second optimal decision set on a first display associated with the corresponding decision maker, and wherein the second optimal decision set is further displayed on a first window of the first display; and displaying the third optimal decision set on a second display associated with the second corresponding decision maker, wherein the third optimal decision set is further displayed on a second window of the second display, and wherein the first window and the second window have different display characteristics based on an output of the mathematical optimization engine.

18. The computer program product of claim 10 further comprising:

adjusting how the optimal decision set is displayed based on a limitation of a particular display used by the corresponding decision maker.

19. A data processing system comprising:

a bus;

at least one processor coupled to the bus;

a computer usable medium coupled to the bus, wherein the computer usable medium contains a set of instructions for displaying information related to a chaotic event for a plurality of decision makers managing a plurality of effects of the chaotic event, wherein the at least one processor is adapted to carry out the set of instructions to:

use a mathematical optimization algorithm to select an optimal decision set for a corresponding decision maker, wherein the mathematical optimization algorithm takes as input a decision template, a plurality of chaotic event information regarding the chaotic event, and a corresponding decision maker profile, and wherein the chaotic event is an interruption in a plurality of routines normally performed by people in everyday activities because of damage inflicted to individuals and infrastructures; and display the optimal decision set for the corresponding decision maker.

20. The data processing system of claim 19 wherein displaying is performed in a display window of the data processing system, and wherein the at least one processor is further adapted to carry out the set of instructions to:

alter the display window based on an output of the mathematical optimization algorithm, whereby the display is altered according to at least one of the decision template, the plurality of chaotic event information, the corresponding decision maker profile, and combinations thereof.

* * * * *